United States Patent [19]

Glaser

[11] Patent Number: 4,580,011

[45] Date of Patent: Apr. 1, 1986

[54] DISTRIBUTED PROCESSING TELEPHONE SWITCHING SYSTEM

[76] Inventor: Robert E. Glaser, 3213 Patmor Rd., Owings Mills, Md. 21117

[21] Appl. No.: 527,781

[22] Filed: Sep. 30, 1983

[51] Int. Cl.$^4$ ............................................. H04M 15/26
[52] U.S. Cl. ................... 179/10; 179/18 ES; 179/170 D; 179/16 F
[58] Field of Search ..................... 179/10, 2 C, 18 ES, 179/9, 8 R, 16 A, 18 EB, 18 E, 18 EA, 170 D, 170 H, 170 NC, 170 G, 170 T, 170.8, 16 F; 333/179, 180, 28 R

[56] References Cited

U.S. PATENT DOCUMENTS

| | | | |
|---|---|---|---|
| 4,160,129 | 7/1979 | Peyser et al. | 179/18 E |
| 4,256,926 | 3/1981 | Pitroda et al. | 179/18 ES |
| 4,453,038 | 6/1984 | Eberhardt et al. | 179/16 F X |

Primary Examiner—Stafford D. Schreyer

[57] ABSTRACT

A telephone switching system and method eliminates the need for high speed computers by employing a master controller having its own microprocessor to coordinate and control a tone controller, a switch controller, and a coupler controller, each of which has its own microprocessors and performs independent parts of the overall system control function. The master controller microprocessor interacts with each other controller microprocessor via a communication bus to segment the control functions into small independent operations which may be performed simultaneously. System call handling capacity can be increased by adding modular controller units to service added telephone lines. A solid state fully protected voice coupler is protected against voltage and current surges while meeting all relevant FCC specifications for connection to any voice transmitting and receiving equipment.

43 Claims, 40 Drawing Figures

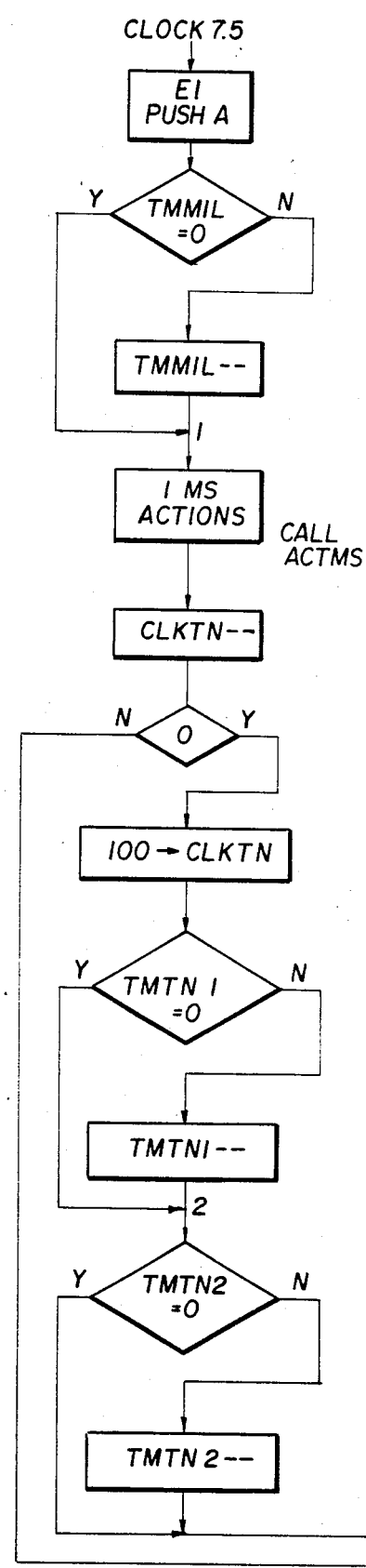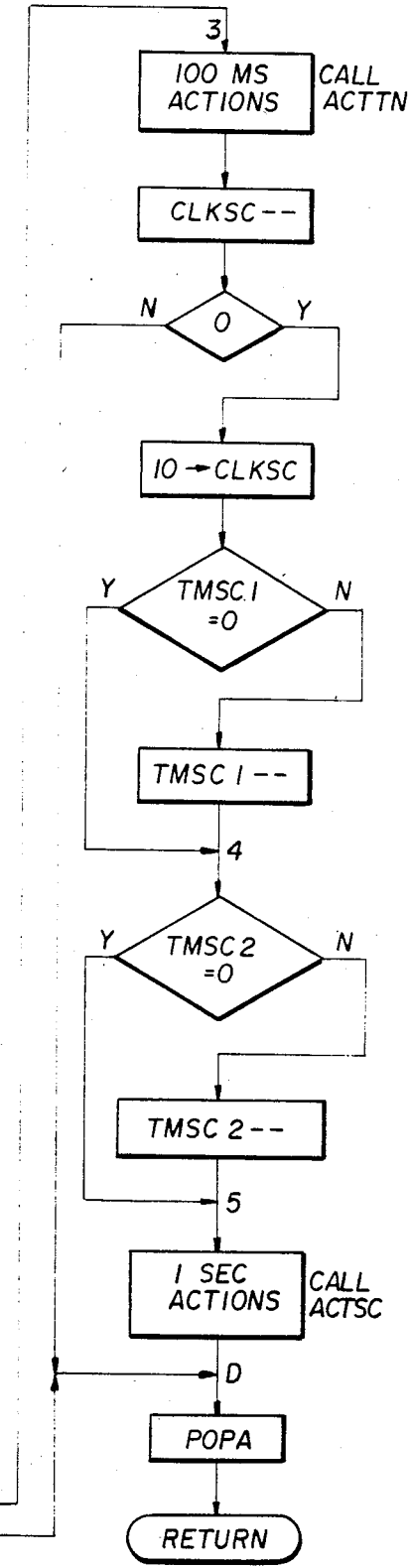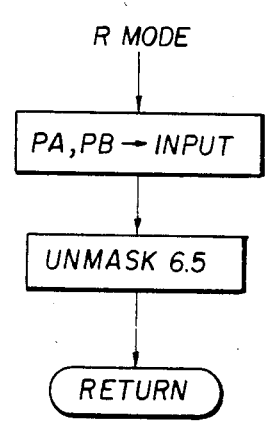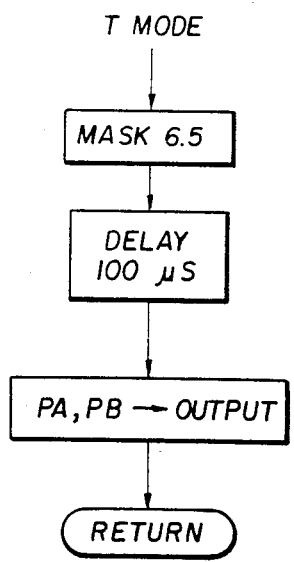
FIG.11
FIG.13
FIG.14

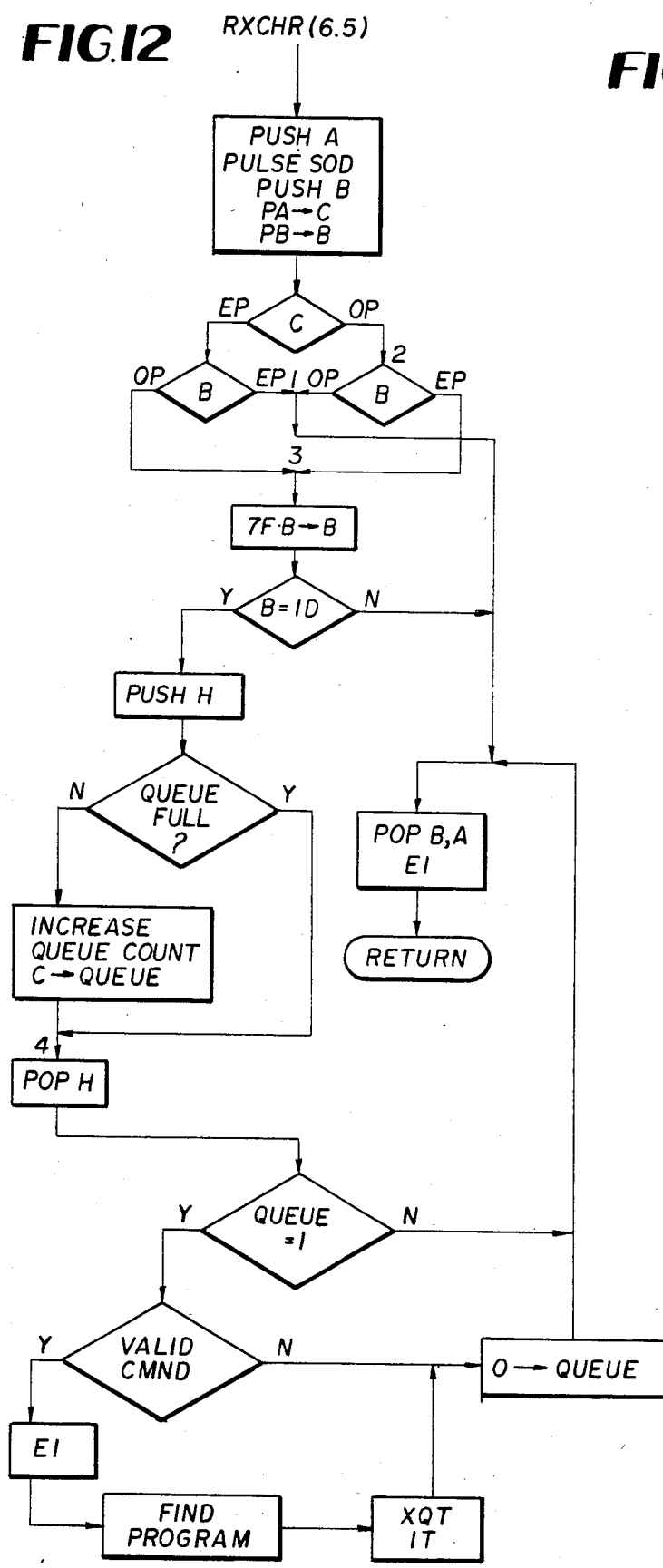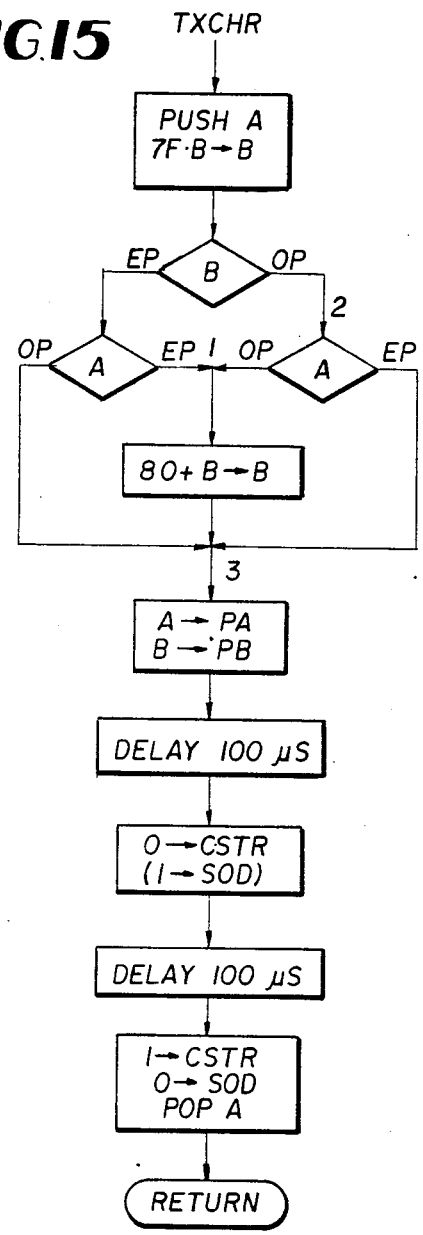

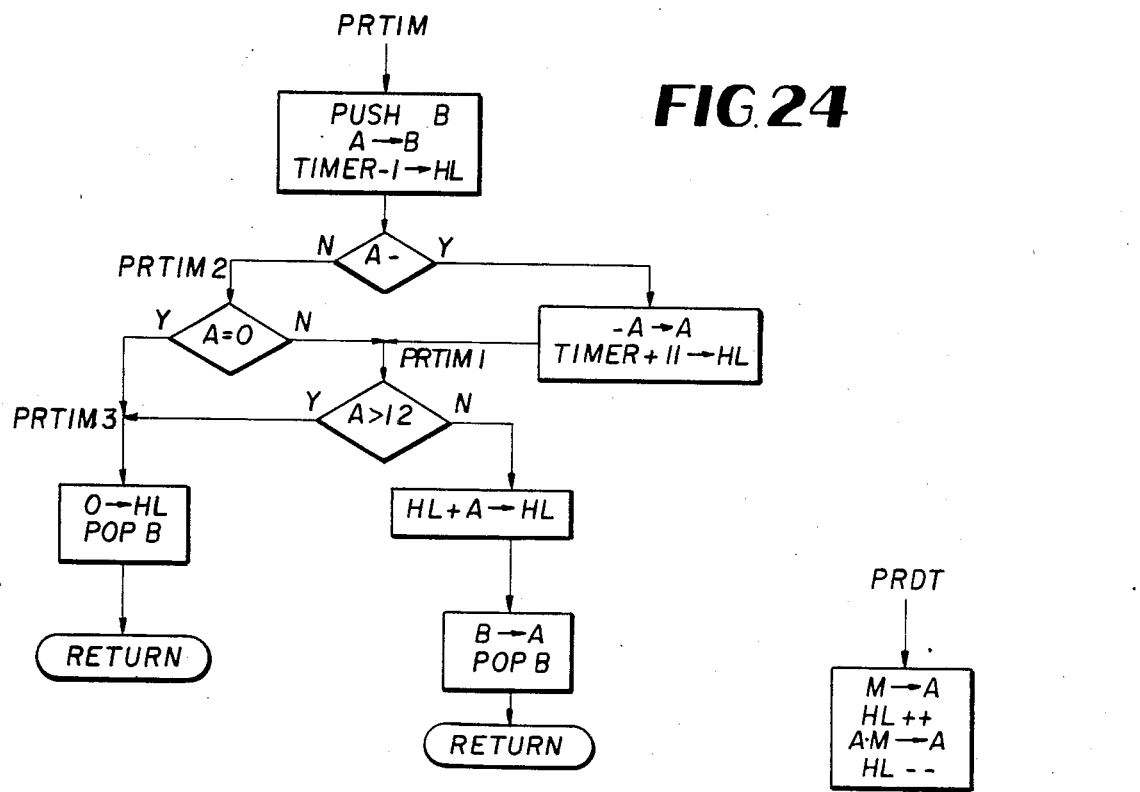
FIG. 24
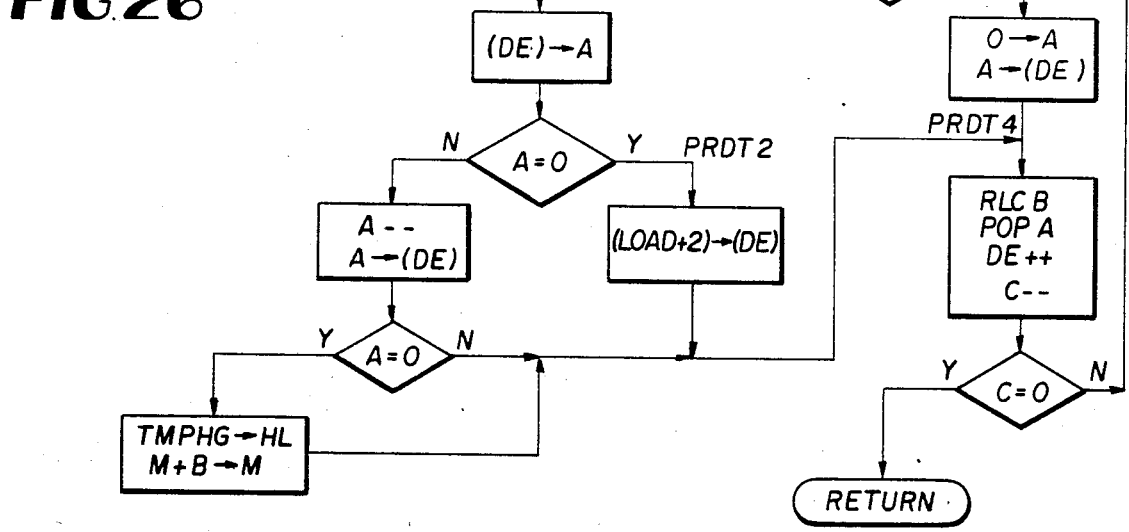
FIG. 26
FIG. 25

DISTRIBUTED PROCESSING TELEPHONE SWITCHING SYSTEM

BACKGROUND OF THE INVENTION

1. Technical Field

The present invention relates to telephone switching systems and, more particularly, to a system which receives requests for placing long distance telephone calls and responds by establishing least cost routing connection in setting up the calls.

2. Discussion of the Prior Art

Numerous companies are presently in the long distance telephone service resale business wherein customers are offerred low cost long distance rates. Access to such systems is generally achieved by dialing a local telephone number. Upon receiving an access acknowledgement signal, the customer then dials in his or her user code followed by the telephone number of the party being called. The system is able to take advantage of high volume rates, low cost, transmission links, etc., in order to provide low billing rates.

It is desirable that such a system be capable of determining the least cost routing for a long distance call at any given time in order to minimize the system owner's costs. This desirable feature has resulted in development of least cost routing telephone switches which must include the following:

(1) A group of ports for connection to incoming telephone lines, from which requests for calls are received;

(2) A group of ports for connection to outgoing telephone lines, on which calls are placed to destination;

(3) A set of DTMF decoders to receive information from the requesting user;

(4) A set of DTMF encoders to dial outgoing telephone numbers;

(5) A set of ready tone generators to inform the user that the system is ready to receive information;

(6) A set of dial tone detectors to determine when outgoing lines are ready to receive dialing information;

(7) A means to connect incoming ports, DTMF encoders, and dial tone detectors to outgoing ports, DTMF decoders, and ready tone generators (such as a crosspoint array); and (8) A control structure to coordinate all activities, execute a least cost algorithm for assignment of outgoing lines, create billing and statistical records, and perform ancillary functions, such as line testing.

Conventional switch systems use a high-speed minicomputer or mainframe computer to perform the last function. This provides the one central control computer access to all hardware and responsibility for performing all activities of the entire switch in real time. These activities include line monitoring, crosspoint control, DTMF decoder and encoder allocation, and port control, in addition to algorithmic and recordkeeping functions. In effect, every single action taken in the system is directly controlled by the one computer (dual or triple computers used solely for reliability or diagnostic functions are used essentially as a single computer). The computer must be relatively fast in order to be able to perform all tasks in real time. Such a computer is expensive, thereby adding significantly to the system cost and the charges which must be passed on to the customer. In addition, even for the fastest of computers, undesirable delays are experienced in call handling, particularly during peak traffic time periods.

OBJECTS AND SUMMARY OF THE INVENTION

It is, therefore, an object of the present invention to provide an improved method and apparatus for handling long distance telephone connections wherein the expense and delays inherent in the prior art are substantially eliminated.

It is another object of the present invention to provide a least cost switching system and method for long distance telephone calls wherein individual components of the system can be more efficiently controlled.

In accordance with the present invention, a least cost routing switch employs a unique approach to providing overall control of the system. The single high-speed computer used for central control is discarded and replaced by a number of smaller, much less powerful, processors which perform the control function in aggregate. The system includes:

(a) a set of LSI microprocessors (not microprogrammable processors), each being small and low cost;

(b) a communications bus connecting the microprocessors;

(c) a partition segmenting the control functions as a whole into smaller, mostly independent elements;

(d) an assignment of sets of microprocessors to elements of the control partition;

(e) a hierarchy of control levels such that communications between microprocessors is minimized; and (f) a set of communications protocols for each level of the control hierarchy. With this arrangement, the central control requiring an expensive, high-speed computer is replaced with a distributed network of much less powerful and much less expensive microprocessors.

A key element of the distributed processing least cost routing switch is the tone controller. This module fundamentally changes the overall control flow in the switch system and has the following characteristics: the tone controller contains all tone decoders and encoders which are required to handle an entire call (typically a ready tone generator, DTMF decoder, dial tone detector, and DTMF encoder); the tone controller module is controlled by its own LSI microprocessor; all processing (including timeouts) which is done on a digit-by-digit basis (such as receiving an authorization code or telephone number, or dialing out a telephone number) is performed within the module; and there is a communications bus between the module and higher level processing modules.

Functionally, the tone controller modules are used as follows: they receive high level commands from another module (such as, receive all information from a user at an incoming port) and place an outgoing call by first waiting for dial tone and then transmitting a specified telephone number; tone controllers are shared across many incoming and outgoing lines; and the modules notify the rest of the control structure when the requested action is completed or aborted.

The effective result from using tone controller modules is that the number of operations required per call by the rest of the control structure is reduced by at least an order of magnitude as compared to a system not utilizing such modules. The overall control system need only deal with functional level commands instead of low level digit commands. The speed requirement for the computer equipment operating the switch is greatly relaxed.

Another key element of the distributed processing least cost routing switch of the present invention is the coupler controller. This module also fundamentally changes the overall control flow in the switching system and has the following characteristics: the coupler controller drives all control lines, and senses all logic conditions emanating from a group of telephone line couplers which are connected to the incoming and outgoing telephone lines (typically one control lead to take the port on and off-hook, and at least one sense lead to detect incoming ringing and disconnect signals); it is controlled by an LSI microprocessor; all processing (including timing) which is done on individual ports (telephone line connections) is performed within the module (including forming queues of incoming calls detected by ringing, forming queues of disconnect signal detection, and enforcing all timing constraints relevant to parameters for on and off-hook times, ring detection, and disconnect detection); and a communications bus is provided between the module and higher level processing modules.

The coupler controller monitors and controls on the order of two dozen telephone lines. Functionally, coupler controllers are employed to receive high level commands, from another module, such as: take a line on-hook; take a line off-hook; accept incoming calls; inhibit incoming calls; and associate individual ports with a particular line class. In addition, coupler controller modules notify the rest of the control structure when the ringing-in or disconnect detected queues are non-empty.

The effective result from using coupler controllers is that the number of operations required per line by the rest of the control structure is reduced by at least an order of magnitude as compared to a system not utilizing such modules. The overall control system need only deal with functional level commands instead of low level line supervisory commands. These functions, in particular, are often the source of the need for high speed monitoring operations. As the number of ports grows, there is no appreciable load increase on the rest of the system with regard to line supervision, because coupler controller modules are added to handle the additional ports. The speed requirement for the computer equipment operating the switch is thus greatly relaxed.

The switch matrix controller is also a key element of the distributed processing least cost routing switch. This module fundamentally changes the overall control flow in the switching system and is characterized in that it drives all control lines and senses all logic conditions emanating from the switching matrix (its nature may be space division, time division, or any combination thereof). Further, this module is also controlled by its own LSI microprocessor. All processing (including timing) which is done on individual connections is performed within this module, including path setup and crosspoint addressing. The status of all cross-points (the connection memory) is contained within the switch matrix controller, and there is a communications bus between the module and higher level processing modules.

Functionally, the switch matrix controller receives from other modules such high level commands as: establish a connection between a specified pair of ports; break a connection between a specified pair of ports; break all connections to a specified port; and identify all current connections to a specified port.

The effective result from using the switch matrix controller is that the number of operations required per connection by the rest of the control structure is reduced by an order of magnitude as compared to a system not utilizing such a module. The overall control system need only deal with functional level commands instead of low level line matrix commands. The speed requirement for the computer equipment operating the switch is, therefore, considerably reduced.

A master controller is employed as another key element of the distributed processing least cost routing switch of the present invention. This new module fundamentally changes the overall control flow in the switch and is controlled by its own LSI microprocessor. A communications bus is provided between the module and all lower level processing modules. The master controller assigns tasks to available modules, as necessary, and coordinates all processes required to handle a single telephone call (involving several modules). There is a communications path between the master controller module and a higher level module functioning as a Least Cost Routing Processor (LCRP). All communications between the LCRP and the rest of the overall switch are channelled through the master controller. The master controller notifies the LCRP when there is an incoming call completely ready for customer validation and routing, when a call is complete, and needs to be logged off, and when a failure of any type has been detected. Commands received by the master controller include high level commands from the LCRP (in response to notification that action is required), such as: transmit the customer's authorization code; transmit the requested destination telephone number; transfer the incoming call to a specific outgoing line in a particular manner; and supply the incoming caller with a prerecorded message or "busy" signal.

The effective result from using a master controller is that the number of operations required per call by the highest level processor is greatly reduced. The master controller's function is to minimize the operations performed by the LCRP. The speed requirement for the computer equipment executing decision algorithms is thereby greatly minimized.

Another key element of the distributed processing least cost routing switch is the Least Cost Routing Processor(LCRP). This module fundamentally changes the overall control flow in the switch and is also controlled by an LSI microprocessor. There is a communications path between the module and the lower level master controler module. All validation of customer accounts is done by the LCRP, and any execution of least cost routing algorithms is performed in this module. All information logging is handled by the LCRP (including an event log and a raw data log containing statistical and billing information).

Functionally, the LCRP receives all pertinent information from the master controller concerning a particular call and makes a decision as to how to handle the call based upon the customer's authorization code, the destination telephone number, the types of lines available to place calls over, the current outgoing line status, the relative costs of placing a call over alternate routes, and queue times set up to wait for a more economic line to become available.

The effective result from using the LCRP, which makes only the routing decisions without being inundated with low level tasks, is that the power and speed requirements for such a module are much below what would be required otherwise.

The invention also includes a new type of telephone line coupler for 2-wire loop start applications. The coupler is FCC-registered as fully protected voice circuitry, meaning that any voice transmitting and receiving equipment may legally be connected to the user terminals of the coupler without affecting rules compliance. In order to accomplish this status, the coupler must meet signal level requirements for any user connections. Additionally, the coupler is totally solid-state, has a split 600 ohm winding available on the customer side of the coupler, and has outputs which are open collector, isolated, and without reference to ground at the customer side for ring detect, forward loop current, and reverse loop current. An optical isolator is provided for use at the customer side for a variety of uses, and a low current control lead is supplied to take the coupler on and off-hook. Visual indicators are incorporated for display of ringing, forward and reverse loop current. Telephone line connections are available either via a standard modular jack on the front of the coupler, or at the edge connector for multiple card mounting.

In order to accomplish registration requirements and to satisfy the above conditions, the voice coupler includes a circuit which provides surge protection against transient overvoltages and overcurrents, this being accomplished by triggering a silicon controlled rectifier at a set voltage determined by zener diodes. In addition, a shunt-controlled, frequency selective feedback system is used to effect signal amplitude limiting. All circuitry is line-powered, except the off-hook control leads, and a current regulator is employed to power the on-hook optical isolator.

The surge protection problem is greatly aggravated by the need to safely protect a high voltage optical coupler which has maximum voltage rejection rating only slightly above the maximum voltage present during AC ringing superimposed upon the talk battery. This problem cannot be solved with conventional techniques; hence, the SCR/zener solution.

The signal limiting problem is much more difficult in a 2-wire circuit than in a 4-wire, or hybrid, circuit, since the transmit and receive paths are not separate, and the path is bidirectional. Therefore, a shunting approach proves most practical. However, the signal levels required vary with frequency and should be time-averaged to prevent significant signal degradation during normal operation. A multiple stage filter network, in conjunction with a precision full-wave rectifier and an integrator, are used to solve this problem. The lack of any moving parts whatsoever increases the reliability and desirability of the device.

BRIEF DESCRIPTION OF THE DRAWINGS

These and other objects, features and many of the attendant advantages of the invention will be better understood upon a reading of the following detailed description when considered in connection with the accompanying drawings wherein like parts in each of the several figures are identified by the same reference number, and wherein:

FIG. 11 is a flow chart of the real time clock program for the master, switch, coupler and tone controllers;

FIG. 12 is a flow chart of the program routine for receiving a character from the communication bus in each of the master, coupler and tone controllers;

FIG. 13 is a flow chart of the program routine for setting the communication mode to receive in each of the four controllers;

FIG. 14 is a flow chart of the program routine for setting the communication mode to transmit in each of the four controllers;

FIG. 15 is a flow chart of the program routine for transmitting a character to the communications bus in each of the four controllers;

FIG. 24 is a flow chart for the port timer program routine at the coupler controller;

FIG. 25 is a flow chart for the port detect program routine at the coupler controller;

FIG. 26 is a flow chart for the idle program routine at the tone controller;

DESCRIPTION OF THE PREFERRED EMBODIMENTS

Table of Contents

1. Acronym Glossary
2. General Description
   2.1 Typical Operation
   2.2 Supplementary Functions 2.3 Communication Protocols
3. Internal Functional Description
   3.1 System Architecture
   3.2 Master Controller
   3.3 Switch Controller
   3.4 Coupler Controller
   3.5 Tone Controller
   3.6 Internal Communications Prioritization
   3.7 Universal Voice Coupler
   3.8 Switch Card
   3.9 Audio Circuit
4. Hardware Description
   4.1 Universal Voice Coupler
   4.2 Switch Card
   4.3 Audio Circuit
   4.4 Common Controller Circuitry
   4.5 Master Controller
   4.6 Switch Controller; Master, Slave
   4.7 Coupler Controller
   4.8 Tone Controller
5. Internal Software
   5.1 Common Code
   5.2 Master Controller
   5.3 Switch Controller
   5.4 Coupler Controller
   5.5 Tone Controller
6. LCRC Software
   6.1 LCRC Hardware
   6.2 Software Environment
   6.3 Startup Program
   6.4 Switch Operating Program
   6.5 Understanding the Screen Display
   6.6 Initialization Program

1. ACRONYM GLOSSARY

The following list of acronyms used herein, and their meanings, is provided for ease of reference:

ACTMS: one millisecond interrupt action
ACTSC: one second interrupt action
ALE: address latch enable
AUTHC: authorization code
BILLC: billing code
BOLST: busy out list
CAL: call
CC: coupler controller
CGRP: current group
CLK: clock
CPORT: current port
CPU: central processing unit
CS: column select
CSTR: communications strobe
CTS: clear to send
DA: data available
DALST: don't answer list
DDD: direct distance dialing
DES: deselect
DIALF: dialing failure
DTMF: dual tone multiple frequency
DTR: data terminal ready
EI: enable interrupt
EPROM: erasable programmable read only memory
ES: enable select
ESH: enable select high
ESL: enable select low
FX: foreign exchange
HUP: hangup
INITG: initialization go
INTR: interrupt request
LCR: least cost routing
LCRP: least cost routing processor
LSI: large scale integration
MC: master controller
OCC: other common carriers
OH: on/off hook
RAM: random access memory
RD: read
ROM: read only memory
RS: row, select
RTS: request to send
RXCHR: receive character
RXD: received data
SA: switch address
SC: switch controller
SCR: silicon controlled rectifier
SID: serial input data
SOD: serial output data
SPST: single pole single throw
SSTR: switch strobe
STEST: self-test
SZWT: seize wait
TC: tone controller
TCI: tone controller interrupt
TCINF: tone controller information
TCODE: travel code
TCRST: tone controller reset
TCTAB: tone controller table
TMMIL: timer, millisecond
TMSC: timer, second
TMTN: timer, one-tenth second
TXD: transmitted data
USART: universal synchronous/asynchronous receiver/transmitter
WATS: wide area telecommunications service
WR: write

2. GENERAL DESCRIPTION

Figure 1:
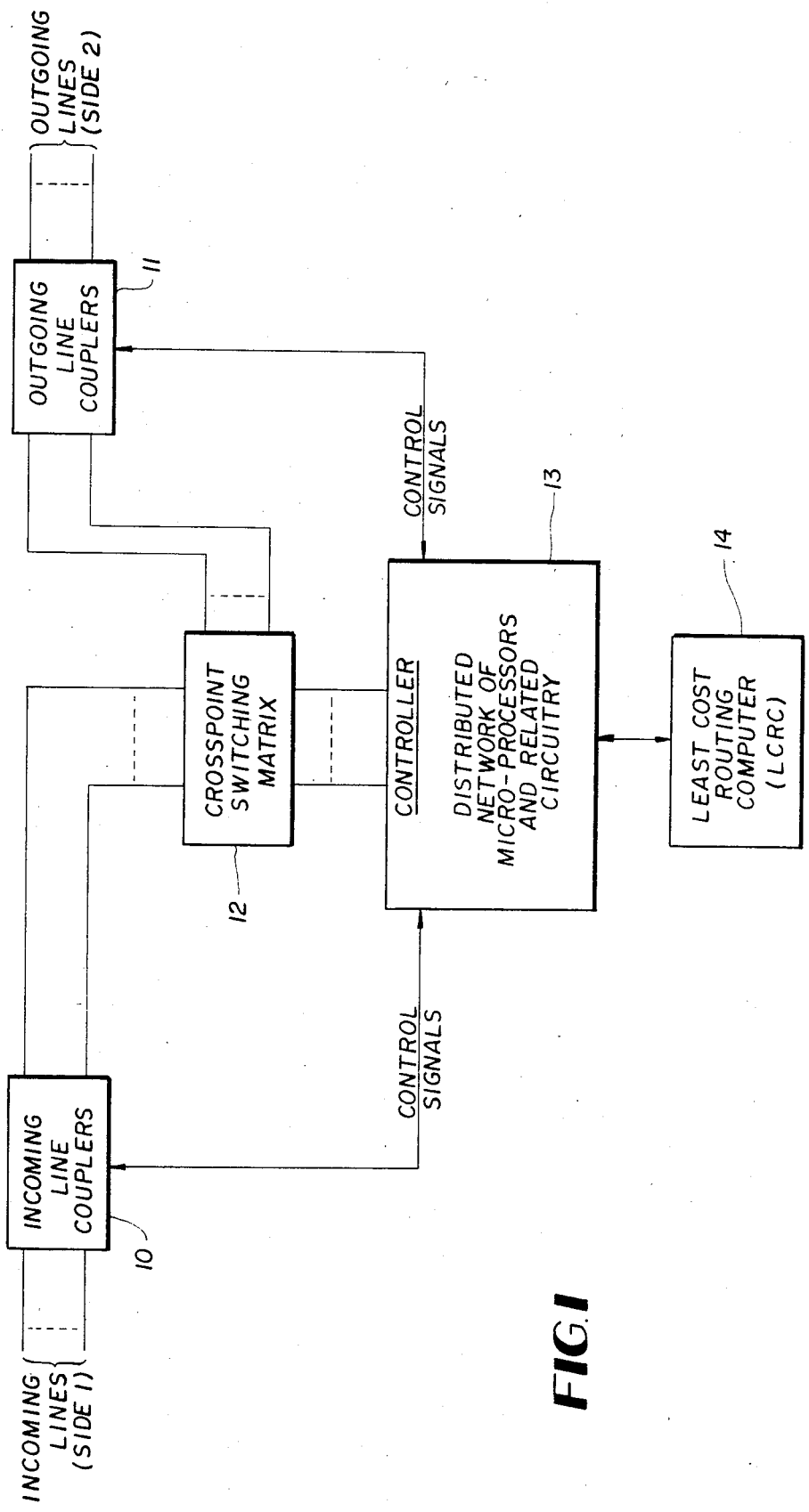
FIG. 1 is a functional block diagram of the telephone switching system of the present invention.

The switching system of the present invention is a sophisticated system designed to operate as an intelligent telephone least cost routing (LCR) switching center. It can be configured in sizes from 12 to 192 pairs of incoming and outgoing ports in multiples of 12. Referring specifically to FIG. 1, the system includes four subcomponents: the telephone line couplers 10, 11; a matrix crosspoint switch 12; the control system 13; and a high level microcomputer 14 equipped with a disk drive and a modem (LCR computer, or LCRC). The line couplers 10, 11 interface the telephone lines with the rest of the system and are completely solid state. The crosspoint switch 12 is an electronic, nonblocking array capable of connecting any SIDE1 line or lines to any SIDE2 line or lines. The controller 13 is actually a distributed network of microprocessors forming the nucleus of the system and performing the following functions: interfacing with the control signals from the couplers to carry out the supervisory activities of ring and hangup detection and control of on and off-hook conditions; interfacing with the crosspoint switch hardware to control the make/break status of each crosspoint; providing DTMF tone encoders and decoders, dial tone, ready tone, and busy tone detectors and generators; allocating tone modules to incoming and outgoing requirements; pre-processing customer signalling (travel, authorization and billing codes, requested telephone number) and post-processing outgoing call requirements (wait for dial tone, access number, wait for ready tone, authorization code, requested number);

interfacing with backup power supply signals; providing a real-time clock; and interfacing with the LCRC through a serial line. It is the function of the controller to perform all duties of the system switch with the exception of the actual authorization code verification, route selection, and data logging requirements; these are the functions of the LCRC 14.

2.1 Typical Operation

An incoming call is detected by the controller 13, which takes the line off-hook (i.e., answers the phone). A tone module is allocated to the call, activating a dial tone generator and a DTMF decoder. The customer hears the dial tone and enters his or her authorization code, followed by the area code and telephone number of the party being called. Additionally, the authorization code may be preceded with a travel code if the customer is not calling from his home city, and a billing code may be appended to the telephone number. Prestored speed dial codes may be used in place of the 10-digit telephone number. After receipt of the first DTMF tone, the dial tone generator is turned off. At various key points, the controller 13 acknowledges progress to the caller with a prespecified number of beeps, noting the call progression. When all of the information is received, the controller notifies the LCRC 14 that a call is waiting for placement. The LCRC then interrogates the controller to determine on which port the call came in and the authorization code, telephone number requested, and the optional travel and billing codes. The LCRC validates the authorization code; if invalid, it commands the controller to supply a busy tone to the caller. If the request is valid, the LCRC makes the decision of how to place the requested call with the least cost, given the current line usage status. Typical decisions are between WATS lines, foreign exchange (FX flat-rate) lines directly to destination, FX lines to OCC access cities, and FX lines to DDD for call completion. With one command, LCRC 14 notifies controller 13, and the controller automatically connects a dial tone detector and DTMF tone generator to the outgoing line and takes the line off-hook. After receiving dial tone, the controller dials the telephone number for a direct call; for a relayed call, the controller dials the OCC switch number, authorization code, and requested telephone number. The controller then disconnects the dial tone detector and DTMF tone generator from the outgoing line and connects the incoming and outgoing lines together at matrix 12. The LCRC may also determine that the pending call should wait a short period of time before placement in the hope that another call will terminate and make a more economical route available for the pending call. In this case, the LCRC 14 must later notify the controller 13 to put the call on "hold" and then route the call at a later time.

When the conversation is completed, one of the parties hangs up. This is detected by the controller 13 which then hangs up both the incoming and outgoing lines and notifies the LCRC 14. The LCRC then interrogates the controller to determine which call is terminated and logs the call. The LCRC either reads the time from the controller periodically to update its internal clock, or it reads the time from the controller at the start and end of each call.

As incoming calls arrive, the controller allocates tone modules to handle the calls. In this fashion, multiple requests are handled simultaneously. Upon completion of each call request, the LCRC immediately either places the call or puts it on hold. When calls arrive with all tone modules allocated, the calls are later handled in the order of arrival when the tone modules are relinquished by prior calls. The call is not answered until an allocation can be made. In this manner, customers simply wait until the ringing is answered. If the system gets bogged down, customers may have to wait longer than they desire and can simply hang up and try again a little later without being charged for the call. Disconnects are handled before incoming calls.

2.2 Supplementary Functions

When an input signal informs the controller that main power has been lost and backup power is being utilized, the controller 13 notifies the LCRC 14. It is expected that the LCRC would then place a service call to a central location, informing of the power failure situation. Similarly, when power is transferred from backup power to main power, the controller so notifies the LCRC. In this fashion, power outages can be tracked by the LCRC and short outages may be ignored if desired.

If a telephone line failure is detected, the controller notifies the LCRC, which may either try that line again or flag that line as defective. If a line is taken off-hook and no dial tone is detected within a prespecified period of time, that line is classified as failed.

2.3 Communication Protocols

The controller 13 communicates with the LCRC 14 with serial asynchronous characters. This consists of the standard start bit, eight data bits, and one stop bit. The speed is switch selectable, and may be set to 110, 300, 600, 1200, 2400, 4800, 9600, and 19200 baud. Two forms of communication take place: notification and interaction.

Notification symbols can be transmitted from the controller to the LCRC when an appropriate condition occurs, without being so requested by the LCRC. These provide notification of some condition which requires action. These conditions, and the corresponding characters, are: $ (Incoming call); @ (Hangup); D (Dialing failure); and P (Power failed or restored). Notification of incoming calls is only made after the optional travel code, authorization code, and telephone number have been received. When billing codes are entered, upon completion of their entry, notification is made a second time through the "$" character, at which time the call can be handled. A customer may cancel all digits prior to the billing code by sending "#", thereby providing a new dial tone. A "#" character received during the entry of the billing code clears only the digits entered as that code. The number of digits required for the authorization code, telephone number, and billing codes are pre-specified. Speed dial numbers may be used in place of the 10-digit telephone number with a "*" character appended, and shortened billing codes are appended with a "*". When waiting for digits, a prespecified maximum number of seconds is permitted to elapse between digits and a second pre-specified maximum number of seconds is permitted for the duration of the entire entry sequence. If these times are exceeded, the call is aborted and the line is placed on-hook, unless the sequence has progressed to the billing code field, in which case the digits received are used as that code. Aborted calls generate a "@" character instead of a "$". The LCRC 14 can distinguish between a normal disconnect and a call abort because an aborted call is always received from a line which is not currently in use. Upon receipt of a "@" character, the LCRC must request the disconnected port and log either a completed or an aborted call.

Receipt of a "D" character indicates a dialing failure and should be treated in the same manner as receipt of a "$" except that a line may need to be marked as defective and an alternate selected.

Receipt of a "P" character indicates that main a.c. power has either failed or been returned; use of the "AC" command determines which of the two is in effect.

For each of these four notification symbols, if the proper response is not received from the LCRC, the symbol is indefinitely repeated at twenty second intervals. Other than for notification of these four conditions, no communications are ever initiated by the controller 13.

The LCRC 14 initiates interactive communications. A sequence of characters of variable length, sent by that computer, commands the controller. These commands produce a response from the controller; however, no more than a single character is ever sent by the controller to the LCRC for each request. This procedure may appear to be cumbersome, but it provides handshaking between the two units and eliminates problems which could occur if the LCRC cannot respond in time to multiple characters. The controller 13 responds with a "?" character if an undefined command is received from the LCRC. Receipt of notification symbols by the LCRC must be handled by certain required interactive commands. They are as follows:

$—XK, XB, XH, XW, XC, XD, or XM
D—XK, XB, XH, XW, XC, XD, or XM
@—G and P
P—AC

These commands must be used to cancel the twenty second repetition of the associated notification symbol. It is expected that prior to these commands for the "$" and "D" characters, additional commands will be issued by the LCRC. These are:

$—W, G and P and either R or B
D—G, P, and DF Upon transmission of "$", "D", and "@" characters, the current call status is set; this is cleared after the required command is received. For the "$" character, the current call group and port are set to the incoming port; for the "D" character, the current call group and port are set to the incoming port if there is one, otherwise the outgoing port; and for the "@" character, the current call group and port are set to the first party to hang up (there will only be one "@" sent per call terminated; the other side is automatically hung up without specific announcement).

Twenty-six dialing sequence registers (A through Z) are available for outgoing calls. These dialing sequences are loaded from the LCRC and can also be read. In addition to the 16 standard DTMF tones, either special codes may be embedded within the dialing sequences. These are: send the 10-digit requested telephone number (T), send the 7-digit requested telephone number (V), pause one quarter second (Q), pause one second (S), wait for precise dial tone (W1 and W3), wait for ready tone (W2), and force a dialing failure (W0). When the LCRC decides how to route a telephone call, it commands the controller to transfer the current incoming call to a specified outgoing line (on the opposite side of the matrix switch 12) with one of the dialing sequences A-Z. Through use of the T and V features, it is not necessary to modify a dialing sequence for specific calls. It is possible to store substitute numbers for speed dialing (the Q# command) into the telephone number holding register to replace abbreviated codes.

An example for redialing into an OCC with authorization code 12345678, billing code 99, and access number 555-1234 is the dialing sequence "@15551234W212345678T99)". Specifying this sequence in the transfer call instruction results in accessing the outgoing line, waiting for dial tone, calling the local OCC access number, waiting for ready tone, sending the authorization code, sending the customer's 10-digit requested number, and sending the billing code. Calls into an area where an FX line is available need only store "W1V" into the dialing sequence register, since the area code is not needed. Similarly, to utilize a WATS line, a dialing sequence containing "W1T" is used.

Upon initial power turn on, the LCRC preloads one dialing sequence register for all of the FX lines and a separate dialing sequence for each OCC that can be used. In this manner, the LCRC need only decide which line and dialing sequence to use for each call.

The telephone ports and crosspoint lines are organized into sides, groups, and ports or lines. There are two sides, SIDE1 and SIDE2. The telephone lines are broken down into groups of 12 ports; there can be a maximum of 16 groups on each side. SIDE1 groups are labelled herein as a-p, and SIDE2 groups are labelled herein as A-P. There are 12 telephone ports per group, labelled herein A-L. Crosspoint lines are labelled as A-P within each group. Each group consists of 16 crosspoint lines, of which the first 12 are connected to telephone lines; the remaining four are connected to tone or auxiliary modules.

If the controller detects a command syntax error, it waits until no characters have been received from the LCRC for a 0.5 second interval and sends a "?"; the controller then waits for a new command. The maximum length of time between characters in one command sequence is five seconds (exception: INDA, INBO); if this limit is exceeded, it is treated as a syntax error. Notification characters are sent until 0.5 second has elapsed from the last switch response without any further requests from the LCRC (the "r" command is used to defeat this).

3. INTERNAL FUNCTIONAL DESCRIPTION

This section describes the function of each subsystem in the switching system of the present invention and the order in which operations are performed to achieve traffic placement.

3.1 System Architecture

Figure 2:
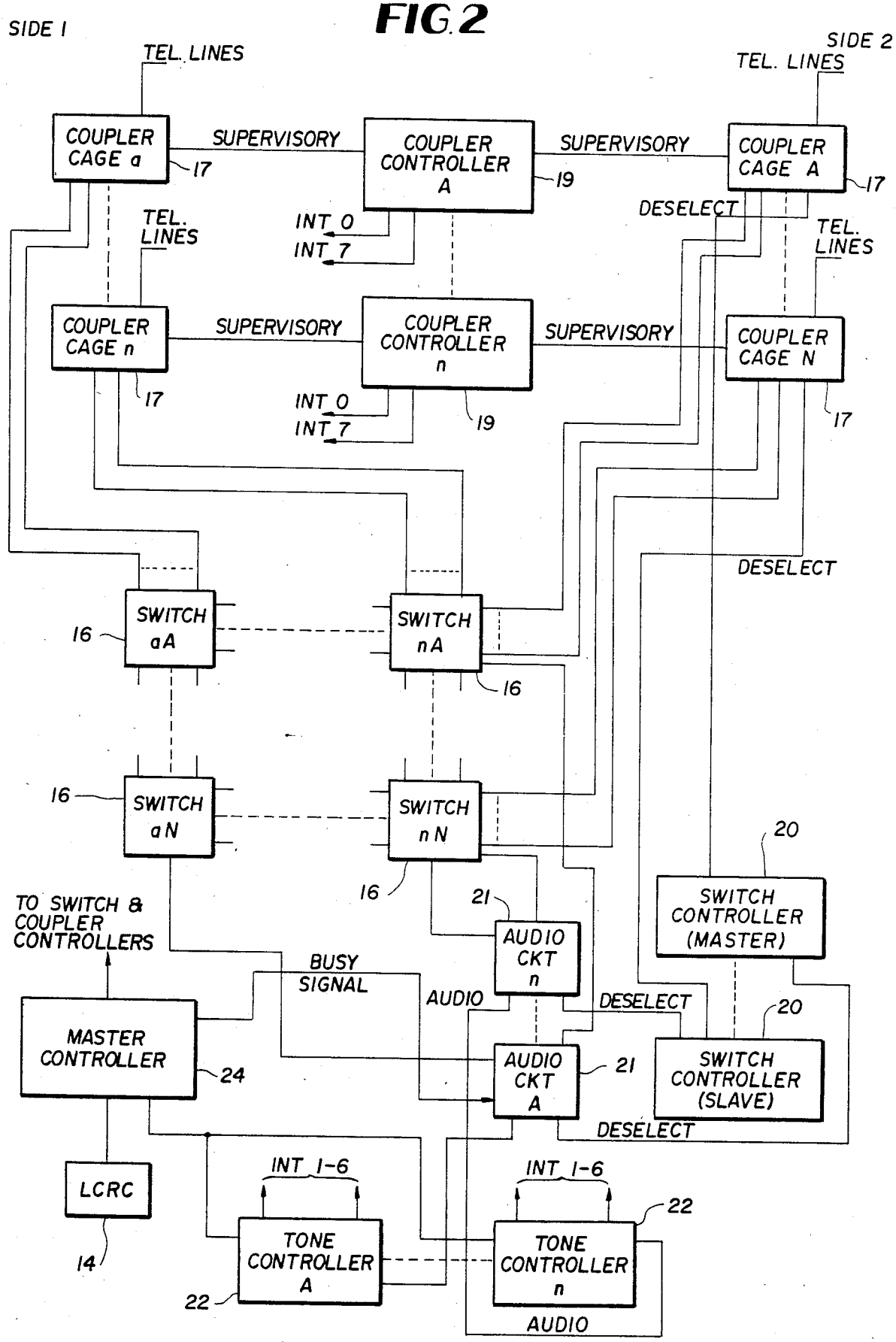
FIG. 2 is a more detailed block diagram of the telephone switching system of the present invention illustrating certain control functions and inter-relationships.

The switching system can be configured in sizes from 12 to 192 incoming and outgoing ports (telephone lines), in multiples of 12. Referring specifically to FIG. 2, for each multiple n of 12, the system grows linearly, with the exception of switch cards, of which there are always $n^2$. Each switch card 16 is a 16×16 balanced crosspoint array, so that for a system of size n there is a switching array of size 16n×16n. Of the 16n connections on each side of the switch, 12n are used for telephone line connections and the remaining 4n are used for coupling to auxiliary audio equipment. These connections are available as lines AM, AN, AO, AP, aM, aN, aO, aP, BM, etc., to produce the 4n connections. The first connection, AM/aM, is used for the system busy signal generator. The remaining 4n−1 lines are used for access to tone controllers (or voice controllers).

The incoming telephone lines (SIDE 1) form the columns of the switching matrix, and the outgoing lines form the rows of that matrix. Each group of 12 telephone lines interface to the matrix through a respective coupler cage 17 which houses 12 line couplers. The auxiliary connections into the matrix are made through audio cards 18. Each audio card provides four row and four column terminations. A coupler controller 19 interfaces with one column (incoming) and one row (outgoing) coupler cage. The switch controller 20 interfaces with the switching matrix 16, the coupler cage 17, and the audio cards.

The following Table I is a chart designating how many modules of each system component are required to service different number of telephone lines (ports);

TABLE I

| # Ports Each Side | 12 | 24 | 36 | 72 | 108 |
|---|---|---|---|---|---|
| n | 1 | 2 | 3 | 6 | 9 |
| Master Controller 24 | 1 | 1 | 1 | 1 | 1 |
| Switch Controller Master 20 | 1 | 1 | 1 | 1 | 1 |
| Switch Controller Slave 20 | 0 | 1 | 2 | 5 | 8 |
| Coupler Controller 19 | 1 | 2 | 3 | 6 | 9 |
| Tone Controller 22 | 3 | 7 | 11 | 23 | 35 |
| Switch Card 16 | 1 | 4 | 9 | 36 | 81 |
| Audio Card 21 | 1 | 2 | 3 | 6 | 9 |
| Coupler Cage 17 | 2 | 4 | 6 | 12 | 18 |

Figure 3A:
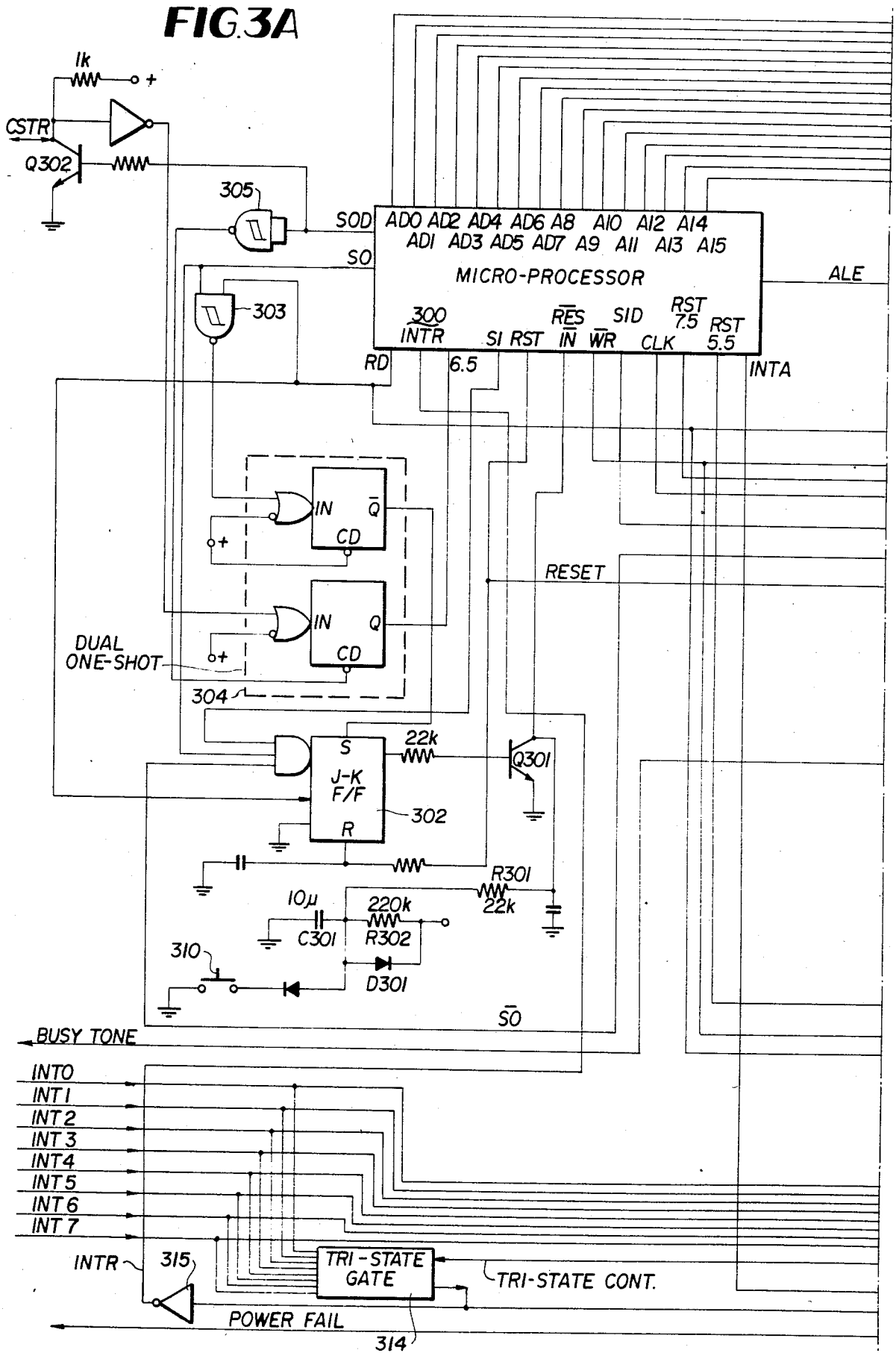
FIG. 3A-C is a schematic diagram of the master controller circuit employed in the system of FIG. 2.
Figure 3B:
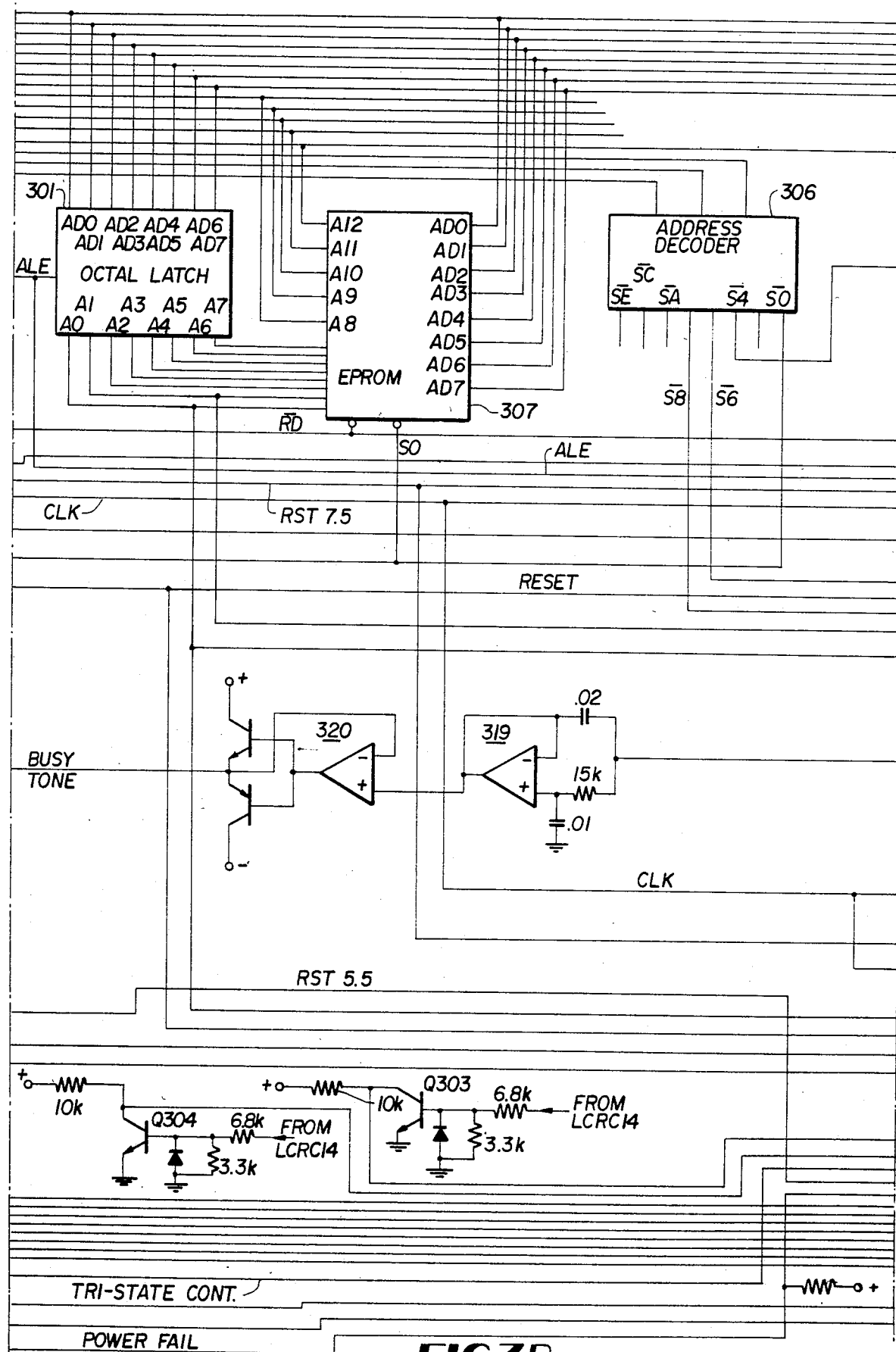
Figure 3C:
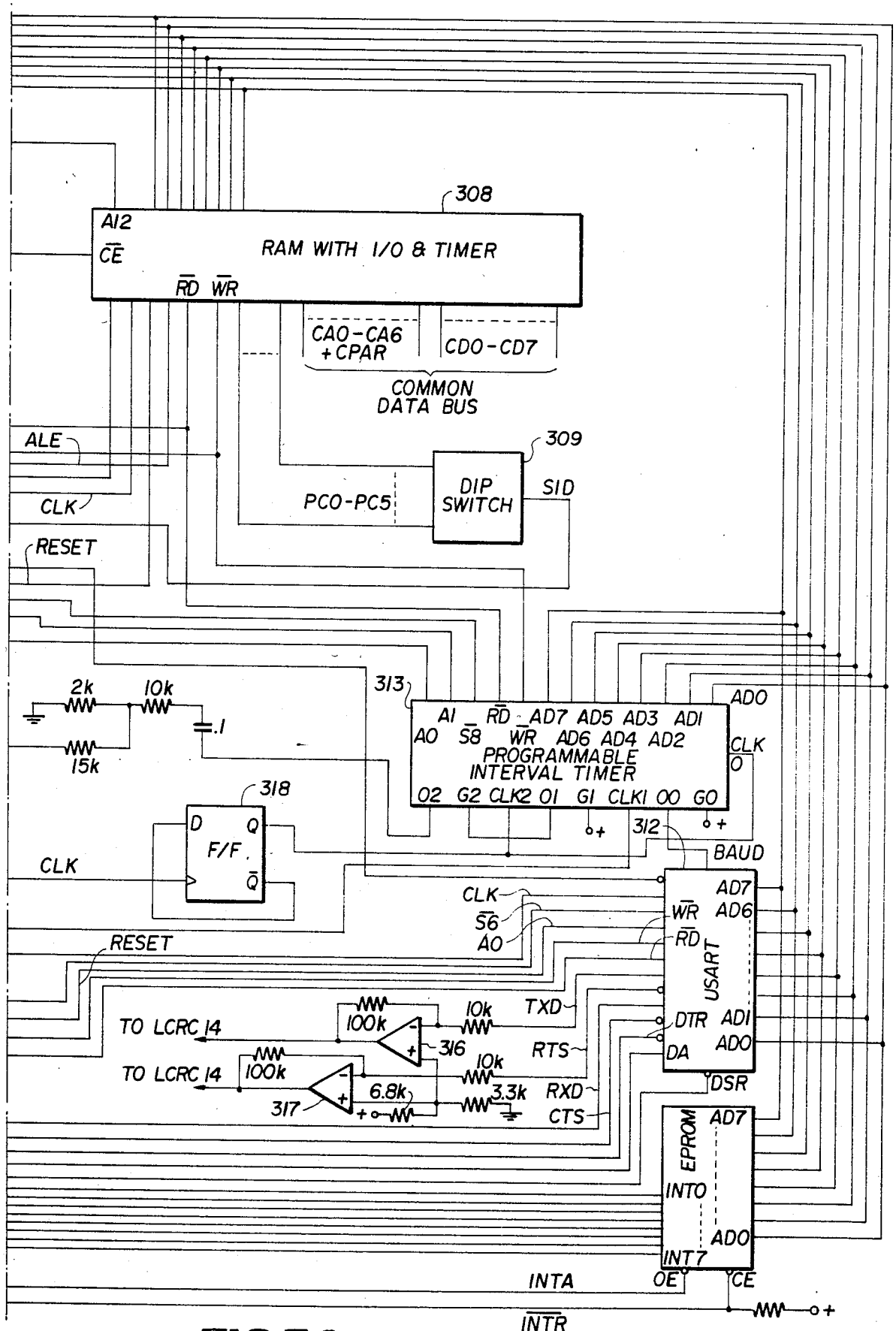

3.2 Master Controller (FIGS. 2 and 3)

The master controller 24 supervises the entire system's operation. It communicates with each of the three function controllers (switch 20, coupler 19, and tone controllers 22). It is master of the communications bus and is sensitive to eight interrupt lines which are driven by the function controllers. The master controller allocates the function controllers and coordinates all operations required to perform any desired task. It is the sole link between the system and the LCRC computer 14, communicating via a single serial RS-232 line. Master controller 24 also provides a low impedance busy tone signal, which enters the switching matrix through connection AM/aM.

Figure 4A:
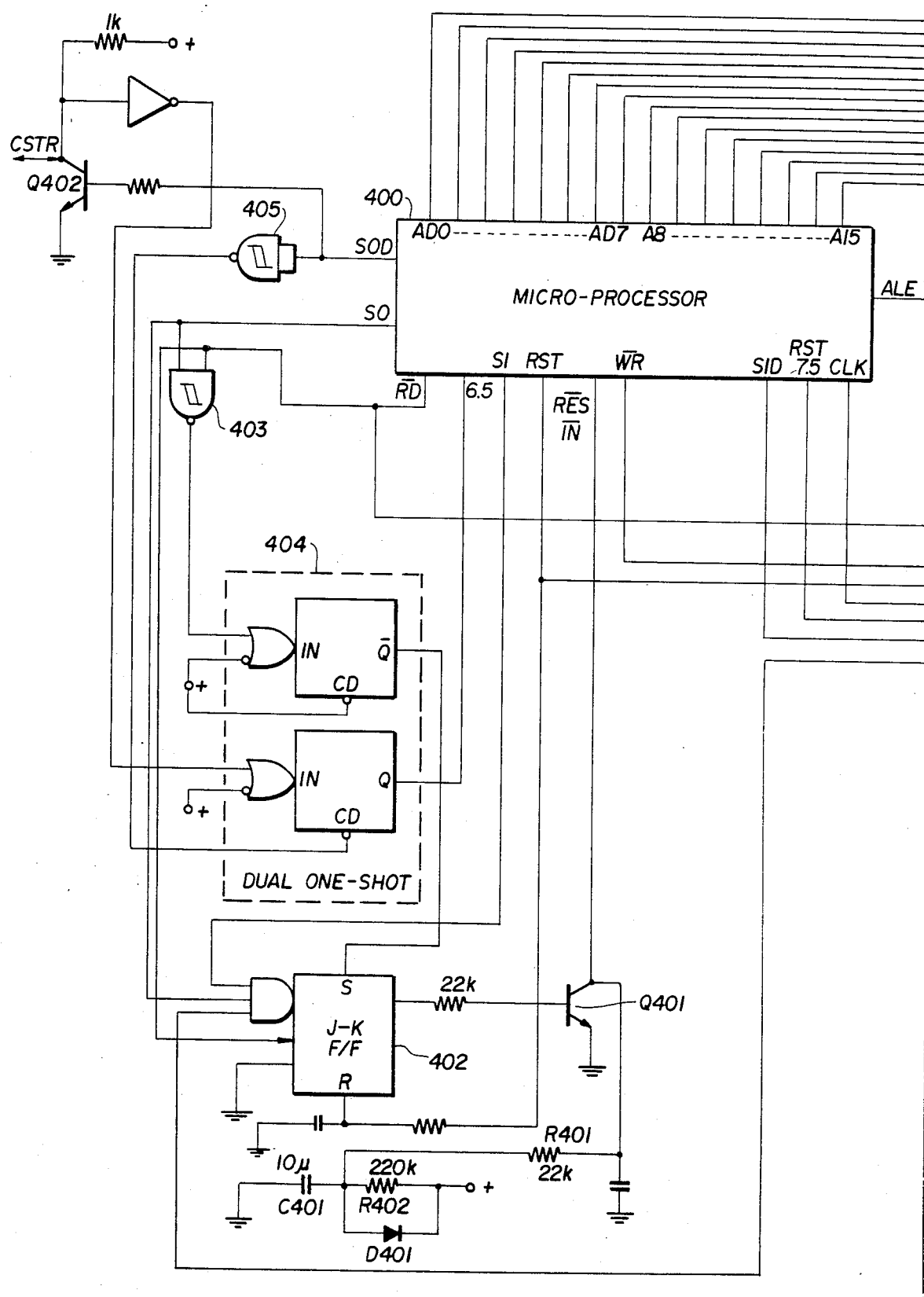
FIG. 4A-C is a schematic diagram of the switch controller circuit employed in the system of FIG. 2.
Figure 4B:
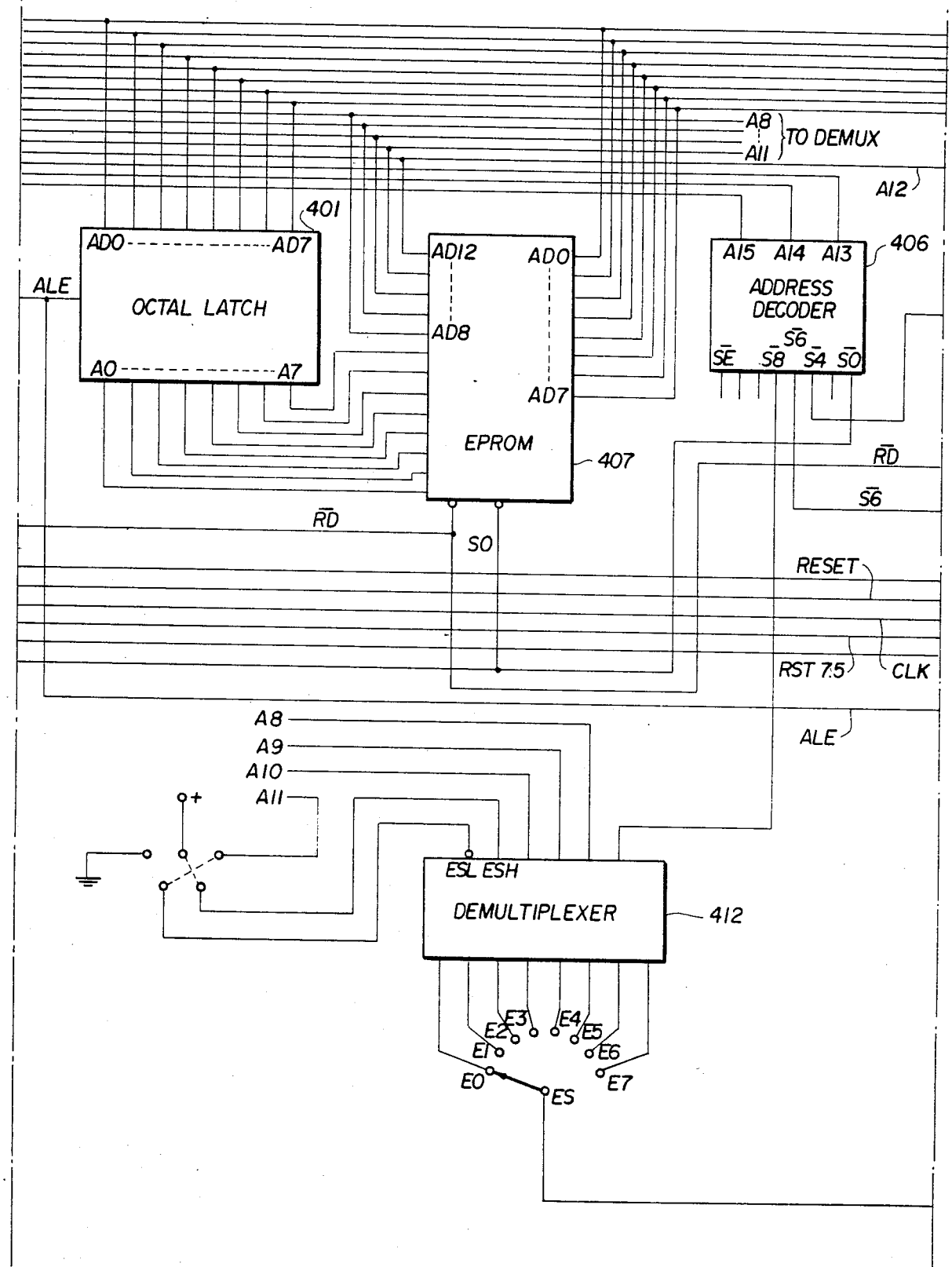
Figure 4C:
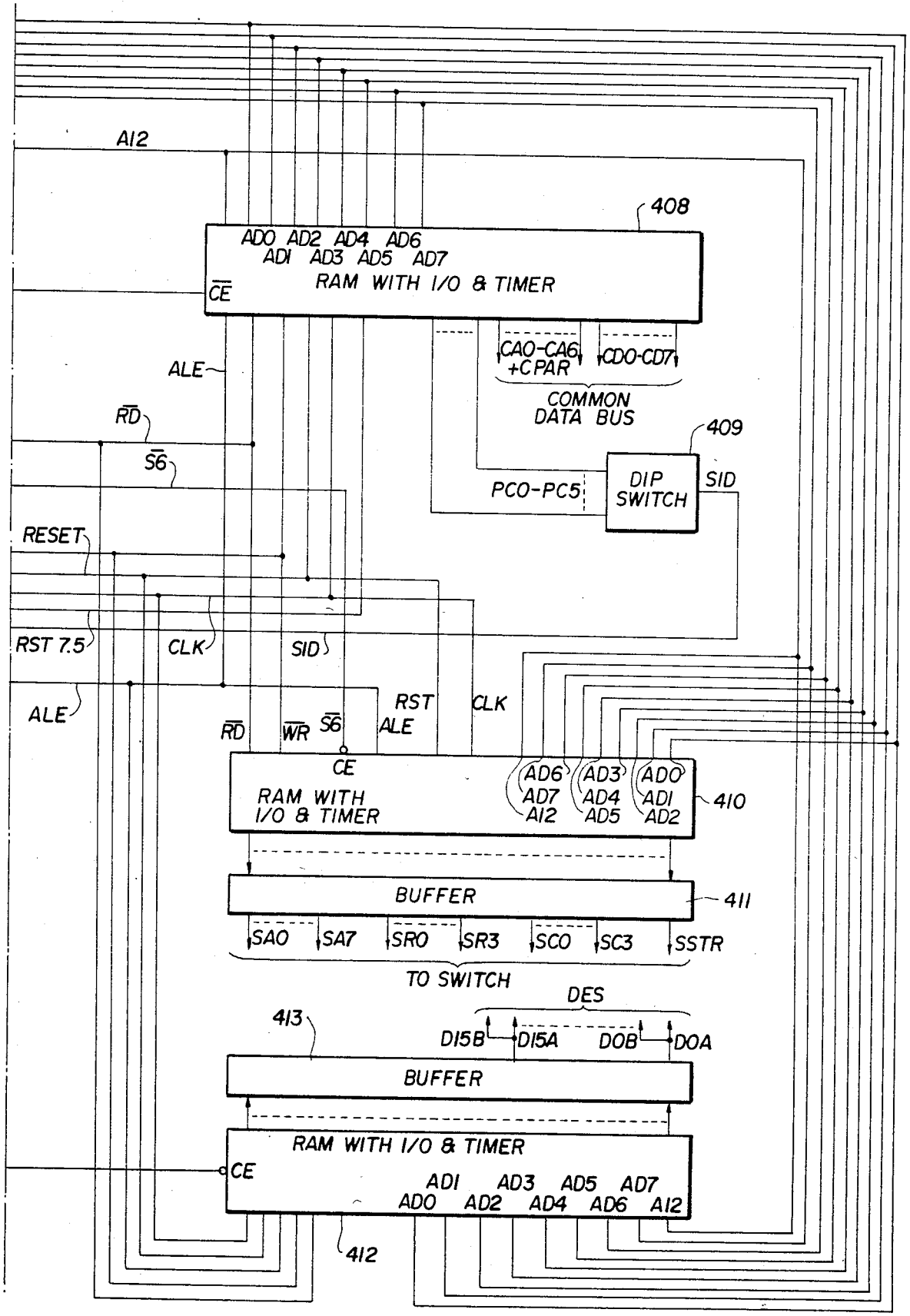

3.3 Switch Controller (FIGS. 2 and 4)

The switch controller 20 includes one switch controller master board 20 and (n−1) switch controller slave boards 20. Each board (either master or slave) handles row line grounding (deselect) for one group on SIDE 2. It accepts high-level instructions from the master controller 24 (such as make a connection between bD and AN) and performs the task of achieving that connection via proper signalling to the crosspoint array. The array consists of pairs of SCR's forming balanced connections, thereby providing the greatest amount of common mode noise immunity. In order to activate a selected crosspoint pair, it is necessary to first set up conditions to permit current flow between the selected column line and row line. In the present system, all column connections are through a source resistor to +12 volts. To permit current to flow, the row line pair must be grounded. After grounding the desired row line, an address signal must be sent to the particular crosspoint under discussion. The address selects the correct switch card 16 by specifying the switch card column group and row group. The one connection is then selected by determination of which column line (0-15) and which row line (0-15) on that switch card is to be activated.

Switch controller 20 makes a connection by grounding the selected row line, providing the proper crosspoint address, and sending a strobe signal to the switch card 16, which enables the one SCR pair in the matrix. Once this is done, current flows from the selected column line to the selected row line and a low impedance path is established between the incoming and outgoing lines in the array. No further action is required to maintain the connection. To break the connection, the switch controller removes the ground at the selected row line. Subsequent grounding of that line does not establish a connection unless that same crosspoint is re-addressed.

The switch controller 20 maintains in its memory an up-to-date table of all matrix connections. When the master controller 24 needs to know the status of crosspoint connections, it interrogates the switch controller to determine its condition.

Figure 5A:
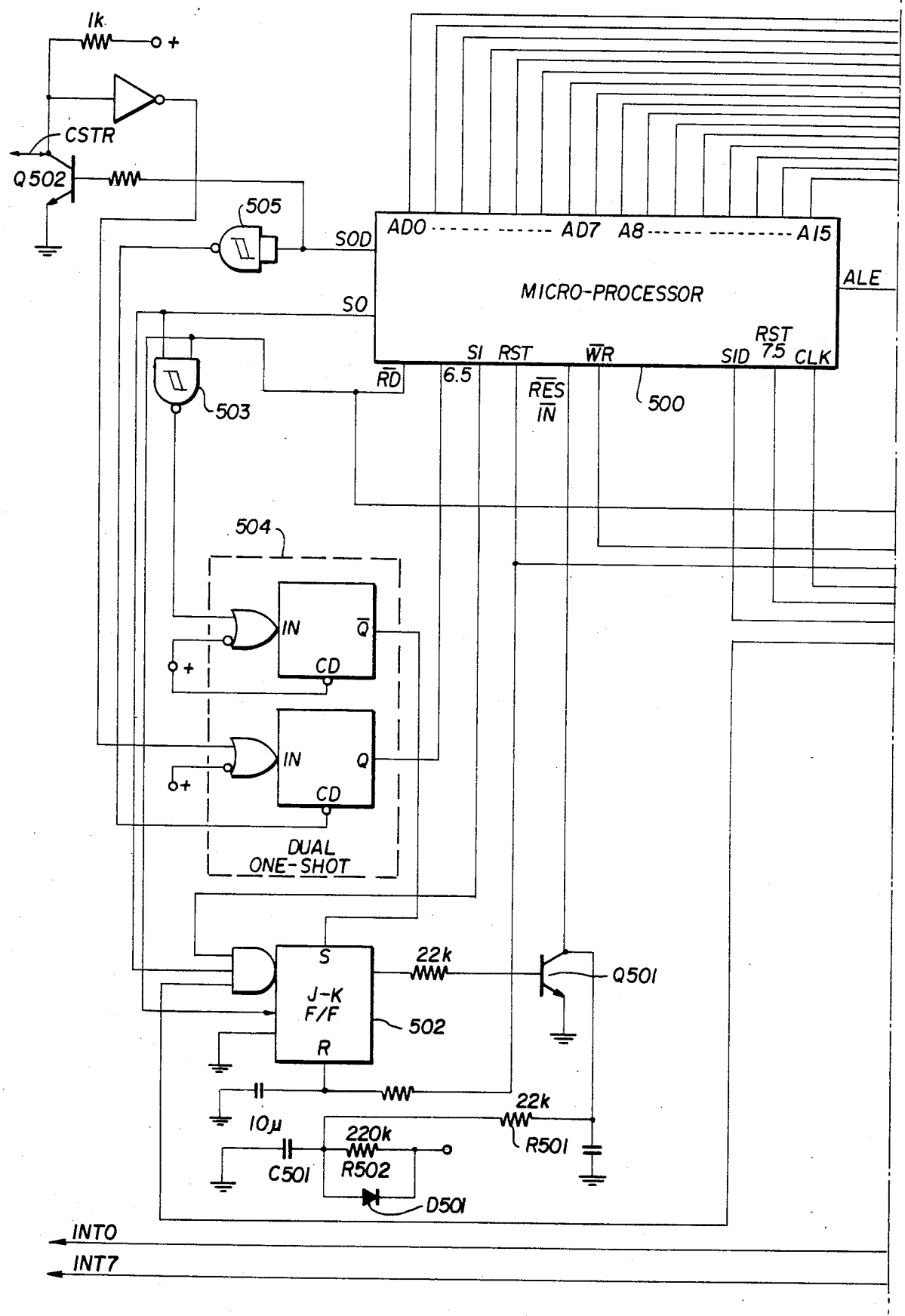
FIG. 5A-C is a schematic diagram of the coupler controller circuit employed in the system of FIG. 2.
Figure 5B:
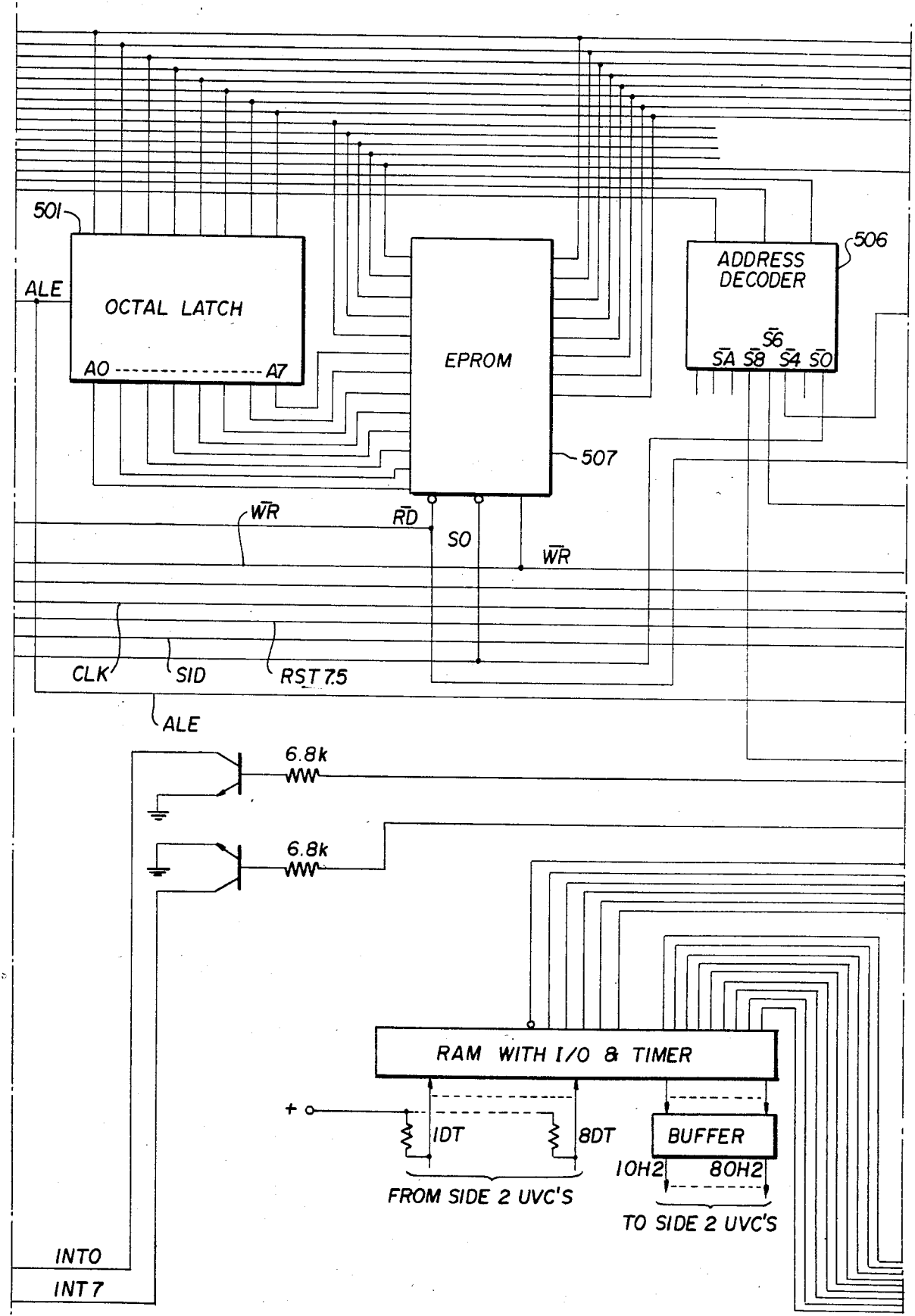
Figure 5C:
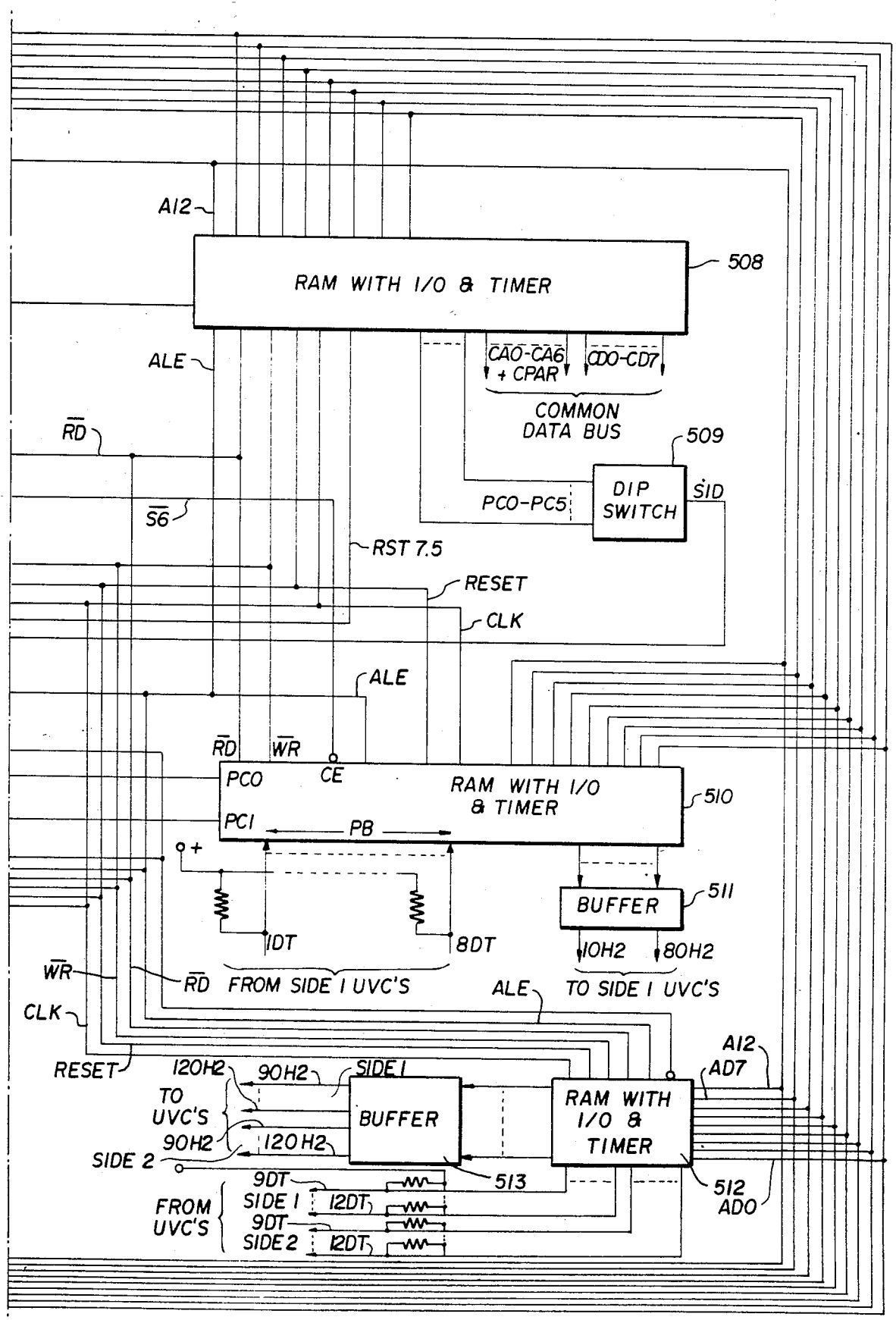

3.4 Coupler Controller (FIGS. 2 and 5)

One coupler controller 19 is used for each group (n, the size of the system). Each controller 19 monitors the ringing-in and line current status and controls the on-off-hook status of the 12 individual incoming couplers and the 12 individual outgoing couplers assigned to that group. When ringing-in is detected, coupler controller 19 notifies the master controller 24 and answers the line if so commanded. When a disconnect signal is detected, it hangs up the line and notifies the master controller.

The coupler controller forms a queue of incoming and disconnected calls and processes them when the master controller is ready to handle the information. Lists of lines for which ringing or disconnects are to be ignored can be created for various purposes. All lines can be taken on or off-hook on command, and timing constraints are set: the minimum duration of time for line breaks acceptable as a disconnect signal is settable to a variety of times; likewise, the minimum time for acceptance of a ringing-in; disconnect signals are ignored for 10 seconds after taking a line off-hook to ride through the click-over when dialing out; and line breaks are guaranteed to last at least two seconds to insure against accidental reseizure of a line just released.

Figure 6A:
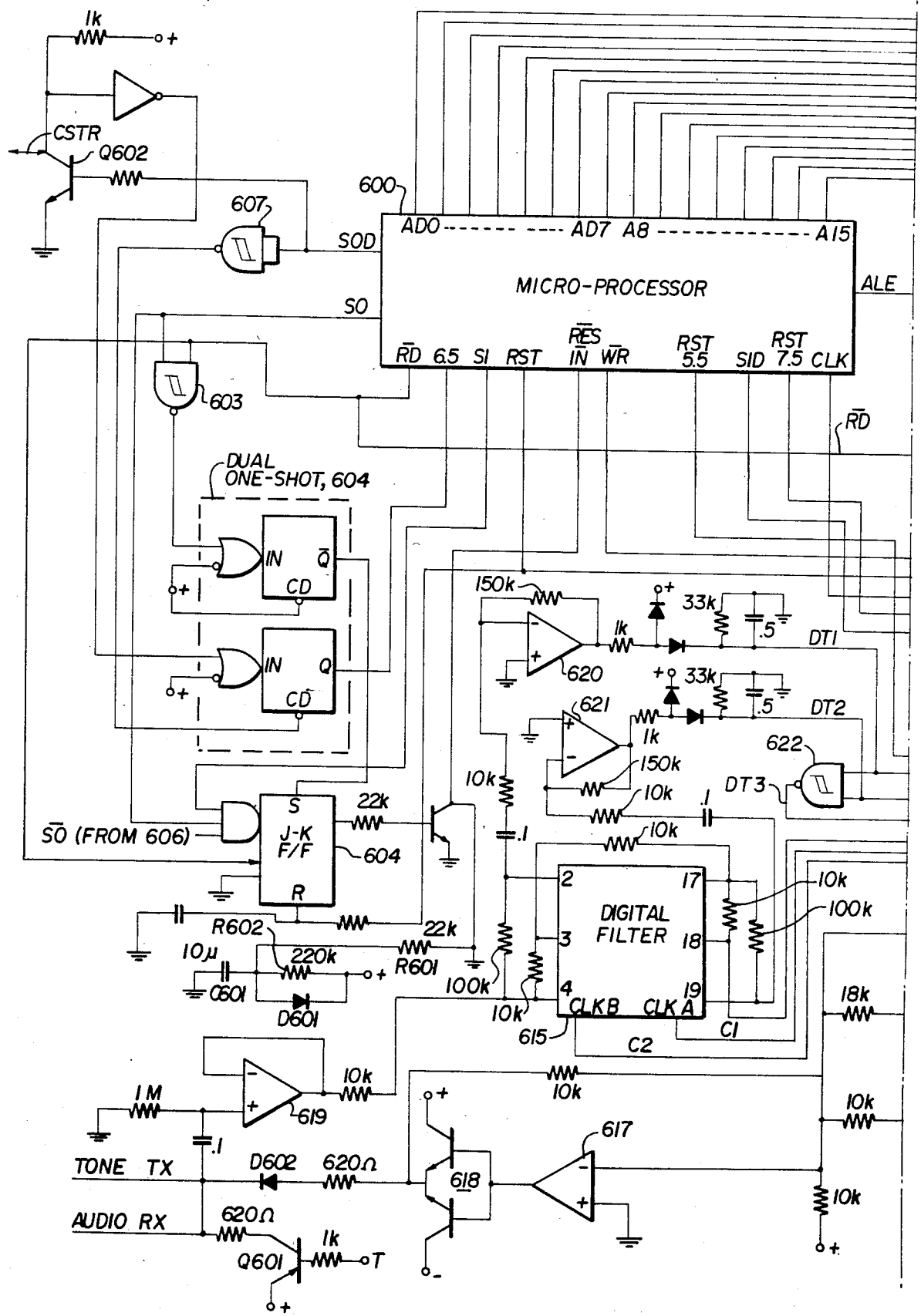
FIG. 6A-C is a schematic diagram of the tone controller circuit employed in the system of FIG. 2.
Figure 6B:
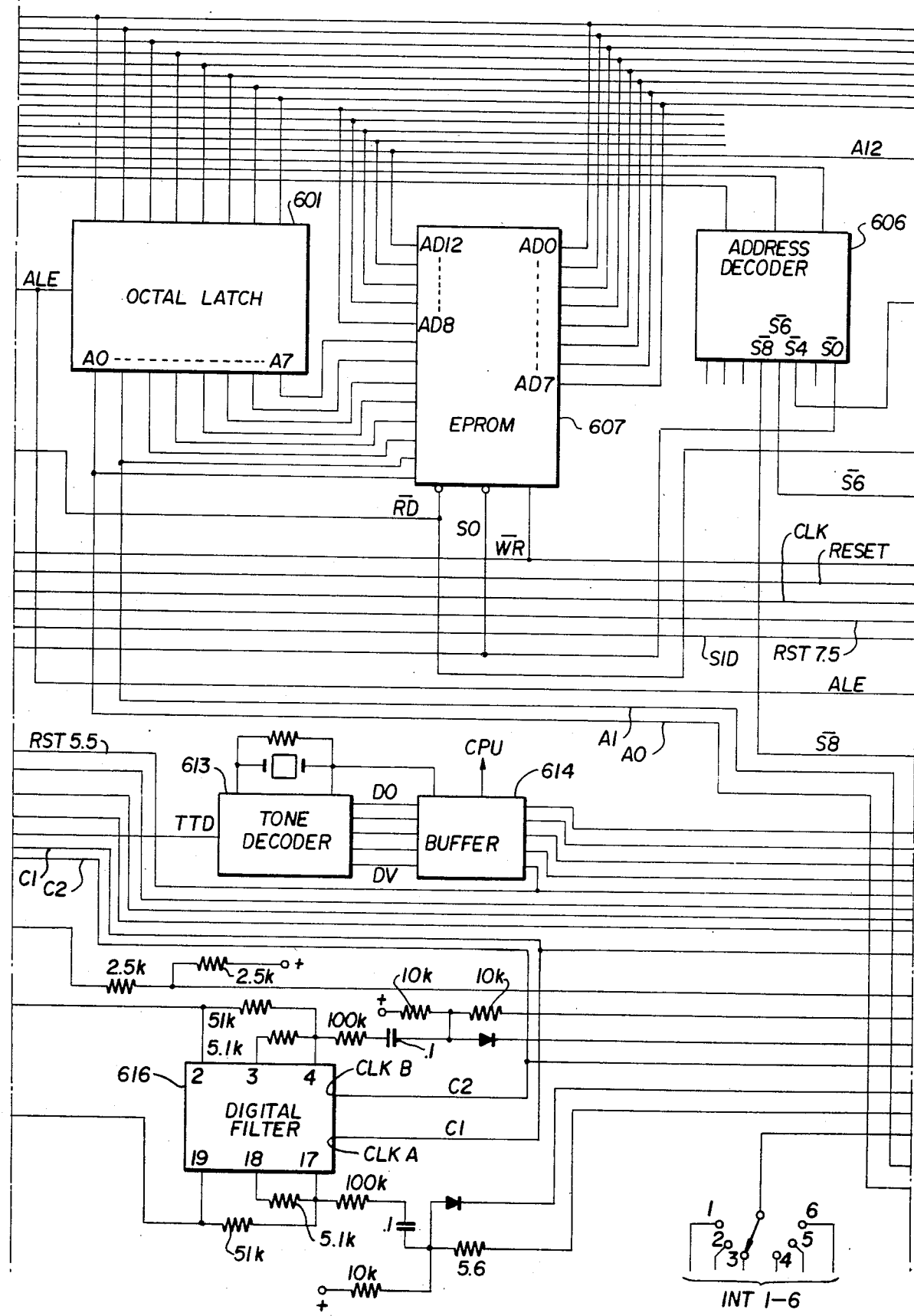
Figure 6C:
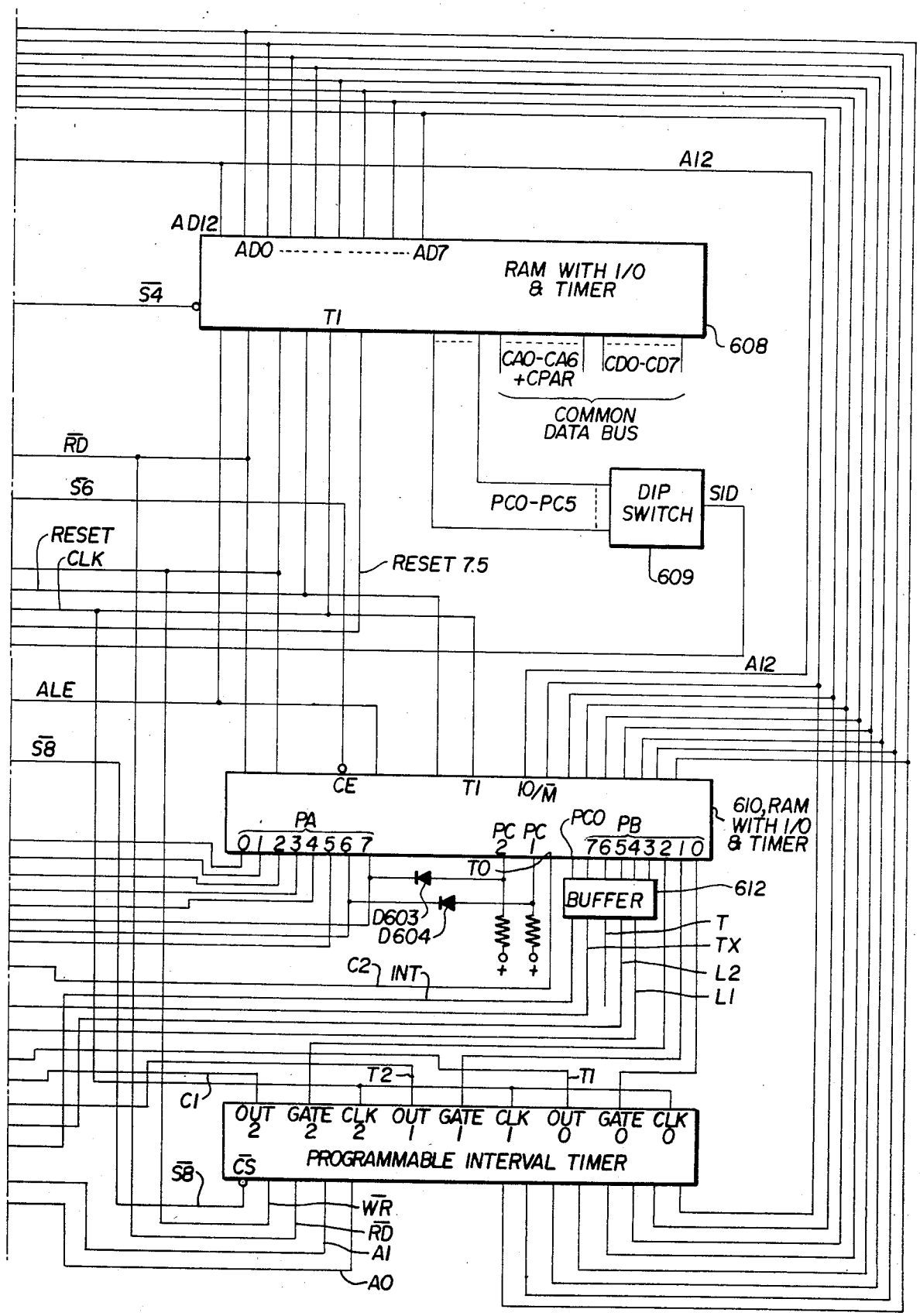

3.5 Tone Controller (FIGS. 2 and 6)

When an incoming call is answered, a tone controller 22 is assigned to that call and remains allocated until either the call is placed and the parties are connected together or the call is terminated for any reason. Therefore, the maximum number of calls which can be processed simultaneously is precisely the number of tone controllers in the system. There are approximately one third as many tone controllers as incoming lines, so statistically this number is almost always more than sufficient to have immediate availability of a free tone controller 22 for use on an incoming call.

The tone controller independently receives information from the customer, so no other board in the system need be tied up while the user is entering digits. Likewise, when dialing a number out, processing time is not required for any other board while waiting for dial tone or actually dialing a number.

Each tone controller 22 contains: a DTMF receiver to accept customer digit entry; a dial tone generator to produce a "ready" tone, indicating to the customer that the system is waiting for information; a "beep" generator to inform the customer of entry progress; a dial tone detector to permit recognition of local telephone line readiness; a DTMF generator to place outgoing calls and access to OCC's; and a "ready" tone detector to enable use with such OCC's. All of these hardware functions are software controllable, permitting flexibility in creating new dialing patterns and detection/generation facilities.

An LED lamp on the tone controller illuminates steadily when it is either waiting for incoming digits from a customer or is engaged in dialing an outgoing number. The lamp flashes when an action is completed and awaiting servicing by the master controller (whenever its interrupt line is lowered).

3.6 Internal Communications Prioritization

All controllers communicate with the master controller 24 through a parallel bidirectional communications bus. This consists of seven address lines, CA6–CA0; eight data lines, CD7–CD0; a parity line, CPAR; and a strobe line, CSTR. The master controller 24 commands a function controller via the following sequence. The master controller sends out the function controller address and the command. After a bus settling time, the master controller lowers the strobe line. All controllers read the address/data information on the falling edge of the strobe line, and the addressed controller accepts the command. After a fixed period of time, the master controller raises the strobe line and, if the command requires data parameters, they are sent after the command in sequence in the same fashion. When this is completed, the master controller then places the address and data bus into a high impedance receiving state. The addressed controller places the master controller's address (00) on the address bus, and the acknowledgement on the data bus. After a settling time, the addressed controller lowers the strobe line and the master controller receives the response. A fixed period of time later, the addressed controller releases all bus lines and the master controller is again in control of the bus.

The board communications bus addresses are set as follows: master controller, 00; switch controller, 01; coupler controllers, 10-1F, tone controllers, 41-7F (all hexadecimal notation).

Since all transactions on the communications bus are initiated by the master controller, the bus does not provide a means for function controllers to alert the master controller to conditions requiring servicing. These service requests are instead handled by a set of eight interrupt inputs to the master controller, INT7-INT0. Function controllers share these interrupt input lines. A function controller requests service by lowering an interrupt line. If more than one device is on one interrupt line, the master controller polls those devices to determine which is the source of the interrupt. When the conditions causing the interrupt are removed by proper servicing by the master controller, the interrupt request is removed.

The tone controllers 22 share interrupt lines INT6-INT1. Upon initial power turn-on, the master controller polls all tone controllers to determine which ones are attached to which interrupt lines, and stores the information in a table. When an interrupt is detected on one of these six lines, the master controller checks each tone controller recorded as being associated with that interrupt. Tone controllers provide an interrupt when all information has been received from the customer for call placement, when the customer has timed out on inputting supplying dialed digits, when an outgoing call has successfully been completed, or when an outgoing call has failed.

Each coupler controller 19 uses both INT7 and INT0. When a line rings in, is not blocked, and calls are not inhibited, the associated coupler controller 19 lowers the INT0 line. When a disconnect has been detected, INT7 is lowered. The master controller must always poll the coupler controllers 19 to determine the interrupt source, since all of them share the same pair of interrupt inputs.

The INT7-INT0 lines are level sensitive interrupt inputs to the master controller 24 prioritized with INT7 at the highest priority and INT0 at the lowest. This means that any interrupt input will be processed only if there is no higher level interrupt pending. The software is set up so that during processing of any of these external interrupts, no further interrupts can occur. This prevents any new interrupt, either higher or lower order, to be recognized after the processing of a prior one begins until that processing is completed (and, therefore, that interrupt has been released). The interrupt priorities govern, to a large extent, the operation of the switching system.

Any disconnect signal has top priority (INT7). This is because it takes very little time to process this request and frees up outgoing lines as soon as possible to promote the most economical route selection by the LCRC. After all disconnect requests have been handled, tone controller interrupts are serviced; these are required to complete the call transfer. When no other actions are pending, ringing-in interrupts are recognized and the new calls are answered and assigned to tone controllers.

Figure 7:
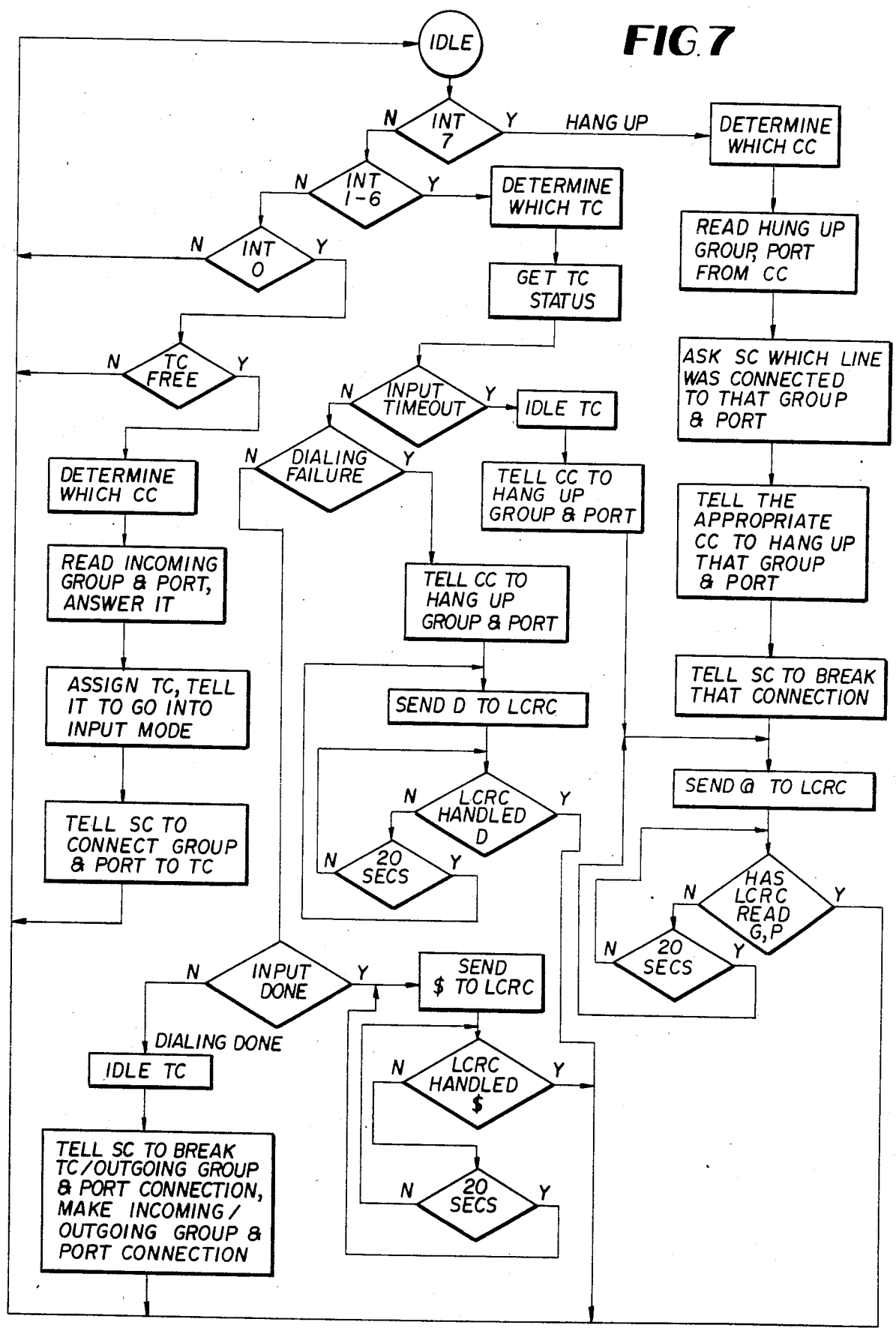
FIG. 7 is a flow chart of the interrupt operation sequence in the system of FIG. 2.

A typical call sequence is illustrated in the flow chart of FIG. 7 and is described as follows. An incoming ring is detected by a coupler controller 19 which lowers its INT0 line. The master controller interrupts its main program and polls the coupler controllers until it locates the one with its interrupt activated. The master controller checks its list of busy tone controllers 22 and, if one is available for use, that tone controller is allocated to the incoming call. The master controller instructs the receiving coupler controller to answer the call, taking the incoming line off-hook, and INT0 is released. The master controller then instructs the switch controller 20 to connect the incoming line to the selected tone controller, after which the available tone controller is instructed to process an incoming call. The master controller then returns from the interrupt program and resumes its main program since the INT0 lines is now relinquished.

The allocated tone controller lowers its interrupt line (e.g., INT3) when the user has completed his request. The master controller interrupts its main program, makes this call the current call, and alerts the LCRC 14 which reads pertinent information relating to this call from the master controller, effectively relaying the user request from the tone controller. The LCRC places the call and master controller 24 commands switch controller 20 to break the connection between the incoming line and the tone controller and make a connection between the tone controller and the selected outgoing line. The coupler controller 19 associated with the selected outgoing line is commanded to take that line off-hook. The tone controller is instructed to dial into the outgoing line, and it released INT3. The master controller returns from the interrupt routine.

After the outgoing telephone number has been sent, the tone controller again lowers its INT3 line, interrupting the master controller. The master controller instructs the switch controller to break the connection between the tone controller and the outgoing line, and to establish a connection from the incoming line to the outgoing line. The tone controller is commanded into the idle mode, causing it to release INT3. The master controller clears the allocation list for that tone controller and returns to the main program.

A disconnect is detected by the coupler controller when one party hangs up. This coupler controller immediately places that line on-hook and lowers its INT7 line. This interrupts the master controller which polls the coupler controllers to determine which coupler controller generated the INT7. The master controller then reads the group and port which was disconnected, causing the coupler controller to release its INT7 line. The master controller then interrogates the switch controller to determine what that telephone line was connected to and finds the opposite party in the conversation. The appropriate coupler controller is commanded to place that line on-hook and LCRC 14 is notified. The LCRC reads which group and port initiated the disconnect, and the master controller returns from the INT7 interrupt. At this point, everything is in the same condition as at the start of the sequence.

Figure 8:
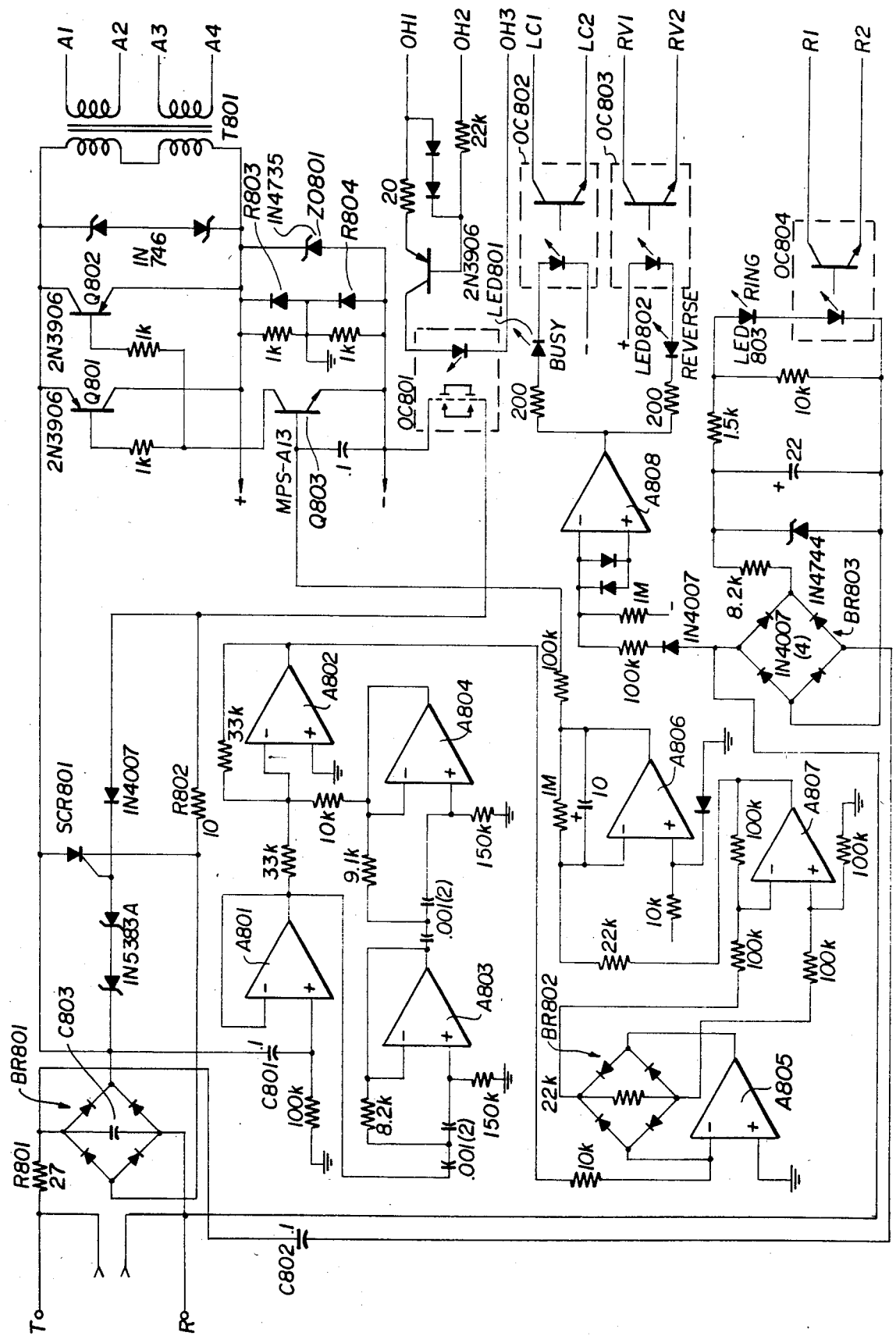
FIG. 8 is a schematic diagram of a universal voice coupler circuit employed in the system of FIG. 2.

3.7 Universal Voice Coupler (FIG. 8)

The universal voice coupler is one of twelve identical circuits employed in each coupler cage 17 and is the interface between the switching system and the telephone lines. It is a loop start coupler; however, it can still be used with ground start lines for incoming calls since a ground is only required to draw dial tone. The circuit is all solid-state and includes overvoltage and overcurrent protection.

The coupler connects to a coupler controller 19 with a detect output and an ON/OFF-HOOK input (OH1-,OH2). The input is used simply to draw loop current or go open circuited; the output is a combination of several signals. The voice coupler detects ringing (R1,R2), forward and reverse line current (RV1, RV2). These three outputs are paralleled together to form the detect output. If the coupler is in the on-hook mode, the DETECT line goes low, then it must be ringing, and the coupler controller detects it as such. If the coupler is off-hook, then DETECT goes low only if telephone line current is present. When this signal disappears, theh there has been a break in line current and, depending upon the length of this signal, the coupler controller may interpret this as a disconnect indication.

The audio connections from the coupler are made to the switching matrix via a split secondary output transformer which is used strictly as a centertapped winding. This is the entry point for supplying source current to the SCR's in the columns, and the grounding point for sinking current from the rows, in the matrix. The use of the centertap provides a balanced system for maximum common mode noise rejection and minimum crosstalk between pairs not connected in the array.

There are three LED lamps on the front panel of the universal voice coupler. A red indicator illuminates during the presence of ringing voltage, a green lamp lights when forward loop current is present, and a yellow LED indicates the presence of reverse loop current.

Figure 9A:
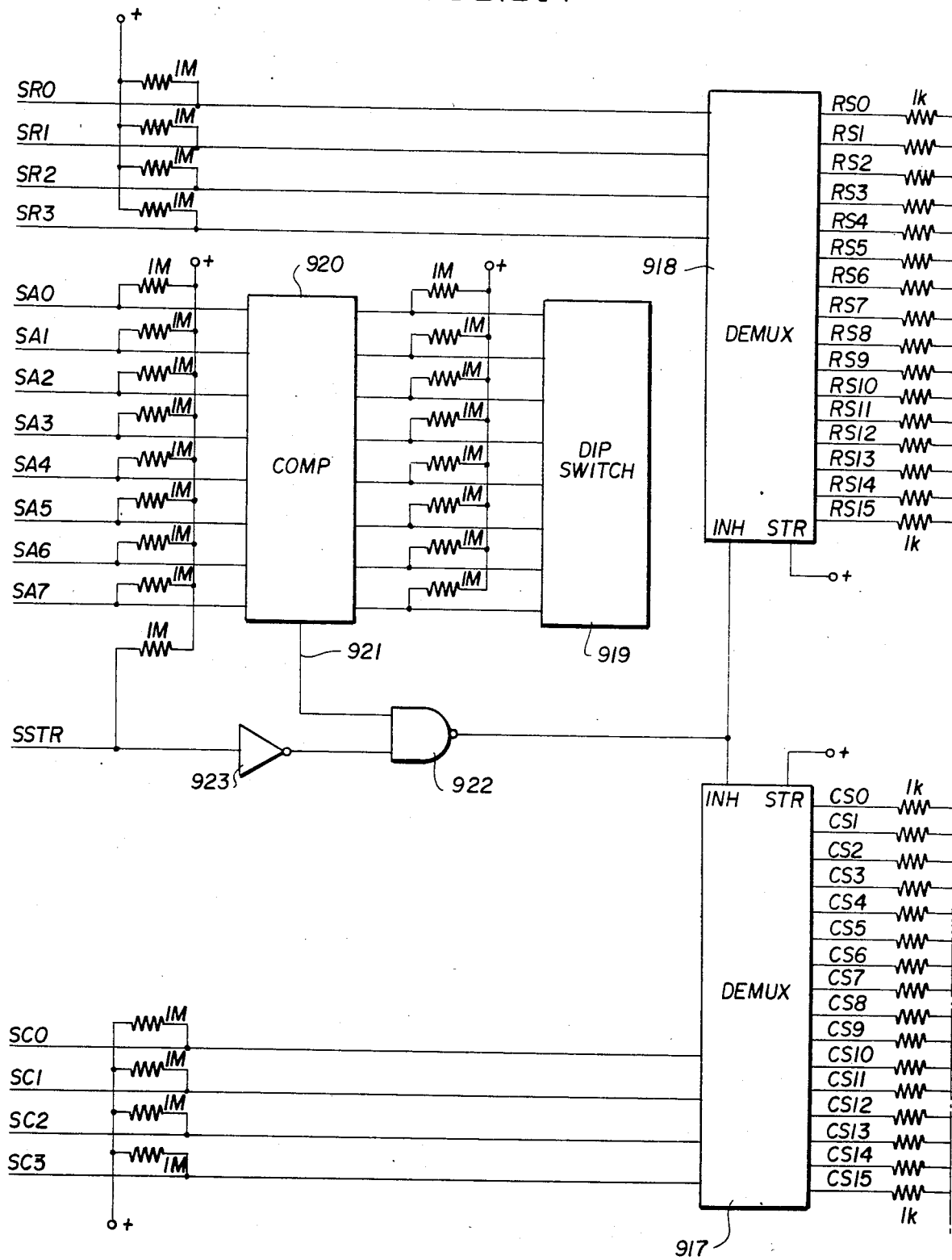
FIG. 9A-B is a schematic diagram of a switch card employed in the system of FIG. 2.
Figure 9B:
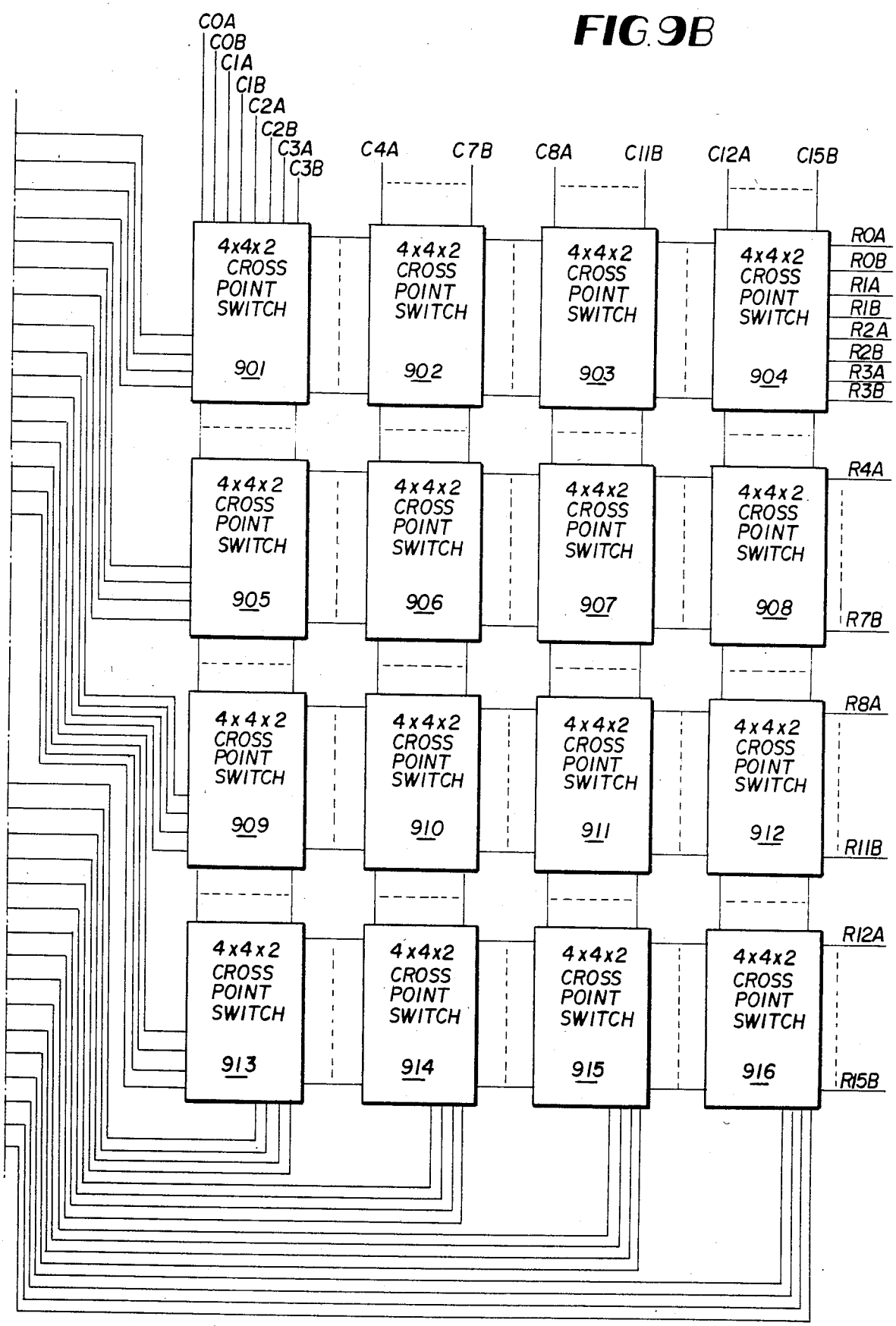

3.8 Switch Card (FIGS. 2 and 9)

Each switch card 16 contains sixteen crosspoint integrated circuits, each a 4×4 balanced switch array, to produce a 16×16 switch array. Column and row select decoders address the particular crosspoint desired, and these decoders are driven by board select logic. An 8-position DIP switch sets the group row and column, specifying the switch card's position in the overall matrix 12. Logic is provided to utilize a strobe input which generates the select pulse to the SCR pair.

Figure 10:
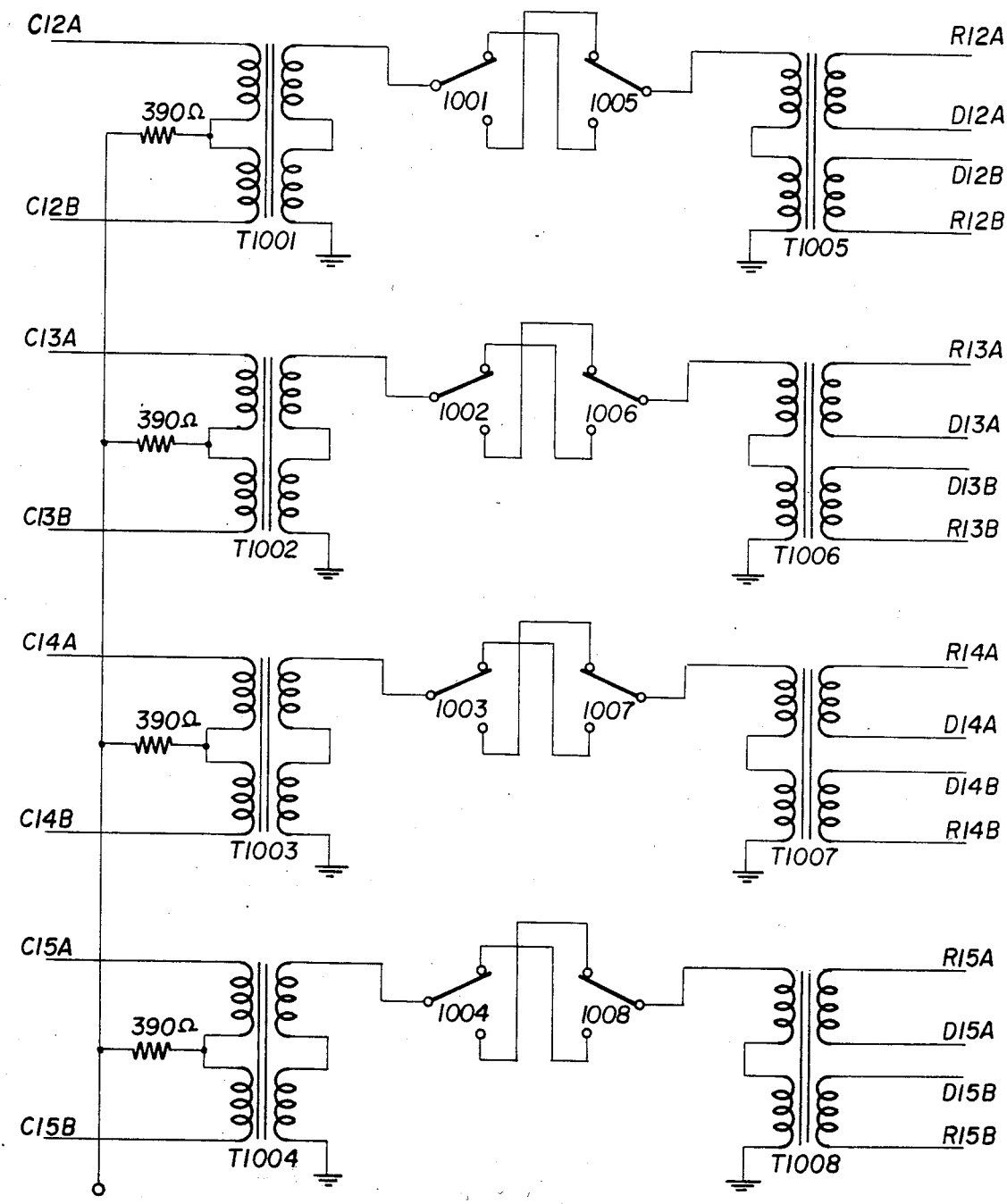
FIG. 10 is a schematic diagram of an audio card employed in the system of FIG. 2.

3.9 Audio Circuit (FIGS. 2 and 10)

The audio circuit 21 is used to couple audio to switch array rows and columns in much the same way the universal voice coupler mates the telephone lines to the array. It contains eight transformers, four for column connections and four for row connections to the switch. The column centertaps provide source current for the SCR's, and the row centertaps provide a means to sink current from the SCR's. The external side of the transformers are connected to subminiature audio jacks, represented schematically as switches in FIG. 10, so that one audio connection can automatically be made between both a row and a column. If desired, the two paths may be separated simply by inserting two plugs instead of one.

4. HARDWARE DESCRIPTION

This section describes the hardware of system subcomponents.

4.1 Universal Voice Coupler

Referring to FIG. 8, the basic element in the coupler is a balanced 600 ohm audio transformer T801. This provides isolation between the telephone line T.R and the user audio connections A1, A2, A3, A4. The user audio connections are connected directly to the transformer windings. The telephone line passes through a resistor R801 to a bridge rectifier BR801, which creates a constant polarity output voltage. This voltage supplies power for the internal circuitry. The positive bridge output line is coupled through the transformer windings to a zener diode ZD801 and then to an optocoupler OC801, through a current sensing resistor R802, back through the bridge rectifier to the phone line. Optocoupler OC801 has an FET output with a 300-volt breakdown rating and is an SPST device used to place the voice coupler on or off-hook. With OC801 open, no d.c. current can flow, unless the overload circuit has been triggered. The zener diode regulates 6 volts to power the line circuit; —it is split by two resistors R803 and R804 into +3 and −3 volts.

Zener diode ZD801 presents a near constant voltage drop and therefore does not appreciably attenuate the telephone audio signal. Under normal operation, the audio to and from the telephone line passes directly through the coupling transformer with little loss. However, in order to pass FCC specifications for registration as a fully protected voice coupler, the average signal power delivered into the telephone line must be kept below −9 dBm, 4000 Hz signals must be greatly attenuated, and frequencies above the voice band must roll off at a specified rate. Since this coupler is 2-wire and not a 4-wire hybrid, there is no separation between the transmit and receive paths. Therefore, a filter cannot simply be placed in the transmit path to satisfy regulations. Instead, a circuit is used to parallel a low impedance with the transformer, attenuating the audio impressed across the transformer primary and secondary. Two PNP transistors Q801 and Q802 bridge the telephone line side of the transformer; as these conduct, a low a.c. impedance appears across transformer T801.

Shorting transistors Q801 and Q802 are driven by an NPN Darlington transistor Q803 which is driven by the output of a signal sampling/control circuit. The line audio is sampled at the positive output of the telephone line bridge rectifier BR801 through a capacitor C801 to an op-amp voltage follower stage A801 (providing a high impedance input and low impedance output). The output of this stage passes through two paths: to a unity gain input on a summing amplifier A802; and to a two-stage high pass filter A803, A804 which also feeds 10 dB of peaking at 4000 Hz, has a 10 dB loss at 3000 Hz, and drops off at 24 dB per octave below that frequency. The output of the summer A804, then, has essentially unity gain from 20 Hz to 3000 Hz, 20 dB gain at 4000 Hz, and levels off to 10 dB gain above 4000 Hz. This signal is fed into a precision full-wave rectifier including diode bridge BR802 and amplifier A805, integrated at A806 level shifted at A807 to drive the base of transistor Q803. This forms a feedback path which causes the shorting circuit to function when the input signal is above a certain threshold; shunting is increased until the input signal drops to a specific point. The gains are set so that midband voice frequencies are reduced to nominally −12 dBm if inputs are presented greater than this value. Energy at 4000 Hz is compressed to less than −27 dBm (with up to 0 dBm input level, above which some leakage occurs).

The forward and reverse line current opto-coupler outputs OC802 and OC803, respectively, are driven from a comparator operational amplifier A808 which senses an input leg of the line bridge rectifier BR801. If no line current is present, there is no power to operate the circuit and the outputs are open; if power is present, the comparator A808 turns one of the two sensors on. The busy LED801 and reverse LED802 are connected in series with their respective opto-isolators OC802 and OC803. The input LED in the opto-coupler OC801 is driven by a 20 ma constant current regulator activated by the on/off hook (OH2) lead.

The a.c. ringing voltage is isolated by a 1 mfd capacitor C802 and rectified with a bridge circuit BR803. This a.c. voltage is filtered and sent to ring LED803 and ring opto-coupler OC804.

If potential greater than 280 volts appears at the output of the line bridge rectifier BR801, two 140-volt zener diodes ZD802, ZD803 conduct, triggering SCR801. This clamps the input voltage through resistor R801, protecting the circuit. When line current breaks, SCR801 releases. If more than about 150 ma flows through the d.c. path of the circuit, the drop across resistor R802 also triggers SCR801, providing overcurrent protection. A capacitor C803 shunts the d.c. circuit to prevent short pulses from reaching the device and triggering the overcurrent or voltage protection modes.

The signal power limiting circuit limits over a several second average time period. Zener diodes ZD802, ZD803 are placed in series across the transformer T801. These limit the instantaneous output to +10 dBm.

4.2 Switch Card

Referring to FIG. 9, the switch matrix circuit contains support electronics and sixteen crosspoint chips 901–916. Each chip contains sixteen SCR pairs with associated driver transistors. The resulting 16 by 16 balanced matrix only requires select logic to complete its function. To select a particular crosspoint pair, the respective column select line CS0–CS15 must go high, and the respective row select line RS0–RS15 must go low. A four-to 16-line decoder 917 with active high outputs provides the column select lines CS0–CS15 through respective 1000 ohm resistors. These lines are normally low, and the one selected line goes high when the decoder is not inhibited. The line selected is determined by the binary value of SC0–SC3 (switch column) received from the switch controller (FIG. 4). Similarly, a four to 16 line decoder 918 with active low outputs provides the row select lines RS0–RS15 through respective 1000 ohm resistors. These lines are normally high and the one selected line goes low when the decoder is not inhibited. The line selected is determined by the binary value of SR0–SR3 (switch row) received from the switch controller (FIG. 4).

Switch board select lines SA0–SA7 (switch address) are received from the switch controller (FIG. 4) and compared with the DIP switch 919 setting at comparator 920. If the SA lines agree with the board address manually set at DIP switch 919, output line 921 goes high. The inhibit inputs of decoders 917 and 918 can only go low (uninhibited) when both inputs of NAND gate 922 go high. This happens when the board address equals the SA lines and SSTR (switch strobe) is low. Therefore, the row and column select lines cannot be activated until the appearance of the strobe pulse from the switch controller master. Inverter 923 inverts and buffers the SSTR signal, adding noise immunity to that line because inverter 923 and NAND gate 922 are preferably a dual 2-input Schmitt trigger NAND gate, providing hysteresis. All inputs to these CMOS gates are pulled up with 1M resistors to prevent floating inputs should the system be powered up without a switch controller master card plugged in.

4.3 Audio Circuit

Each audio circuit 21 is illustrated in detail in FIG. 10 and contains eight transformers T1001–T1008, four on the column lines (T1001–T1004) and four on the row lines (T1005–T1008). The inner terminals of the matrix side of the row transformers T1005–T1008 are separately brought out to an edge connector on the front of the board as signals D0A, D0B, D1A, D1B, D2A, D2B and D3A, D3B. The outer terminals of these transformers are brought out to another edge connector as row signals R0A, R0B, R1A, R1B, R2A, R2B and R3A, R3B connected to the switch. The outer terminals of the column transformers T1001–T1004 are brought out to still another edge connector as column signals C0A, C0B, C1A, C1B, C2A, C2B and C3A, C3b, which are also connected to the appropriate switch card. The inner terminals of the column transformers are connected together in pairs through respective 390 ohm source resistors to +12 volts.

The nonmatrix side of the transformers T1001–T1008 are connected to eight respective subminiature audio jacks 1001–1008, illustrated schematically as switches. These jacks are arranged in pairs so that if only one plug is inserted into each pair, the corresponding row and column transformer pair is paralleled. This is done in order that the audio source (such as a tone controller) can be connected to any SIDE1 (column) or SIDE2 (row) line in the switching matrix. If it is necessary to separate these sides, all that need be done is to use two plugs for each transformer pair.

4.4 Common Controller Circuitry

The microprocessor section of the four controllers (master controller 24, switch controller 20, tone controller 22 and coupler controller 19) is nearly identical. These similar parts form an 8085A-based microprocessor manufactured by Intel Corporation. In the following description of common controller circuitry, reference is made to the master controller illustrated in FIG. 3. It should be noted that the same description applies to the tone controller (FIG. 6), switch controller (FIG. 4) and coupler controller (FIG. 5) with similar reference numerals employed for like components except for the first digit which identifies the Figure number. Thus, element 301 in the master controller drawing corresponds to elements 401 (in the switch controller of FIG. 4), 501 (in the coupler controller of FIG. 5) and 601 (in the tone controller of FIG. 6).

Microprocessor 300 is an 8085A nMOS central processing unit (CPU). It is an eight bit processor with 16 bits of address space. The data bus and the lower eight bits of the address bus are multiplexed onto a single address/data bus (AD0-AD7). When the address latch enable (ALE) output goes high, the AD bus contains the address lines A0-A7. The upper eight bits of the address bus are unmultiplexed and directly exit the CPU at A8-A15. The read (RD) control output goes low when the CPU is reading external memory; the write (WR) control output goes low when the CPU is writing to external memory. The clock output (CLK) is the input clock frequency divided in half. The RESET output goes high when the system is being reset, and is used to reset all circuits external to the processor.

If the reset input (RESIN) is grounded, a hardware reset operation is performed, causing the RESET output to go high. The reset input is lowered under several different conditions. The line is connected through a resistor R301 to a capacitor C301 pulled high through resistor R302. At power turn on, capacitor C301 is discharged through parallel-connected diode D301 to +5 volts (which is low by virtue of no power) and a reset operation is performed. After one to two seconds, capacitor C301 charges up to the threshold input level in the reset input of the CPU 300, and the reset operation ceases. This time constant is long enough to permit the power supplies to stabilize. Similarly, if the anode of diode D301 is otherwise grounded, capacitor C301 is discharged and a reset occurs.

The reset input can also be driven low by NPN transistor Q301 which is driven by a JK flip-flop 302. This flip-flop output goes high when an instruction fetch is performed and the ROM in CPU 300 is not enabled. The instruction fetch is detected by gating the status outputs (S0, S1) of the CPU. The select 0 line S0 is low when the CPU ROM is accessed; thus, if all three J input signals of the flip-flop are high, then an instruction fetch is being performed without the ROM selected. Since the CPU program is contained in the ROM, this is a condition which should never exist under proper operation; therefore, a reset pulse is generated to restore the system to normal operation. Flip-flop 302 is cleared when the RESET signal arrives.

Another condition exists wherein the flip-flop 302 is set and a reset pulse generated. A retriggerable one-shot multivibrator (NAND Schmitt trigger) 303 is continuously fired by the detection of the instruction fetch condition. Should the length of time between these fetches exceed the pulse width of dual one-shot 304, the output signal from one-shot 303 goes high, setting the upper one-shot circuit 304 and initiating a reset operation. Thus, if the CPU stops executing instructions, an automatic reset is effected.

The SOD output line of the CPU drives the communications strobe line (CSTR) through NPN transistor Q302. This point is pulled up with a one Kohm resistor at the master controller, and a one megohm resistor at the other controllers. The status of this strobe line is also buffered by a Schmitt trigger NAND gate 305. The second half of one-shot 304 is configured as a latch and triggered by the output of the NAND gate 305. The Q output of this latch goes high on the high-to-low transition of the CSTR line. This output is applied to the RST6.5 interrupt at the CPU300. This interrupt is cleared when SOD goes high.

Octal latch 301 latches the AD0-AD7 bus in response to the ALE signal to demultiplex the A0-A7 address lines. A three-to-eight line decoder 306 supplies eight device select lines, S0-SE. One of these lines goes low to select the particular device to be read from or written into by the CPU300. The SO line goes low for addresses from 0000-1FF (hexadecimal), S2 for 2000-3FFF, etc.

An EPROM 307 (or RAM, or combination of the two, depending upon requirements) are provided for memory. EPROM 307 is selected by S0; an additional memory unit, if needed, is selected by S2.

A random access memory (RAM) with I/O ports and timer 308 is connected directly to the CPU bus lines and is selected by address code S4. This memory may be a model 8155H made by Intel Corporation which incorporates 256 bytes of RAM, 22 bits of input/output, and a 14-bit timer/counter in a single package. The memory is at locations 4000-40FF, I/O at 5000-5003, and the timer is addressed at 5004-5005. The timer input (TI) is the CLK signal from CPU300, and the timer output (TO) feeds the RST 7.5 interrupt input as the CPU. The software programs the counter in RAM308 to divide the clock signal down to a 1000 Hz signal, thereby providing a one millisecond interrupt for the CPU. Internal timing in the processor is keyed to this crystal controlled frequency.

Sixteen bits of the available I/O lines are used for the communication lines CD0-CD7, CA0-CA6, and CPAR. The remaining five bits are inputs PC0-PC5 set to read DIP switch 309. One of the switch positions is ready by the SID (serial input data) input on the 8085. DIP switch 309 is used for different purposes on the individual controllers.

4.5 Master Controller

The master controller 24 is illustrated in detail in FIG. 3 and includes an overall reset switch 310 which is a momentary SPST switch used to ground the anode of diode D301. An external reset input can also be applied to a jack on the board. The internal oscillator in CPU300 is used to generate the clock. The master controller requires a high tolerance time reference because it functions in part as the entire system clock; all telephone call starting and ending times are referenced to this time.

An Intel 2764 EPROM is used as the primary memory 307 and a CMOS RAM can be additionally employed, giving the master controller 8K bytes of program storage and 2K bytes of read/write memory.

The INTR (interrupt request) input to the CPU300 can be used with external circuitry to create additional interrupt inputs over the RST 5.5, 6.5 and 7.5 interrupts, which are handled completely internally in the CPU. In the master controller, EPROM311 and tri-state expandable eight-function gate 314 are used in conjunction with INTR to add eight interrupt inputs to the processor, namely INT0-INT7. These inputs drive gate 314 which is a CMOS AND gate so that if any of these lines go low, and this group of interrupts is enabled via the OE (output enable) input of the gate, INTR goes high through inverter 315. When this occurs, and if the CPU has interrupts enabled internally, the current instruction under execution is completed and an external interrupt cycle begins. This cycle is identical to a normal read cycle except that instead of the RD control output going low to read an instruction from program memory, the INTA (interrupt acknowledge) output of the CPU goes low. EPROM311 is activated o this signal and places an instruction on the processor bus. The particular instruction depends upon the INT0-INT7 inputs, which also drive the address inputs of that EPROM. EPROM311 is programmed to behave as a priority encoder so that the RST n instruction is jammed onto the bus if no interrupts above INT n are low. The CPU RST instruction is specially tailored for use in this fashion; i.e., it is a single byte CALL instruction. The CPU jumps to eight different memory locations dependent upon the eight INT inputs, where an appropriate interrupt service routine is expected to be found.

A USART (universal synchronous/asynchronous receiver/transmitter) 312 is used for a serial interface. It is connected to the bus signals and is selected by the S6 decoder address command from decoder 306, making its addresses 6000 and 6001. The serial output data appearing at the TXD (transmitted data) line is level shifted by an operational amplifier 316 into +/−5 volts and sent to LCRC 14. The request to send (RTS) output is similarly buffered by amplifier 317. Serial data coming from LCRC 14 is converted by an NPN transistor Q303 into logic levels for input to the RXD (received data) pin on USART 312. The clear to send (CTS) signal is handled the same way, being converted by NPN transistor Q304.

A data available output (DA) from USART 312 is connected to the RST 5.5 interrupt on the CPU300. This generates an interrupt when a character has been received by the USART, and is ready to be read by the CPU. A general purpose output bit DTR (data terminal ready) is used to inhibit the INT0-INT7 circuit, and a general purpose input bit DSR (data set ready) is connected to the power fail input jack. This signals when backup inverter power is being used.

A triple sixteen bit programmable interval timer 313 is connected to the processor bus and is selected by the S8 (addressed from 8000-8003) selection command from address decoder 306. Two of the clock inputs (CLK0 and CLK2) are derived from a flip-flop 318 used to halve the CLK frequency (down to a point where the interval timer 313 can operate). One of the interval timer sections generates the BAUD rate clock for the USART 312, providing a totally software controlled baud rate for the serial interface. The choice of 6.144 mHz for the CPU 300 crystal frequency is to permit exact standard baud rates, particularly for the higher rates. The second divider section of timer 313 is programmed to divide down to 200 Hz for the "busy" tone.

This divider section is gated at G2 by the output 01 of another divider section with an input from the RST7.5 line (a 1000 Hz signal) which is programmed to produce a 2 Hz output. The result is a 200 Hz tone interrupted twice per second and is filtered by a low pass filter 319, buffered for low impedance output at 320, and presented to the BUSY TONE output jack.

4.6 Switch Controller

The switch controller 20 is illustrated in detail in FIG. 4 and includes one master switch controller and from zero to fifteen slave switch controllers. The slaves use a largely depopulated master switch controller board.

Switch Controller Master

The internal oscillator in CPU400 is used with a 6.0 mHz crystal. The RST5.5 and INTR interrupts are not used and are grounded. APROM 407 is used as the memory. A second RAM with I/O and timer 410 is used for switch address selection, activated by the S6 line from address decoder 406. The output ports of RAM 410 drive open collector logic buffer inverters 411 to drive the switch card CMOS 12 volt logic. The RAM 410 at addresses 6000-60FF is used for variable storage, the output ports at addresses 7001-7003 drive the switch cards, and the timer/counter is unused.

Switch Controller Slave

All circuitry in each of the slave circuits includes and is identical to RAM 412, buffer 413 and demultiplex unit 414 at the master switch controller. This section produces the deselect logic to sink current from the crosspoints at the switch circuit of FIG. 9.

A RAM with I/O and timer 412 drives open collector logic buffer 413 with outputs to the DES (deselect) connectors. An additional stage of address decoding is used for these deselect outputs. An address decoder/demultiplexer 414 is foremost selected by signal S8, placing the outputs at 8XXX; A11 (at EA, enable A11) can be jumpered to ESL (enable select low), or to ESH (enable select high), restricting the addresses below or above 88XX; address lines A8-A10 are decoded into enable outputs E0-E7. ES (enable select) is the device select line for the RAM 412. If ES is jumpered to E0 as shown, and A11 is jumpered to ESL (requiring that ESH be jumpered to + voltage), then RAM 412 has an I/O base of 9000, placing the RAM outputs at 9001-9003. The switch controller master is always configured in this way. The first seven slave boards are jumpered the same, except that ES is connected to one of E1-E7, placing the I/O bases at 9100, 9200, . . . 9700. All subsequent slave boards must have ESL jumpered to ground, and ESH to A11. The ES jumpers are successively connected to E0-E7, placing these I/O bases at 9800, 9900, . . . 9F00.

The internal RAM 412, addressed at 1000 below the I/O base, is used by the program to store the switch matrix connection status (in this fashion, the memory required grows naturally with the switch size); the timer/counter is not used. The switch controller slave boards connect to the switch controller master board through an edge connector which contains all of the bus signals required to interface the RAM 412 to the rest of the controller.

4.7 Coupler Controller

The coupler controller is illustrated in detail in FIG. 5. The internal oscillator of CPU 500 is used with a 6.0 mHz crystal to generate the clock for the coupler controller. The RST5.5 and the INTR inputs are not used and are tied low. EPROM 507 is used for memory. A RAM with I/O and timer 510 is used to control the first eight couplers of the coupler controls. The RAM 510 outputs drive open collector buffers 511 to control the OH (on/off-hook) lines to the universal voice couplers (FIG. 8). The PB inputs at RAM 510 sense the detect signals DT from the couplers. The PC0 and PC1 outputs are used to activate INT0 and INT7. The RAM 510 is selected by signal S6 so the output addresses are 7001–7003. The RAM (6000-60FF) is used by the program, and the timer/counter is not used.

The RAM 512 and buffer 513 circuit is identical to the RAM 510 and buffer 511 circuit except that PC0 and PC1 are not used; this RAM controls other couplers. The operative select line is SA, so that PA-PB addresses are B001-B002. Neither the internal RAM nor the timer/counter of this RAM are used.

4.8 Tone Controller

The tone controller is illustrated in detail in FIG. 6. An EPROM 600 is used as the sole memory unit. INTR is unused and is tied low. A RAM with I/O and timer 610 is used for on-board input/output. The terminals are set up as an input, PB and PC are set up as outputs. The internal RAM 610 is used by the program. The S6 select line is operative to provide PA-PC addresses of 7001–7003. The timer/counter provides a C2 output frequency. A programmable triple divider 611 produces T1, T2, and C1 output frequencies. The T1, T2, and C1 signals are enabled by the PB0-PB2 outputs of RAM 610. PB3-PB7 are sent to an open collector latch 612. These bits create the L1, L2, TX, and T control signals and the INT output (jumper settable to INT1-INT6).

A DTMF decoder 613 has an internal oscillator which uses an external 3.579545 mHz crystal. This clock is used as a reference for all tone decoding, providing a drift-free detection circuit. The clock output is buffered and level shifted by a CMOS noninverting buffer 614 which converts the 12 volt logic to 5 volts and presented to the CPU clock input. The digital outputs of the DTMF decoder 613 are also buffered by buffer 614: D0-D3 are the binary representation of the sixteen valid DTMF pairs, and the DV (data valid) output indicates the presence of a valid tone pair. These five signals are applied as inputs to PA0-PA4 at RAM 610. The DV buffered line also drives the RST5.5 interrupt input at CPU 600.

The audio circuits make use of MF10 digital filters 615, 616 in the tone controller. One chip contains two filters individually configurable as high pass, low pass, bandpass, and notch filter types; the Q and gains are set by three resistors and the center frequency is set by a clock input. This permits the critical parameter to be digitally controlled and referenced to a quartz crystal. Component drift and tolerance problems disappear relative to an analog circuit, and moreover, the filter center frequencies are completely under software control, providing maximum flexibility and versatility. In the tone controller, two of these chips are used for bandpass and notching properties.

Digital filter 616 is used to generate single or dual tone outputs. T1 and T2 (tone 1 and tone 2) are square wave outputs from the programmable divider 611), and their frequencies are software controlled. If the L1 and L2 open collector outputs are open, square waves are presented at the input of these bandpass filters. Each half of filter 616 is set for a gain of 0.5 and a Q of 10. The center frequencies are set by C1 and C2 (clock 1 and clock 2) which are set to 100 times T1 and T2, centering the filter on T1 and T2. The filtering action changes the square waves into sine waves. These two outputs are summed at an operational amplifier 617 with an external emitter follower output stage 618 for low output impedance and drive capability. The summing point is biased positive so that if the open collector TX output is open, the output stage is centered around a DC level of $-5$ volts; if TX is grounded, the output is centered around $+5$ volts. The output goes through a 620 ohm resistor and a diode D602 to the output tone jack. This is connected to a transformer winding to ground at the audio circuit. If TX is grounded, then the $+5$ volt bias turns on the output diode D602 and the output audio is coupled to the audio circuit transformer T1001-T1008 with a nominal output impedance of 600 ohms to match the telephone lines. If TX is open, then diode D602 is reverse biased, the audio path is broken, and the 600 ohm termination is removed. If the L1 and L2 outputs are grounded, the maximum positive voltage presented to the input of the filters is lowered, reducing the output level. This circuit 616 is typically used to generate DTMF tone pairs and the "ready" tone. The gain is set to produce nominally a precise dial tone level of $-15$ dBm and DTMF level of $-3$ dBm (the high tone 3 dB greater than the low tone) delivered to the load. The $-15$ dBm level was chosen to be sufficiently below the compression threshold of the UVC-1 to prevent reduction of received DTMF tones from the customer when local dial tone is applied simultaneously. The DTMF level of $-3$ dBm creates an average level of $-9$ dBm, since a 50% duty cycle is used in transmitting tones. Compression may begin to a small degree at this level in the universal coupler, but the attack time of the compression is at least one second and most tone sequences are sent so rapidly that limiting never occurs.

The audio coupled from the input jack is buffered by a voltage follower op-amp 614 (providing minimal loading and low output impedance). The TX (transmit) and RX (receive) audio jacks are connected so that if only one plug is used, the TX and RX circuits are tied together; if two plugs are used, the circuits are isolated. If the isolated mode is utilized, it may be desirable to provide 600 ohm termination; the open collector output T (terminate) controls this function. If T is low, a PNP transistor Q601 provides source current through a 620 ohm resistor to the transformer winding, and nominal 600 ohm termination is provided. If T is open, no current flows and a one megohm impedance is presented to the transformer.

The buffered audio input is applied to digital filter 615 which serves for two functions: notch filtering and bandpass detection. The notch outputs of filter 615 are set up for unity gain; the output of the first section at pin 3 feeds the input of the second section at pin 17. The output line TTD of the second section drives the DTMF decoder 613. The notch frequencies are set by C1 and C2, which are 100 times the ready tone frequency components when that tone is being generated. In this way, the ready tone is blocked or notched out before the combined ready tone/customer DTMF tones reach the DTMF decoder, preventing the locally generated tones from swamping the detection of remote signals.

Digital filter 615 also has bandpass outputs centered on the same C1/100 and C2/100 frequencies. The bandpass gain is set to ten and the Q is also ten. The output of these two gain stages are further amplified by respective operational amplifiers 620, 621 with gains of 15. These signals are rectified, filtered, and presented to the PA7 and PA6 inputs of RAM 610 as the DT1 and DT2 (detect 1 and 2) signals, in addition to driving a Schmitt trigger NAND gate 622 which provides signal DT3 to the PA5 input of RAM 610. These circuits can be used in a variety of ways.

If a simultaneous pair of frequencies is to be detected, C1 and C2 are set to 100 times these frequencies. The presence of two tones within the bandpass of each filter causes DT1 and DT2 to go high, forcing DT3 low. All that need be done is monitor the PA5 input of RAM 610 and wait until a low is received. If only a single tone is to be detected, either filter can be centered on it, and the PA6 or PA7 inputs monitored for a high level. However, the hysteresis provided by the NAND gate 622 creates a more stable and jitter-free signal; therefore, provision is made to set DT1 or DT2 high by placing a high on PC2 or PC3, respectively. Diodes D603, D604 force the DT inputs high, and the same software loop monitoring DT3 can be used as for detection of a double tone. The process differs only in the setup of C1, C2, PC2, and PC3. Due to the configuration of the first filter's notch output driving the input of the second at filter 615, it is possible to detect a particular frequency tone with the second filter while first rejecting a nearby frequency with the first filter.

5. INTERNAL SOFTWARE

This section describes the software which runs on the controllers used in the switching system of the present invention. All code is written in Intel 8085 assembly language. The programs are entered and assembled on a development system, EPROM's are burned, and placed into the controller boards. All software is switch size independent; the system checks itself on initialization and becomes configured according to the number of boards found. The following description is provided with reference to the software flow charts illustrated in FIGS. 11-29.

5.1 Common Code

Each of the controllers (FIGS. 3, 4, 5 and 6) uses the same circuitry for the central processor section. The common hardware centers around the CPU X00, the RAM X08, and the EPROM X07 wherein X is a 3, 4, 5 or 6 depending upon which controller is considered. This hardware utilizes the RST 6.5 and RST 7.5 interrupts and differs between controllers only in the peripherals attached. As a result, the controllers contain a section of program which is identical. The functions of this common section are to provide interprocessor communications, command modes, and interrupt driven real time clocks. In all controllers, three bytes are reserved for identification and checking purposes: addresses 0003 and 0004 contain the software version number; and address 0005 is set so that the overall check sum of the entire ROM is 00. These locations are sandwiched between hardware vector addresses.

Real Time Clock (FIG. 11)

The RAM X08 timer is programmed to divide the CPU clock output down to 1000 Hz; the actual divide ratio differs as between the different controllers because the crystal frequencies are different. The 1000 Hz signal drives the RST 7.5 interrupt input, causing an interrupt request at one millisecond intervals. This is the source of the real time clock. The advantage of using hardware driven interrupts for timing values is that processor speed does not become a factor in the time delays. Moreover, when other interrupts are utilized for other purposes, they obviate the possibility of using software timing cycles since it is impossible to know when asynchronous interrupt cycles will steal processor time from the timing loop. However, an interrupt driven timer continues to operate, so long as the interrupt priorities are set properly. In addition, it is much easier to sample a timer variable which is altered in a timer interrupt while performing another task than to incorporate timing loops into every task intended to time out.

The clock interrupt service routine is partially reentrant; although the one ms actions always occur rapidly enough to preclude another clock interrupt prior to the completion of that task, the slower 100 ms and one second actions may require longer than one ms for completion. These tasks, which are called periodically by the one ms interrupt, can be interrupted by another one ms interrupt. For this reason, the first instruction performed in the clock interrupt service routine is "enable interrupts" (EI).

This clock routine acts upon five software timers, which are simply memory locations: TMMIL, TMTN2, TMSC1, and TMSC2. At the appropriate time, each of these single byte variables are tested. If they are nonzero, they are decremented, and if they are zero, they are left unchanged. TMMIL is decremented at one ms intervals, TMTN1 and TMTN2 at one-tenth second intervals, and TMSC1 and TMSC2 at one second intervals. In this way, other sections of the program can use these timers simply by loading with the required time delay. Periodic testing by this clock, using program, need only check for a zero.

CLOCK always handles TMMIL for one ms actions; it also always calls a subroutine ACTMS, which is different in the different controllers, to perform whatever additional one millisecond actions are desired in the particular controller. A variable CLKTN is used internally by CLOCK to decide when 100 ms has elapsed. This variable is decremented, and if nonzero, CLOCK exits. If it is equal to zero, it is loaded with the value 100 to set it up for the next interval. At this point 100 ms actions are performed: TMTN1 and TMTN2 are handled, and the subroutine ACTTN is called to perform any additional tenth second actions desired. A secoid variable, CLKSC, is used internally by CLOCK to determine if the current interrupt is a one second cycle: this variable is decremented, and if nonzero, CLOCK returns. If it is zero, it is loaded with the value 10 (which divides the 100 ms time down to 1000 ms) for the next cycle. At this one second interval, the variables TMSC1 and TMSC2 are handled and the variable subroutine ACTSC is called for additional one second actions.

Communications Routines

Common controller routines are provided to: receive a character from the communication bus (RXCHR); set communications mode to receive (RMODE); set communications mode to transmit (TMODE); receive a specified number of characters from the communications bus (RXC); transmit a character to the communications bus (IXCHR); delay 100 microseconds (DL100); and to send an acknowledge character to the master controller (ACK).

Referring to FIG. 12, as well as FIGS. 3, 4, 5 and 6, the RST 6.5 interrupt input is used to flag receipt of a character transmitted over the communications bus. This interrupt is activated every time a strobe pulse is present. The RXCHR interrupt routine serves several purposes: it clears the flip-flop X04 which latched the interrupt request; it checks the parity of the bus; it checks the address on the bus to determine if the current transmission is intended for the controller in question and, if so, it adds the received character to the received queue if it is not full; if the queue contains only one character, it interprets it as a command and executes it (if valid) and clears the queue. The SOD output line doubles as a CSTR output control and a received character acknowledge to clear flip-flop X04. The RXCHR subroutine pulses the SOD output while the CSTR is still low and therefore does not cause an erroneous CSTR pulse in the process. If the received parity is wrong (i.e., it is not odd parity), or if the destination address does not match the memory location defining the controller's address, RXCHR exits with no action.

In practice, the following occurs in each function controller when the master controller sends a multibyte command to another controller. The first byte is received and RXCHR interprets it as a command instruction. The specified command routine is called and the command routine waits until the required number of parameters have been entered into the received queue (the RXCHR interrupt routine is reentrant here; further characters received are simply added to the received queue). The command is then processed. Control returns to the original RXCHR interrupt process. The receiver queue is cleared because the command is complete, and that first interrupt returns to the interrupted program. In the master controller, the RXCHR routine is identical except that the first character received is not interpreted as a command. The received characters are still placed into the queue.

The RMODE subroutine (FIG. 13) sets all of the RAM X08 I/O ports to input mode and unmasks the RST 6.5 interrupt. The TMODE subroutine (FIG. 14) masks RST 6.5, delays 200 microseconds (allow time for the previous bus transmitter to relinquish the bus), and sets the RAM X08 PA and PB ports to output mode (these are the communications address, data, and parity lines). The RXC subroutine (not illustrated) is a subroutine which waits until either the number of received characters in the queue are equal to the value stored in the C register, or a timeout occurs. If more than a half second passes while waiting for a character, a timeout occurs, the carry is set, and the routine exits. This routine is typically used within a command instruction routine to wait for the required number of parameters to be received.

The TXCHR routine (FIG. 15) computes the CPAR bit from the destination address and data to be transmitted, supplies all information to the RAM PA and PB ports, delays 100 microseconds (data settling time), lowers CSTR, delays 100 microseconds, and raises CSTR. The output data remains latched until either another character is sent, or RMODE is called.

The ACK subroutine (not illustrated) sends the controller address to the master controller (not used in the master controller). This is used by command routines which send the address as acknowledgement of command execution.

All communications routines are designed to operate properly no matter which controller is transmitting to another. According to the protocols, the master is the only controller which initiates communications; however, there is no reason that the other controllers could not directly communicate with other controllers with this same general software. The current supervised protocols would be revised if a need exists to permit direct communications between controllers without passing through the master.

Command Routines

The RD (read) command is used when the master controller reads a specified memory location in a function controller. The command byte and two bytes of address are received, the memory location is read, and the contents are transmitted.

The WR (write) command is used when the master controller writes a specified memory location into a function controller with a specified data byte. The command byte, two bytes of address, and the new data are received; the memory location is written, read back, and the contents are transmitted.

The CAL (call) command is used when the master controller calls a specified memory location in a function controller as a subroutine. The command byte, register contents, and two bytes of address are received; ACK is called, the received queue cleared, and execution sent to the requested memory location.

The initialize command INITG (initialization go) is used when the master controller attempts to restart a function controller. The STEST command causes a function controller to perform self testing.

These commands are included in the master controller code but are never executed. The RTN subroutine is used when a RETURN is to be performed, but the stack pointer is to be checked first: if it is invalid, a recovery process is initiated. The stack is contained wholly in the 4000-40FF block of RAM X08 in all controllers. This separation between stack space and other variable storage has the advantage that software errors, crashes, etc., are less likely to affect the stack directly. Recovery may well occur before drastic effects are produced.

5.2 Master Controller

The master controller contains 2K bytes of RAM, a serial interface, a busy signal generator, and hardware to handle INT0-INT7 inputs (which generate RST 0-7 instruction calls). The software must act on requests received over the serial interface and coordinate activities as initiated by received interrupts from the function controllers.

Upon initialization (INIT), the CPU 300 clears all variables, programs the USART 312, programs the programmable timer 313 to generate the busy tone and baud rate, and clears the RST 6.5 flip-flop 302. A five second wait is used at this point to permit all slave controllers to complete reset and initialization operations.

At this time, a tone controller table (TCTAB) is established. This table contains 63 entries, the maximum number of tone controllers possible in the disclosed system. Each entry consists of three bytes. The first supplies status information about the tone controller.

Bits 0 and 1 indicate the current Mode: 00 for idle, 01 for receiving from a user, 10 for dialing out, and 11 for call placed on "hold". Bit 2 is set if the controller is failed (or not present). If failed, tasks will not be assigned to it. Bits 3-5 designate the INT (interrupt) line activated by the controller: 1-6 (values of 0 or 7 are invalid). Bit 6 is set if the outgoing port associated with the controller is on SIDE2. Bit 7 is set if the incoming port associated with the controller is in SIDE2 (0 if SIDE1 for both). The second byte in the table entry designates the incoming port: bits 4-7 the group, the bits 0-3 the port. The third byte in the table entry designates the outgoing port in the same way.

To create the TCTAB list, each valid tone controller address (41-7F) is polled by commanding the controller to activate its INT (interrupt)output line. The master waits up to 10 ms to receive an INT1-INT6, which is specially trapped out to simply store the interrupt number in TCRST (tone controller RST). If received, the number is stored in TCTAB. If not, the failed bit is set in the table. At the conclusion of tone controller sampling, the TCTAB contains information about each responding tone controller's INT (interrupt) line.

Next, the switch controller is asked for its size. The coupler controllers are polled from 10 up until no response is received. Whichever is smaller, the switch controller size, or the number of coupler controllers, is then stored in SIZE (0-F). If either the switch controller or the first coupler controller is missing, a value is stored in SIZE so that an "X" will be printed if the system size is requested from the LCRC 14. The ISTAR routine is then called, which performs an automatic "I*" command. Any incoming character is killed from the USART 312, the USART interrupt RST 5.5 is unmasked, and the program falls to the main loop.

Figure 16:
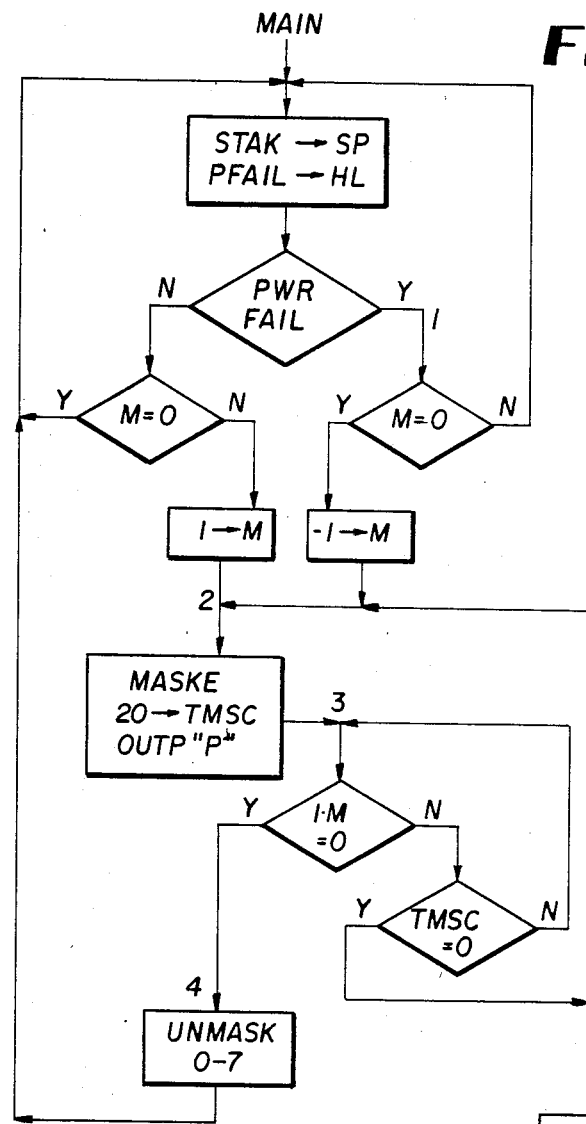
FIG. 16 is a flow chart of the main loop program routine at the master controller.

Main Loop (FIG. 16)

The foregoing program at MAIN does nothing more than monitor the power fail input bit. The stack pointer is continuously reloaded for error protection. If power is not failed, control simply loops. When power fail is detected, at MAIN1 (i.e., point 1 in main routine flow chart), the location of PFAIL is tested; if equal to 0, then power was previously present; PFAIL is set to FF, INT interupts are masked, and a "P" is sent at MAIN2 (i.e., point 2 in main routine flow chart). At MAIN3 the PFAIL bit 0 is tested to see if it is still 1. If so, then the "AC" command has not been received. If 20 seconds elapse, the "P" is repeated. When the "AC" command is performed, bit 0 of PFAIL is cleared. This is detected at MAIN3, and at MAIN4 the interrupt mask is removed. Control continues to loop through MAIN1 until power is restored. Action is the same as when power failed, except that PFAIL is set to 1, and the "AC" command makes it 0.

Figure 17:
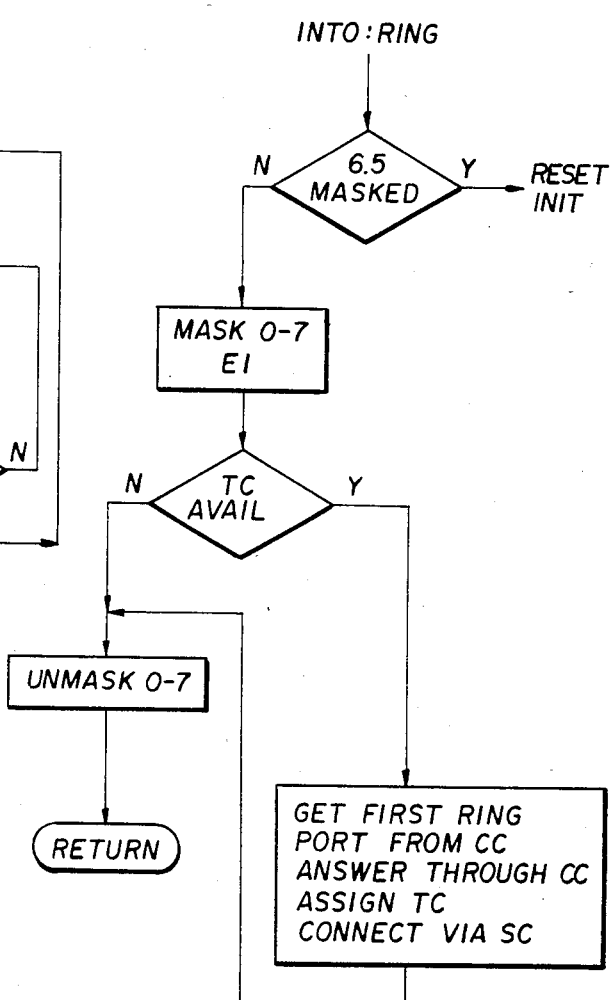
FIG. 17 is a flow chart of the ring interrupt routine portion of the program at the master controller.
Figure 29:
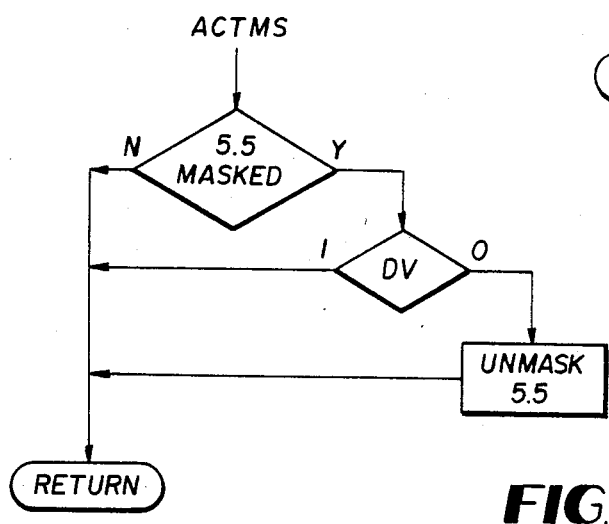
FIG. 29 is a flow chart for the one millisecond interrupt action program routine at the tone controller.

Ring Interrupt (FIG. 17)

The ring request appears from the coupler controllers on the INT0 line, which generates an RST 0 call. This is nearly indistinguishable from a reset operation in that both send control to address 0. However, the reset masks RST 6.5. In the master controller RST6.5 is purposely left unmasked at all times. At ZERO this mask is checked; if it is masked, then a reset must have occurred and control jumps to INIT. Otherwise, a RST 0 must have occurred and control passes to RING to process that interrupt.

Figure 18:
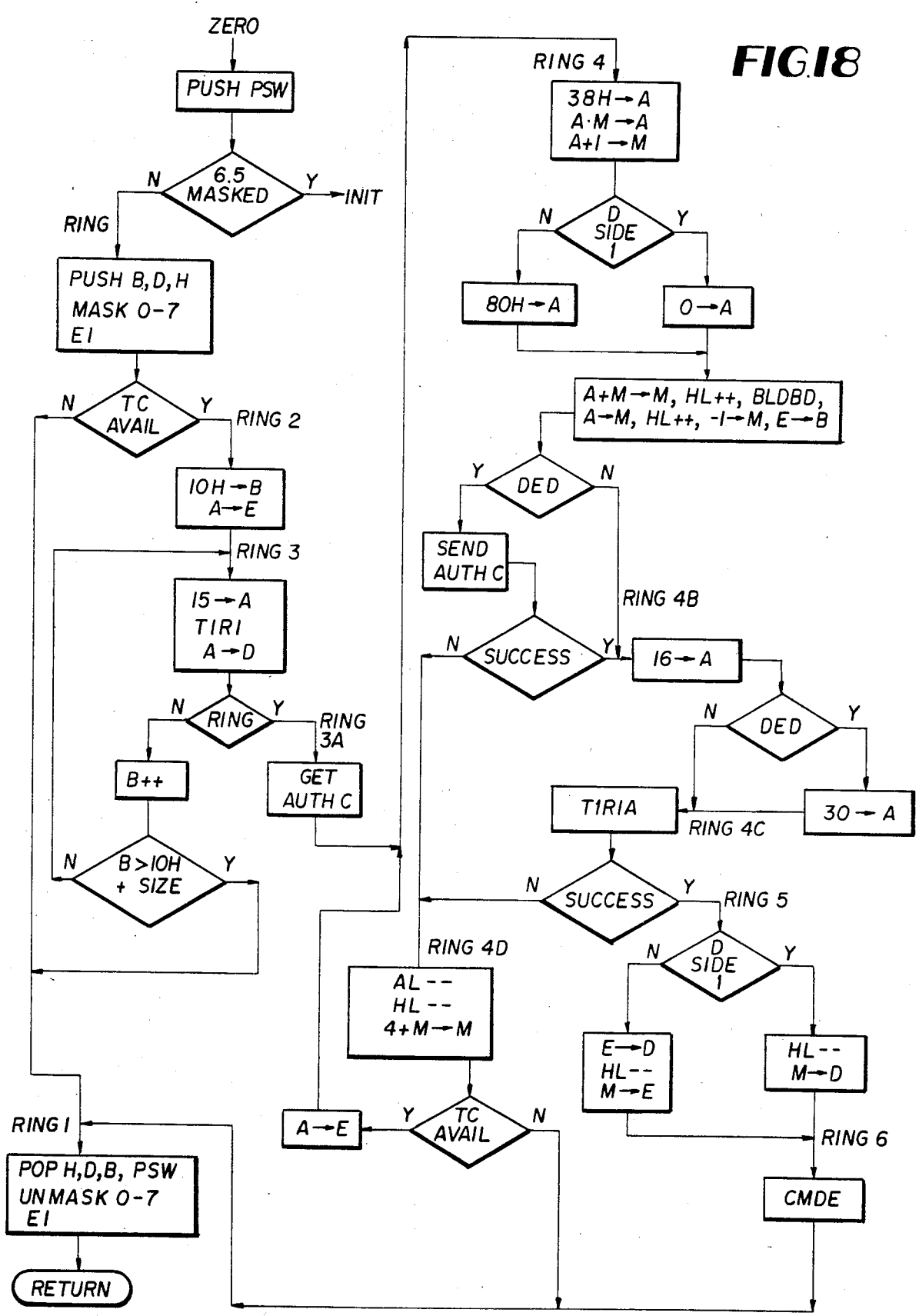
FIG. 18 is a flow chart of the tone controller information routine portion of the program at the master controller.

The routine TCINF (tone controller information), illustrated in FIG. 18, is called with register A set to 0, which checks whether a tone controller is available for use. If not, then the ring interrupt exits with no action. Under this condition, continuous interrupts will be generated; however, the ring interrupt is the lowest priority, so that any other process will be handled in this situation. When another process releases a tone controller, the next RST 0 interrupt will return from TCINF with an available tone controller. When this occurs, control passes to RING2.

At steps RING2 and RING3, the coupler controllers are polled to determine the first one which is asserting INT0. If none are found, the routine exits. When one is found, its address is saved in register B, the port is read, the line is answered, and processing continues at step MAIN4 on the MAIN routine (FIG. 16). The group and port of the incoming call (the group is defined automatically by which coupler controller asserted INT0, and the port was read in finding out that the coupler controller caused the interrupt) are stored in TCTAB. The tone controller is commanded into receive mode and this is reflected in TCTAB. If the command receives no acknowledgement, that tone controller is marked as failed in the TCTAB list, and the process starts over with another tone controller if one is available. Assuming that the tone controller accepts the receive mode command, at steps RING5 and RING6 (FIG. 18), the switch controller is commanded to connect the incoming port to the selected tone controller, and the interrupt routine exits.

Figure 19:
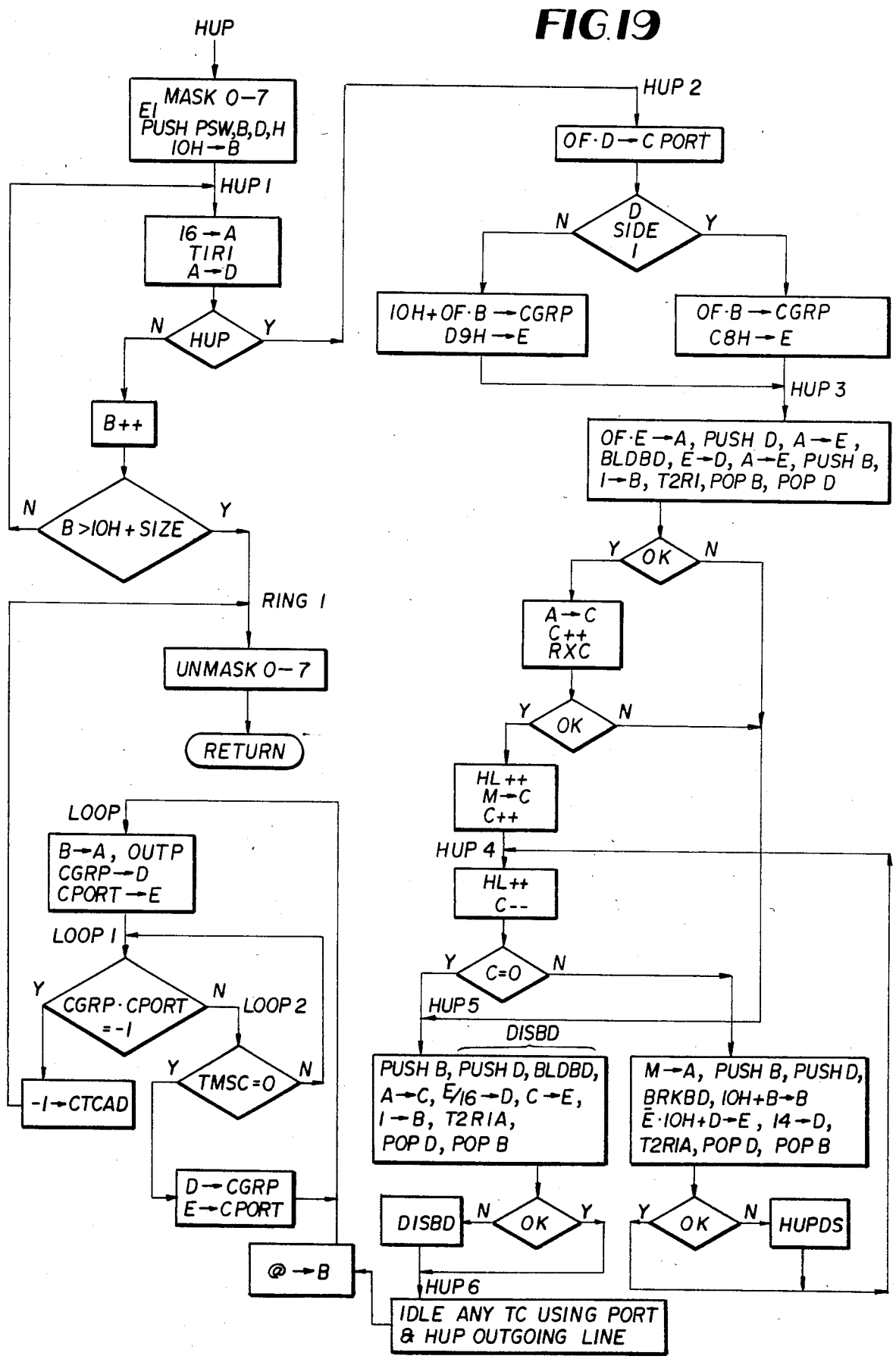
FIG. 19 is a flow chart of the hangup interrupt routine in the program at the master controller.

Hangup Interrupt (FIG. 19)

A coupler controller with a hangup asserts the INT7 line, causing an RST 7 interrupt call. At HUP, further INT interrupts are masked. The coupler controllers are sampled at HUP1 (FIG. 19) to locate the first one asserting the INT0. If none are found, the interrupt exits at RING1. Otherwise, the group and port are noted and CGRP(current group) and CPORT (current port) are loaded accordingly at HUP2. At HUP3 conversions are made, and the switch controller is asked to identify what hangup line is connected to. Control next loops through HUP4, once for every connection reported; for each connection, the coupler controller is given a line break command (hanging up the opposite party or parties). When all is hungup, at HUP5 the switch controller is given a command to break all connections from the originating hungup line.

The TCTAB is checked to determine if any tone controllers were in a process with the incoming group and port equal to the hungup line at HUP6. If such a process is found, the tone controller is idled and the outgoing line reported in TCTAB is hungup. This is necessary, since if a user hangs up after entering all information, but before the call has been redialed into the outgoing line, there is no connection between the incoming and outgoing lines and the connection list search at HUP4 would not hang up the outgoing line. However, that line would be in TCTAB. At this point, the hangup has been handled except for reporting to the LCRC 14. Register B is loaded with "@" and control passes to LOOP.

LOOP sends the contents of register B to the USART 312. A location REQST is set to FF. This location is monitored at LOOP1 until the request has been handled or twenty seconds elapse. If a timeout occurs, the contents of register B are sent to the USART 312 again at LOOP. If B equals "@", then REQST will be cleared after both the "G" and "P" commands have been received. Control falls to LOOP2, which clears the current group and port variables. The interrupt routine then exits through RING1.

Figure 20:
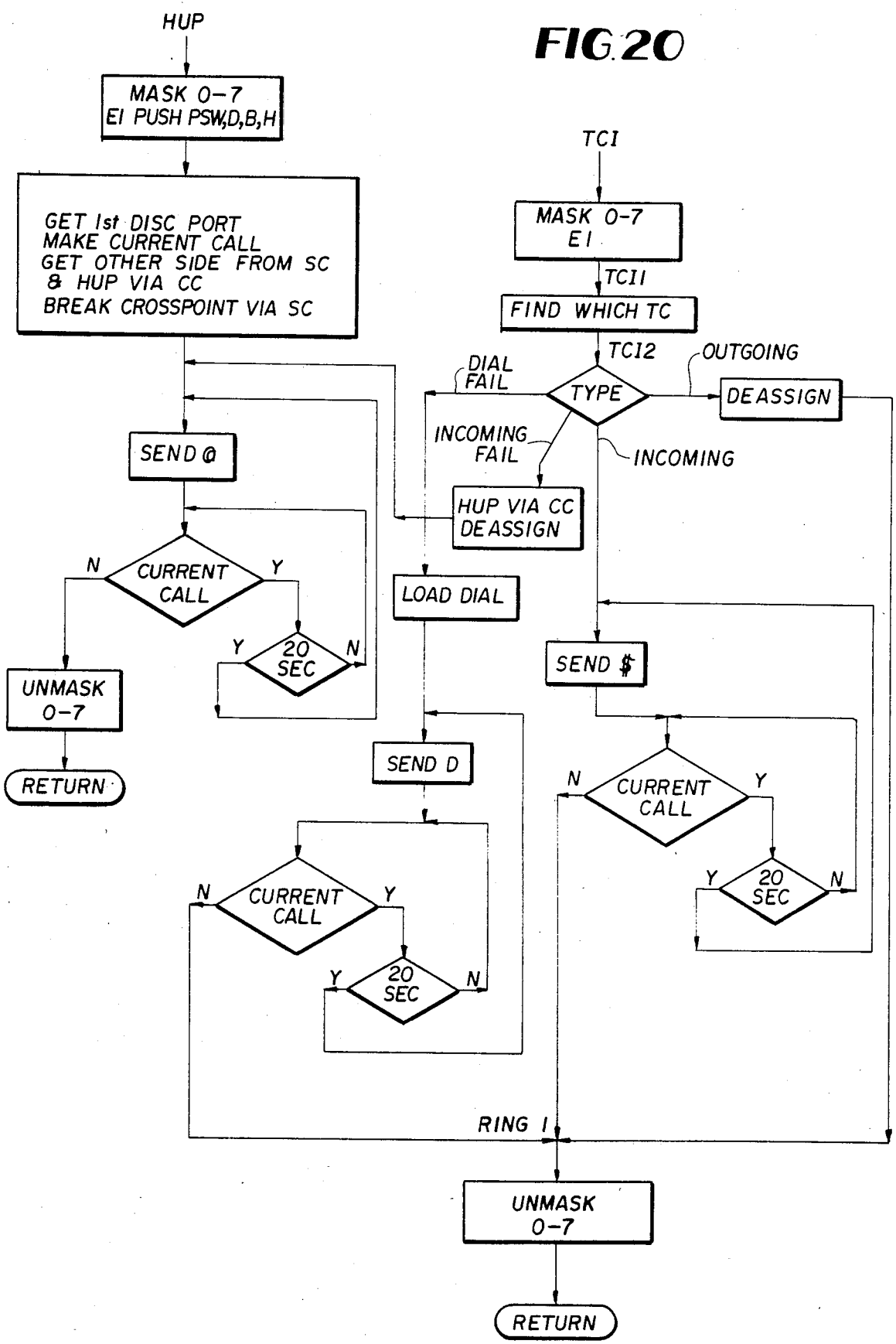
FIG. 20 is a flow chart of the tone controller interrupt routine in the program.
Figure 21:
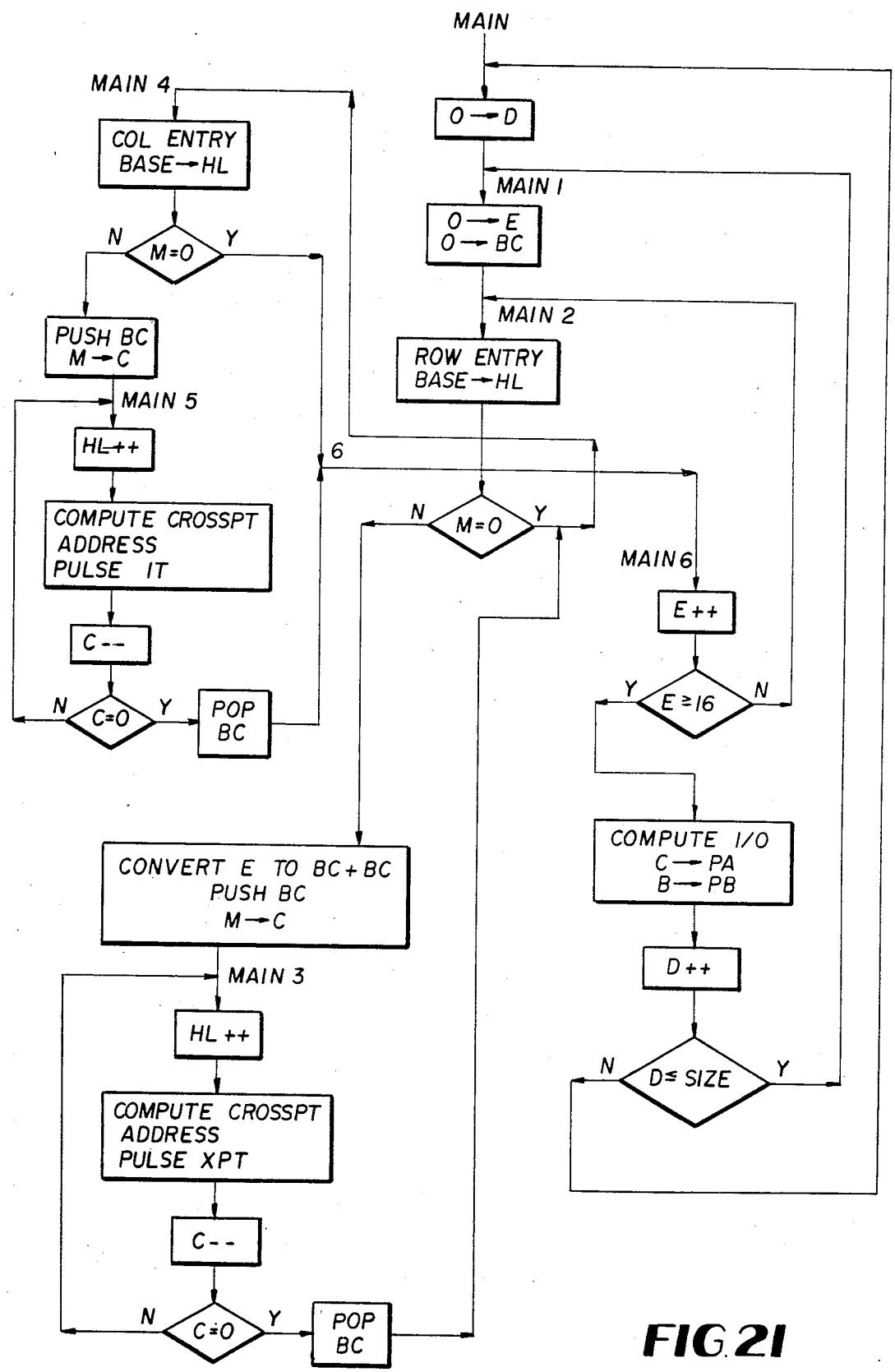
FIG. 21 is a flow chart for the program at the switch controller.
Figure 22:
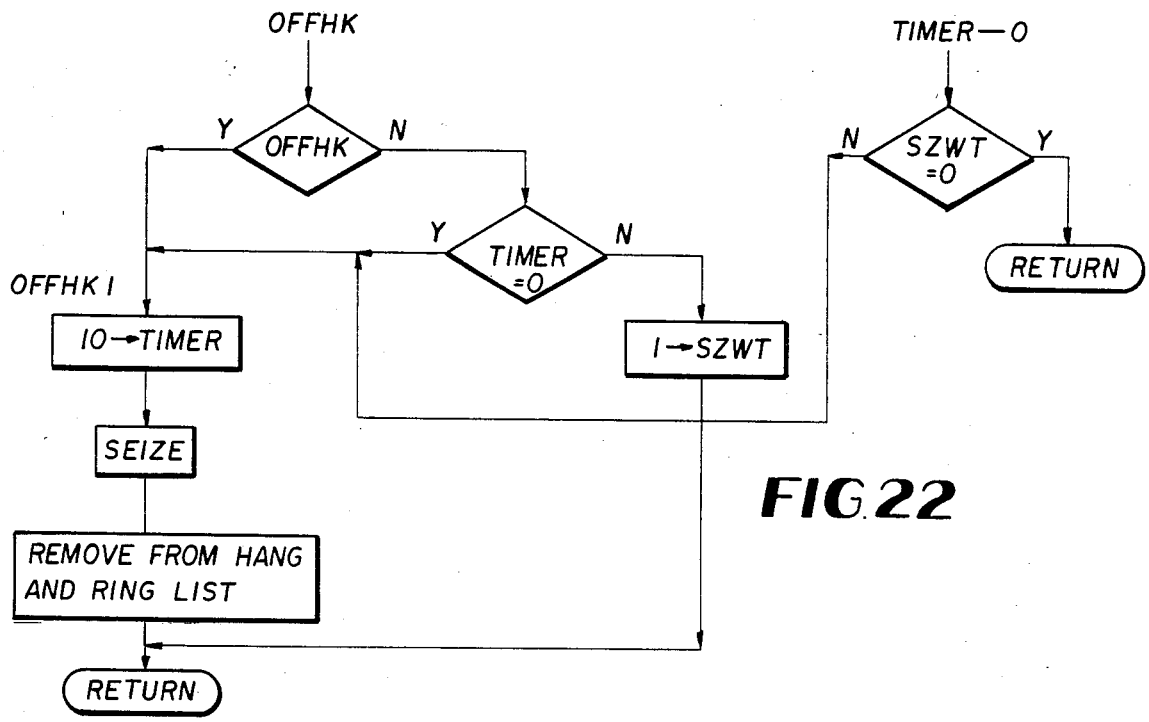
FIG. 22 is a flow chart for the off-hook program routine at the coupler controller.
Figure 23:
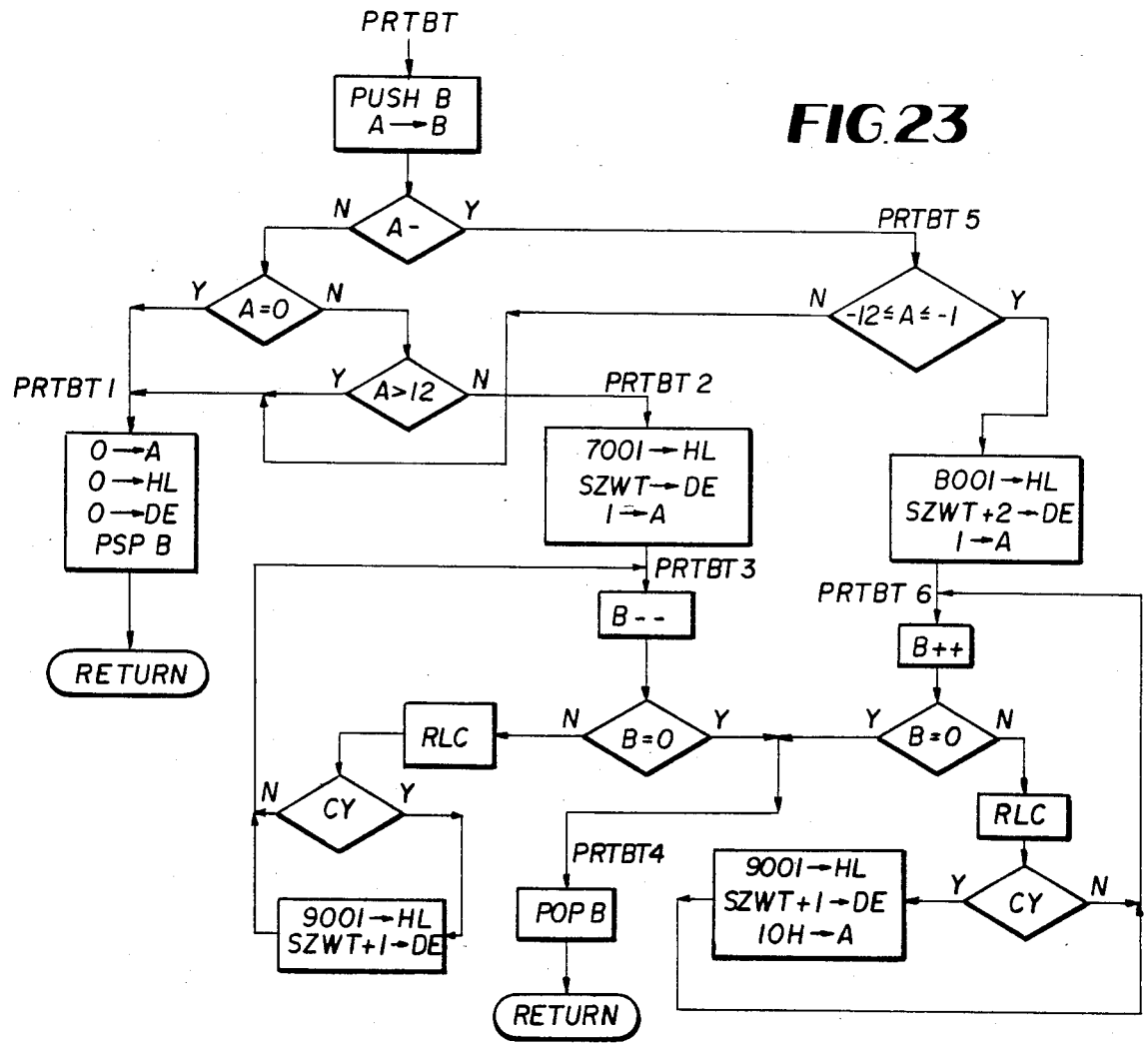
FIG. 23 is a flow chart for the port bit program routine at the coupler controller.
Figure 27A:
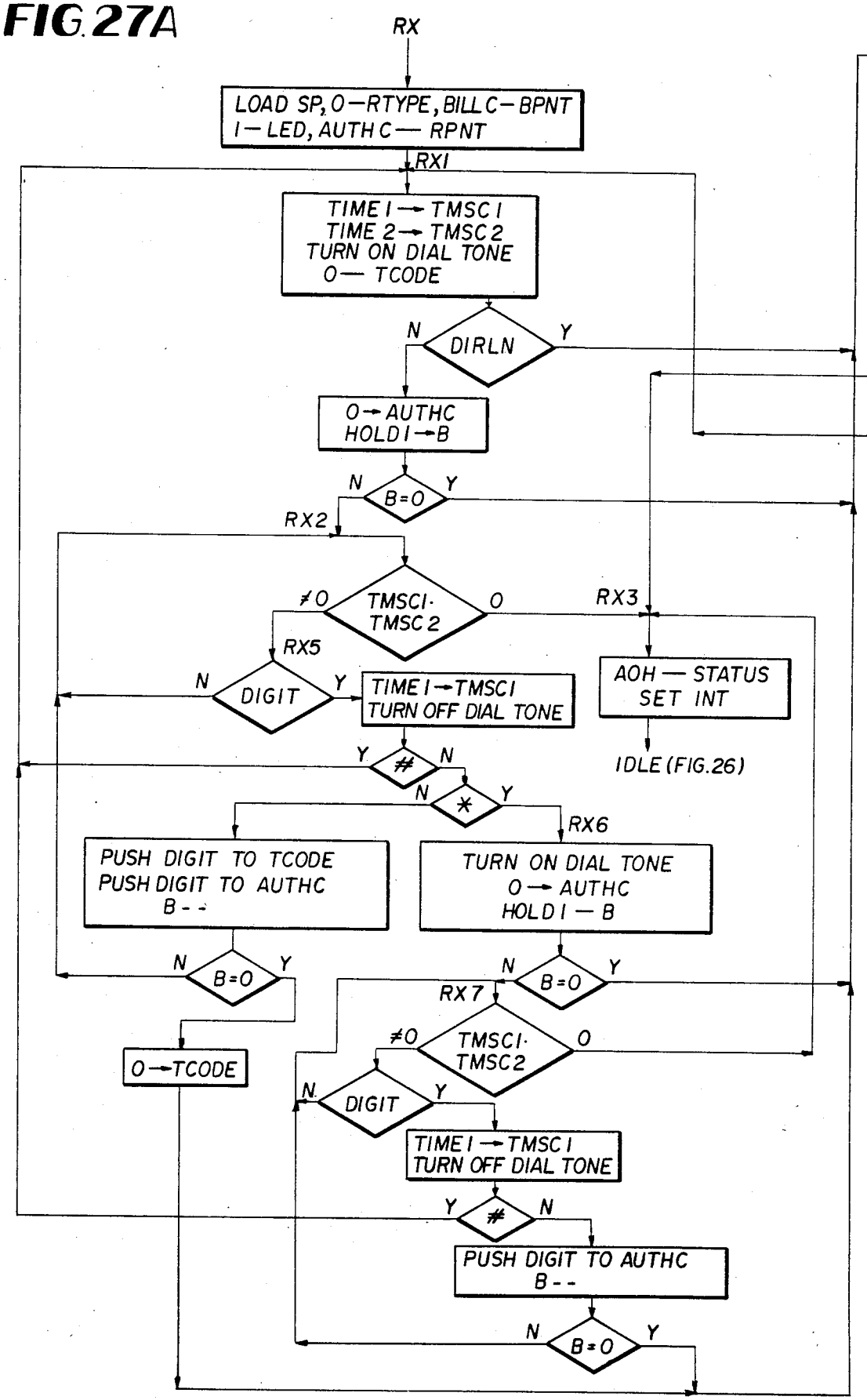
FIG. 27A-B is a flow chart for the receive program routine at the tone controller.
Figure 27B:
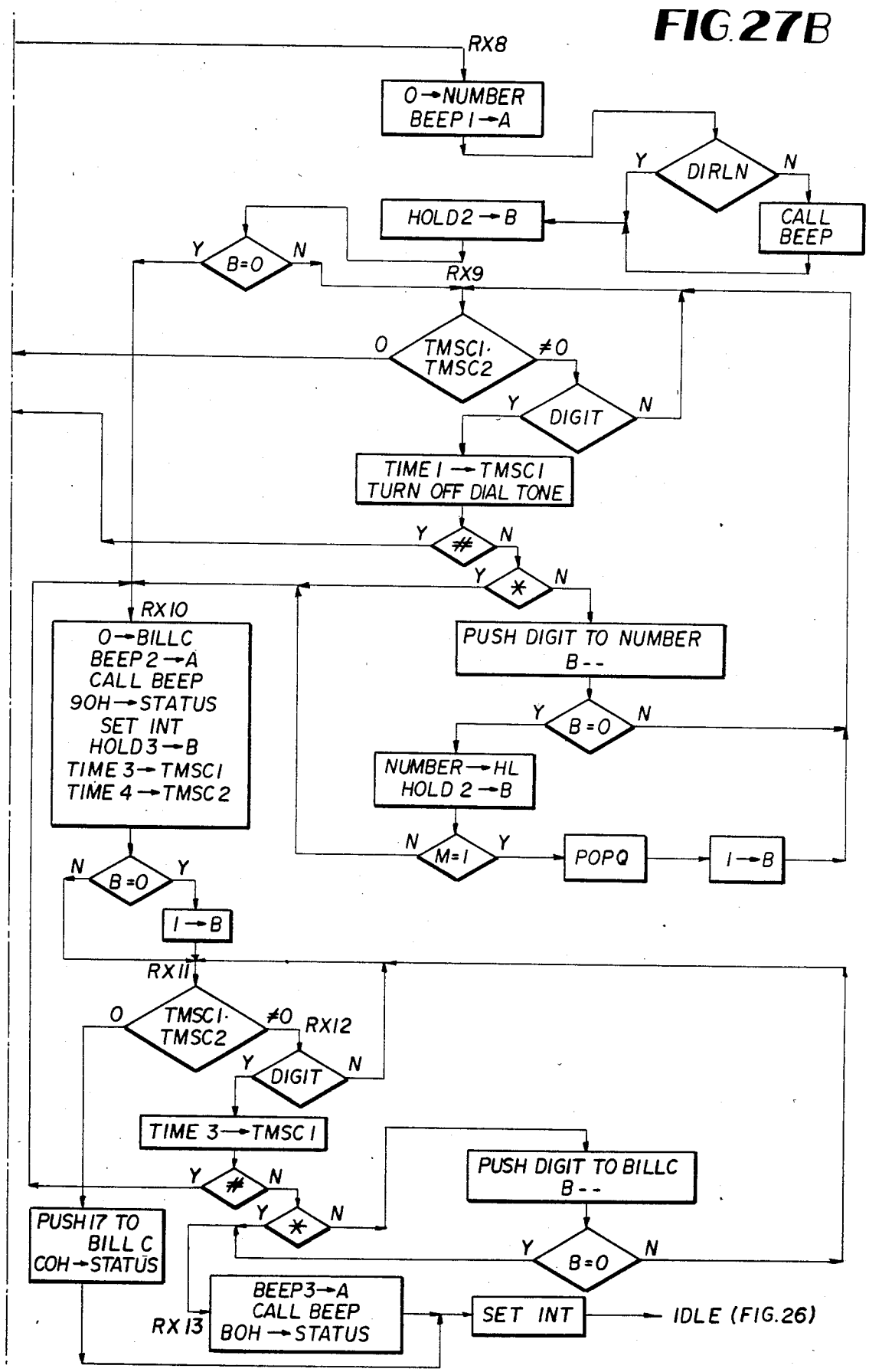

Tone Controller Interrupt (FIG. 20)

When tone controllers assert INT1-INT6, a RST 1-6 interrupt is called. These each vector to different addresses, where register A is set to 1-6 to reflect the entry point, and control passes to TCI (tone controller interrupt). Further INT interrupts are inhibited. If TCRST is zero, then the tone controller initialization phase is in process; the RST value is placed into TCRST, and the interrupt returns so that the initialization process can read the interrupt location from TCRST for storage in TCTAB. Once initialization is complete, TCRST is set to FF, and operation proceeds normally at TCI1.

At TCI1, register A has previously been initialized to 40, and register B has been set to the RST value. At TCI1, TCINF is called, which will return the next entry in TCTAB which has RST B and has an address above A. The first time through, the first tone controller with RST B will be returned. If none are found, the interrupt routine exits through RING1. If a controller is found, its address is returned in register A. This tone controller is polled to determine if it is the source of the interrupt. If it is not, control is looped back to TCI1, where the next tone controller with address above the last returned will be located. This process continues until the interrupting controller is found and its status read.

If the tone controller's status indicates an input timeout, the incoming port stored in TCTAB is given a line break by commanding the appropriate coupler controller. All variables are massaged until the condition is the same as for a hangup; control passes to HUP2, which processes the rest of the procedure the same as though a hangup occurred.

When the status is not an input timeout, at TCI2, if the status is invalid, then the tone controller is deassigned and the interrupt leaves through RING1. If the status indicates a dialing failure, the failure number is read and stored in location DF; the tone controller is idled, the outgoing line from TCTAB is placed on-hook through its coupler controller, register B is set to "D", and the current group, port, and tone controller address are placed into CGRP, CPORT, and CTCAD, and control passes to LOOP (FIG. 19). Handling is the same as for the "@", except that an "X" command is required to clear the loop and permit return via RING1.

If the status is not a dialing failure, it is tested to determine if it is finished sending. If not, it must be either: user entry complete; billing code complete; or billing code timeout. No matter which, register B is loaded with "$", and the program loads CGRP, CPORT, CTCAD, and goes to LOOP. When the "$" is handled, the interrupt exits through RING1.

If the tone controller status transmitting is done, the incoming and outgoing lines marked in TCTAB are connected together by commanding the switch controller, the tone controller is deassigned, and the routine exits through RING1. Deassignment disconnects all audio paths to the tone controller.

USART Received Data Interrupt

A character received by the USART 312 generates an RST 5.5 interrupt. From the idle mode, this character is read by a USARTC interrupt service routine. Characters are pushed onto a USART received data queue, URQ. This queue is cleared upon completion of an LCRC command. As the queue fills up with new information, USARTC checks the string for a match with any valid LCRC command: if a complete match is found, that command routine is called; if a match exists, but is not complete, no action is taken; if there is no possible match, a "?" is sent and the queue is cleared.

Upon entry, the service routine masks RST 5.5. When a command match is found and execution is transferred to the command routine, that interrupt is still masked. All further parameters required by the command routine are received by waiting for receipt, not under interrupt control. The INT0-INT7 interrupts are masked during the USART interrupt, which does not end on a match until the command routine is completed. The USART return, USARTR, is pushed onto the stack before jumping to the command routine, so that command need only return to finish the interrupt cycle.

The overall logic is such that an INT0-INT7 creates a request which the controller responds to; if the condition requires that the LCRC respond, the INT interrupt routine waits (generally at LOOP) until communications are received by the USARTC interrupt sufficient to execute a command response; the command routine clears the condition required by the original action; the USART interrupt returns; the INT interrupt routine condition is met; and the INT interrupt routine exits to the original program under execution, usually the foreground program.

One Second Interrupt Action

At one second intervals, the routine ACTSC is called. The eight digit real time clock is incremented if the time is nonzero. This prevents the clock from counting after a power-up or a reset operation, which clear the time value. Once the clock is set, it will count up once per second.

The CHKTC section checks the TCTAB entries for the RST values: if 1-6, no change is made; if 0 or 7, the failed bit is set. This prevents bogging the system down if erroneous entries are created in TCTAB, since these bogus tone controllers will be issued commands, and the half second timeout for each slows down initialization commands involving tone controllers.

The SPEED section reads the DIP switch and programs the timer 313 for the current baud rate request for the serial interface. The INITR routine initializes the RAM 308 to provide the 1000 Hz RST 7.5 interrupt input. This is done continuously in case the programming is destroyed for any reason. The command routines are activated when a match occurs between the incoming USART characters and the command table, stored at CMDTB.

5.3 Switch Controller (FIG. 4)

The switch controller consists of the switch controller master and from 0-15 switch controller slave boards. The slave boards expand the I/O for outputs to control the deselect lines for the SCR crosspoints. The master contains the I/O for addressing the crosspoints. The connection list is stored in the 256-byte RAMS 410, 412 which provide the deselect line outputs. Each RAM contains a list of connections to all columns and rows in its assigned group. This list is organized such that each column or row index has eight reserved bytes: one for the number of connections, and up to seven for the row or column connected. The first 128 bytes contain entries for columns a-p, while the second 128 bytes contain information pertaining to rows A-P.

Initialization clears the command queue, the clock timers, the crosspoint, and sets up interrupts. The foreground program at MAIN loads the stack pointer and searches through the command list. The command list has 128 allocated bytes, each command using four bytes. These commands are placed in the command queue by communications from the master controller, received in the RST 6.5 interrupt routine. If the command list is empty, the foregoing program loops around MAIN, waiting for action to be requested.

When a request is located, at MAIN1 the request is killed in the list, and the command instruction is checked: if CM, CB, CAB1, or CAB2 the proper section of code is jumped to; otherwise, an invalid request was made and no action is taken.

The one millisecond action routine ACTMS turns the LED on if the switch controller is communicating, or off if not. Dependent upon the DIP switch settings, either the tenth second action routine ACTTN or the one second action routine ACTSC calls the KICK subroutine. This routine checks the command list for CM commands. Since this instruction causes the connection to be made a multiple number of times, at either 0.1 or 1.0 second intervals (both the number of times and time interval set by the DIP switch settings), the number of "kicks" are stored as a parameter in the command list when the CM command is received from the master controller. The KICK routine decrements this count in the command list and sets the bit which causes the foreground program to execute the CM code. In this way, the foreground program is unaware of the repeated CM actions; they are independently set by the real time clock interrupts.

The ACTSC interrupt routine also calls GSIZE, which gets the switch controller size by reading the RAMs on the slave boards to determine how many such cards are connected. The answer is stored in SIZE. The address 01 is stored in ID during this interrupt also.

The commands received from the master controller over the communications bus are either handled directly if no significant processing time is required, or indirectly by storage in the command list otherwise. The store command routine SCOM is used to load the command list.

5.4 Coupler Controller

The coupler controllers send output signals and receive status information from 12 SIDE1 and 12 SIDE2 couplers. They receive commands from the master controller which involve these couplers. The coupler controller monitors the coupler status output limes to make a determination regarding ringing and disconnections. All of these decisions are dependent upon timing constraints. These tasks are relegated to special controllers so that these supervisory functions can be performed without affecting timing relationships with other devices, in addition to providing a means of input/output expansion.

Foreground Program

Initialization sets the stack pointer, clears variables, loads values from the DIP switches, and clears all telephone lines. At MAIN, the program loops, awaiting action initiated by the interrupt driven routines. Disconnects detected by the interrupt routines are pushed onto a queue. At MAIN, if this queue is nonzero, the first line is popped off, hung up, and placed into the variable HNGWT. This denotes a line already hung up and waiting for the master controller to note this occurrence. The INT7 interrupt output is activated to alert the master controller. Control is looped through MAIN until HNGWT is cleared by a suitable interrupt driven command from the master controller.

If the queue at HNGUP is empty, at MAIN1 the variable INHCL is checked. If nonzero, incoming calls are inhibited, there is no need to check for ringing lines, and the program loops back to MAIN. If INHCL is zero, then the ring queue at RING is checked. The interrupt programs push entries onto this list when ringing is detected. If there are no entries, then the program is looped back to MAIN, awaiting action. If there is an entry, it is popped off of the queue and placed into the variable RNGWT and the INT0 interrupt output is activated. This variable denotes that a ringing line is waiting to be answered. Control loops back to MAIN. No further rings will be handled until the master controller responds to the INT0 with the proper command.

General Subroutines

To assist in popping information from queues (such as RING and HNGUP), a subroutine POPQ is used. Upon entry, the list address has been placed into the register pair HL. If the list is zero, no action is taken and the routine returns with register A zero. Otherwise, the one second interrupt actions are inhibited by setting INH1S; this is done to prevent two routines from acting on the same list at the same time. The list is copied down, resulting in a list with one less entry than at the start. The top entry is placed into register A and the one second interrupt actions are uninhibited.

The routine OFFHK (FIG. 22) is provided to take a specified port off-hook.. The port is marked in register A as 1 to 12 for SIDE1, or $-1$ to $-12$ for SIDE2. Several timing considerations must be handled for proper operation. A line recently placed on-hook must not be taken off-hook within two seconds or the telephone connection may not be terminated. If this condition exists, then OFFHK must not take the line off-hook but instead must set a bit in a variable SZWT (seize wait). An interrupt routine takes the line off-hook when the two second timer ends and notes the set bit. Similarly, for a period of ten seconds after taking a line off-hook, disconnect signals are to be ignored so that OFFHK sets a ten second timer when the line is actually taken off-hook. To prevent switchover transition problems, the RING and HNGUP queues are checked to determine if the line just taken off-hook is in either list; if so, it is removed. RNGWT is cleared if its entry is the line just taken off-hook, and the INT0 line is deactivated.

The routine ONHK is provided to place a line on-hook. The SZWT bit is cleared: if the line was pending to go off-hook, that status is cleared. The two second timer is set for a possible off-hook command. The line is placed on-hook and the HNGUP and RING lists are modified if they contain the specified line. If the line is in HNGWT, the INT7 output is removed and HNGWT is cleared.

The routine PRTBT (port bit)(FIG. 23) is used to provide the control line output, status input, and SZWT addresses, and the one bit set in register A for a particular port. Entry is with the port in register A. Since the coupler controller is connected to 24 couplers, each of the functions requires three bytes, one bit for each coupler. A similar routine PRTIM (FIG. 24) is used to return the address of the port timer associated with the specified port. Each timer is an entire location. A routine NOHR (no hangup or rings) is used to remove a port specified in register A from both the RING and HNGUP lists.

Clock Interrupt Actions

At ACTMS, the one millisecond interrupt is used to generate actions at five millisecond intervals. The actions require longer than one millisecond to execute, so cannot directly be called by ACTMS. The LED is activated if the controller is communicating, or cleared otherwise.

At these five millisecond intervals, the status inputs are read from each coupler. The triple byte variables RGTMP record whether a ring or hangup has been detected in the last second by sampling. These actions are handled by RING8 and PRDT (FIG. 25),which process eight ring bits and either four or eight detect bits, respectively.

The tenth second interrupt action, ACTTN, counts down all active port timers. When a timer reaches zero, if its SZWT bit is set, the port is taken off-hook. The count down subroutine, CNTDN, is used to handle both sides.

At one second intervals, ACTSC is called. If this section of code is not inhibited by INH1S, the information in RGTMP and HGTMP is converted to port numbers and placed onto the RING and HNGUP queues, if appropriate. Any entries in these queues are then deleted if either their respective timers are nonzero, or are blocked by presence in DALST (don't answer list) or BOLST (busy out list). At the conclusion of this data conversion, all of the 8155's are programmed and the location ID is set by reading the DIP switches.

Command Routines

The commands received from the master controller are relatively simple, and generally either load variables, set variables, or call existing subroutines.

5.5 Tone Controller

The tone controller must control the analog signal processing peripherals to successfully generate ready tone, receive user information, detect dial and ready tones, and dial outgoing numbers. This controller is the one which is directly visible to the user; it sets time limits for digit entry and responds with audible progress tones at key points. The hardware is designed to be as flexible as possible, so that with appropriate software changes many different tone detecting and generating functions can be realized.

Foreground Programs

Figure 28A:
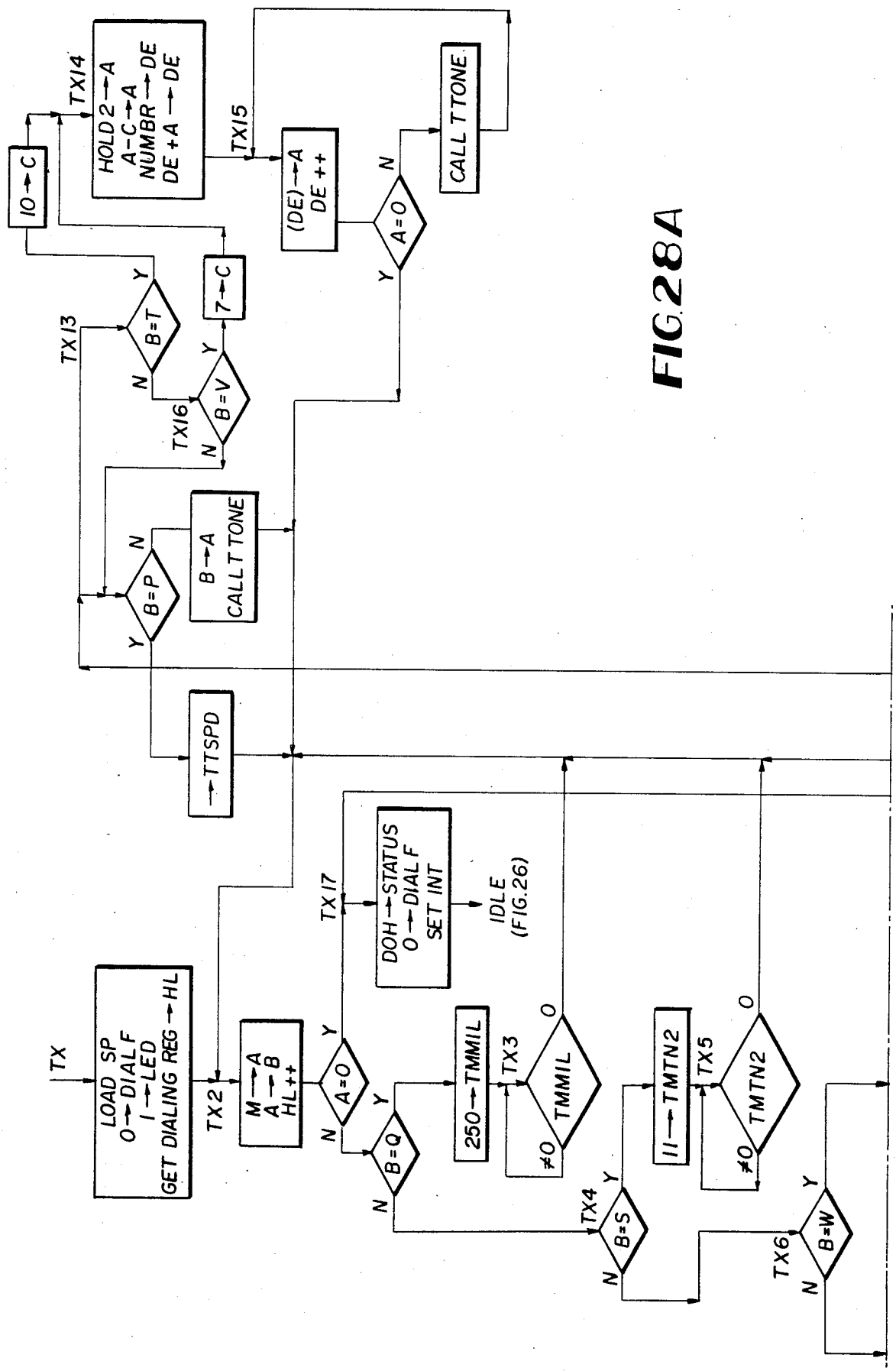
FIG. 28A-B is a flow chart for the transmit program routine at the tone controller.
Figure 28B:
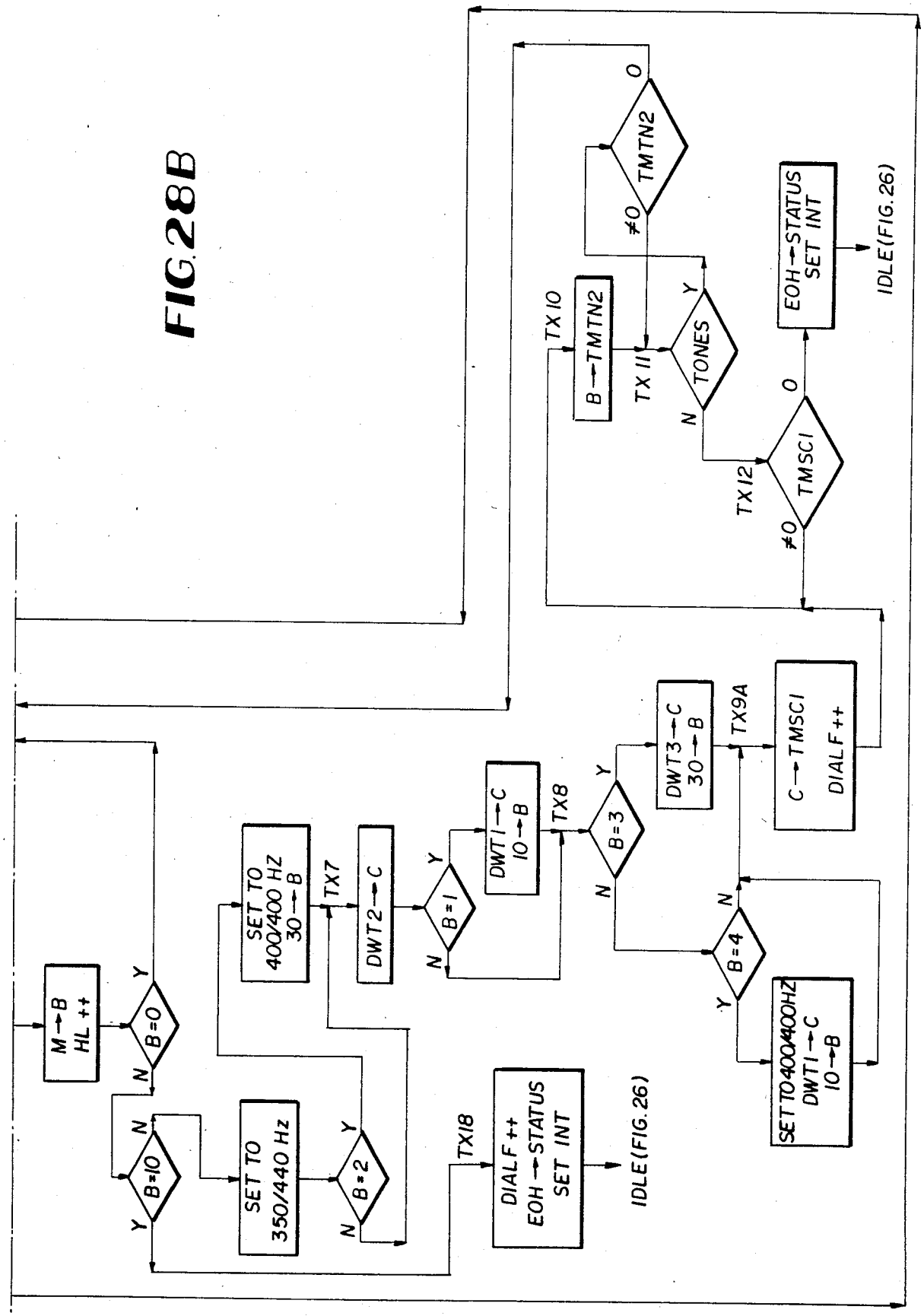

After initialization, control falls to the loop at IDLE (FIG. 26). This main loop does nothing but load the stack pointer and enable interrupts. Commands from the master controller can cause the program to jump to two other main loops, RX (FIG. 27) and TX (FIG. 28). These subprograms load the stack pointer, so that return cannot be had therefrom. Even though they are initiated by the interrupt driven commands, they are considered here as main programs for that reason.

Control passes to RX (FIG. 27) when the tone controller is in the receive mode and ready to accept information from the user. The INT output is killed, the status is set to busy (STATS), the pointers are initialized, tones are turned off, and a half second wait is performed (to let the limiting circuits in the UVC-1 to settle). At RX1 ready tone is generated and prestored timer values are loaded into TMSC1 and TMSC2, the one second timers. The first timer sets the maximum amount of time permitted between digit entry, and the second timer sets the overall allotted time for user entry. The travel code (TCODE) and authorization code (AUTHC) storage areas are cleared, and register B is set to the number of digits expected for the authorization code. If none are required, control escapes to RX8. Otherwise, control passes to RX2, where the timers are checked. If either has counted down to zero, the user has timed out, and this is recorded in STATS, the INT output is activated, and the program jumps to IDLE.

If a timeout has not occurred at RX2, at RX5 the touchtone buffer is checked to determine if a digit has been received. This buffer is loaded by an interrupt driven process. The program loops until either a timeout occurs or a digit is received, at which time the digit timer is reset and the ready tone is turned off. The received digit is checked; if it is a "#", control returns to RX1 and the user is back at the start. Next, the digit is checked to determine if it is a "*"; if so, control passes to RX6. Otherwise, the digit is pushed onto both the TCODE and AUTHC buffers and register B is decremented. If it is nonzero, control loops back to RX2 for the next digit. If it is zero, then the entire authorization code has been received, and there is no travel code, so TCODE is cleared and control passes to RX8.

If a travel code is entered, the "*" ending that code sends control to RX6, where the ready tone is returned, AUTHC is zeroed, and control loops through RX7 until either the authorization code is completely received or a timeout occurs. The travel code has already been received and stored in TCODE. Completion of AUTHC sends control to RX8.

At RX8 the telephone number location NUMBR is cleared, and the specified number of beeps are sent. Register B is set to the required length of the telephone number; if zero, an escape to RX10 is made. Otherwise, control loops through RX9 until either all of the digits are received, a "*" is received (which starts over at RX1), a "*" is received (which aborts to RX10), or a timeout occurs (which aborts to RX3). When the normal sequence of completion of the receipt of the telephone number is done, the first digit is checked to determine if it is a "1"; if so, it is removed and another digit is requested back at RX9; if not, control falls to RX10.

At RX10, the authorization code (and optional travel code) and telephone number have been received. The billing code storage location (BILLC) is cleared, the specified number of beeps are sent, and this progress is stored in STATS. The INT output is activated, and register B, TMSC1 and TMSC2 are set up for receipt of a possible billing code.

Control loops through RX11 until a timeout occurs (which sets STATS, activates INT, snd exits to IDLE) or a digit is received. If the digit is "#", control returns to RX10. If either the complete billing code is entered or a "*" is received, this segment exits to RX13; if a different digit, it is accumulated into BILLC. At RX13, the specified number of beeps are sent, STATS is set, INT is activated, and RX exits to IDLE.

When an outgoing number is to be dialed, a command instruction sends control to the transmit routine TX (FIG. 28). The stack pointer is loaded, the INT output is cleared, and STATS is set to indicate a process in progress. The dialing failure record, DIALF, is cleared, the HL register pair is set to point to the dialing register, and control passes to TX2, which processes a dialing register character.

At TX2 the current character is read from HL, stored in register B, and HL is incremented to point to the next register character. If a zero is found, indicating the sequence end, at TX17 the status is set in STATS, DIALF is zeroed, INT is activated, and TX exits to IDLE.

When an outgoing number is to be dialed, a command instruction sends control to the transmit routine TX (FIG. 28). The stack pointer is loaded, the INT output is cleared, and STATS is set to indicate a process in progress. The dialing failure record, DIALF, is cleared, the HL register pair is set to point to the dialing register, and control passes to TX2, which processes a dialing register character.

At TX2 the current character is read from HL, stored in register B, and HL is incremented to point to the next register character. If a zero is found, indicating the sequence end, at TX17 the status is set in STATS, DIALF is zeroed, INT is activated, and TX exits to IDLE.

If the character is "Q", TMMIL is set to 250, and the loop at TX3 waits for the quarter second to elapse, sending control back to TX2. Otherwise, at TX4 the character is tested to check if it is "S"; if so, TMTN2 is used to delay one second at TX5, returning to TX2. If not, at TX6 the character is tested to check if it is "W"; if not, control passes to TX13. If it is "W", the next character is placed into register B (incrementing HL). If it is the sequence end it is a mistake (since the "W" always requires a parameter following it) and control exits to TX17. If it is "0", a dialing failure is to be forced at TX18 where the contents of DIALF are incremented, STATS is set, INT is set, and an exit occurs to IDLE. Otherwise, the proper frequencies and waiting times are set, and the wait for dialtone is executed at TX9. DIALF is incremented, TMSC1 is set to the wait time, and TMTN2 is set to the duration required. Control loops through TX10 until either TMSC1 times out or a tone is detected. If a timeout occurs, STATS is set, INT is activated, and control exits to IDLE. If a tone is detected, its duration is checked by TMTN2; if the duration is not long enough, the loop continues; if its length is long enough, control returns to TX2 for the next register character.

At TX13, the character is tested to check it for being "T" or "V"; if not, it must be a DTMF tone, which is sent and control loops back to TX2. If "T" or "V", register C is set to either 10 or 7, and at TX14 variables are set up to read the user's number stored at NUMBR. Control loops through TX15 until all 7 or 10 digits are sent, and the program returns to TX2.

Subroutines

Routines are provided to push and pop information onto and off of queues with PUSHQ and POPQ. A BEEP subroutine is used to send a specified number of beeps. A delay subroutine DELMS delays a specified number of milliseconds, using TMMIL. The routine TTONE sends touchtones.

The routine TRTN (transmit/receive tones) is used to control the analog sending/receiving circuitry. Depending upon the contents of register A upon entry, tones will be transmitted, sent, or both; a transmit level of −3 dBm or −15 dBm will be selected; DT1, DT2, or neither will be set high; and tone pairs will be set to one of the 16 DTMF pairs, or precise dialtone, ready tone, or a number of other useful combinations.

The control values and the frequencies are set in tables. At TNMOD, a tone mode table is stored controlling DT1, DT2, TX, and other hardware functions. The tone table stored at TNTAB supplies the frequency pairs to transmit, receive, or notch.

Interrupt Actions

The DTMF receiver data available output drives the RST 5.5 interrupt input. This is a level sensitive, not an edge triggered, input. However, the DV (data valid) signal is not reset, because if this is done, there is no way to determine when the received tone pair is released. To save additional hardware, an edge triggered input is simulated in software.

When DV goes high, signifying the appearance of a valid touchtone pair, the RST 5.5 interrupt service routine TTD is called. At this point the RST 5.5 interrupt input is masked. The digit is read and pushed onto a touchtone buffer stored at TTBUF.

The one millisecond interrupt action routine ACTMS (FIG. 29) is used to restore the RST 5.5 mask at the proper time. At ACTMS, if the mask is not set, no action is taken. If that interrupt is masked, however, DV is read; if it is still active, no action is taken. If it is gone, then the touchtone has been released, and the RST 5.5 mask is removed.

The tenth second action routine ACTTN is used to activate the LED. In this routine, STATS is checked: if the INT output is activated, the LED output is complemented, creating a five pulse per second blinking; otherwise, if a process is in progress, the LED is turned on (solid on); otherwise, no action is pending and the LED is turned off.

The one second actions are performed at ACTSC. The first RAM is programmed for divide ratio and I/O lines. The DIP switch is read and the board address is stored in ID.

Command Routines

Command routines are used to load holding register length and timing parameters. Others read variables or call existing subroutines. RXG and TXG send control to RX and TX. The read (R and BC) commands are performed directly in the tone controller rather than the master controller; the syntax is generated at the source of the information. XMD and XMQ are similar to RX, but simpler. A command instruction is provided to call TRTN directly. A special command, TXRXG, sets variables so that TX is called and automatically calls RX afterwards. These commands are straightforward.

6. LCRC SOFTWARE

This section will describe the function of the programs which run on the least cost routing computer and its attendant hardware.

6.1. LCRC Hardware

The hardware is a TRS-80 Model III computer with a floppy disk drive, a 10 megabyte sealed Winchester hard drive, an internal serial RS-232 interface, an external serial RS-232 interface, and an auto answer modem. The external serial interface connects to the TRS-80 through the expansion interface and is powered by a cable which is added to the computer. The external RS-232 is used to communicate with the switch. The internal RS-232 connects to the modem, which is used for remote access.

6.2 Software Environment

The DOS PLUS operating system is used. The floppy is drive 0, and the 10 megabyte hard drive is configured as drive 4 and drive 5. All of the operating programs and data files are on drive 4. Backups and older program versions are placed on drive 5. The floppy disk is used to transfer programs and files, and to initiate program execution on a cold boot.

Some of the programs run under interpreted BASIC. The speed critical programs are compiled under AC-CEL.

6.3 Startup Program

Upon powerup, the operating system goes to the floppy drive for instructions. The AUTO function is used to load the compiler runtime module for later use, and call STARTS/BAS, a BASIC program. This program polls the internal and external RS-232 interfaces, attempting to initiate communications with the switch. Although normal operation is through the external unit, software is included to use either. In this way, if the external interface should fail and a backup is not available, the switch can be plugged into the internal interface and operate, albeit without the benefit of remote access.

When STARTS/BAS successfully communicates with the switch (at 4800 baud), it loads either the internal or external versions of the switch operating program, and chains control to it.

6.4 Switch Operating Program

Upon execution, the program initializes parameters in the switch and checks the internal switch clock. If it has previously been set, then that time is read and the TRS-80 internal clock is set from it. If the switch clock has not been set, a message appears on the screen requesting the month, day, year, and time of day. These are converted into the number of seconds elapsed since January 1, and the switch clock is set. The internal TRS-80 clock is not used as a master clock because it is not accurate, and is affected (cleared) by a computer reset operation.

Internal variables are cleared (disabled lines, registers, incoming and outgoing port usage), and the switch is cleared. At this point, the switch is in operation. The programs waits for a $, @, D, or P from the switch to initiate actions. At approximately fifteen minute intervals, the computer will read the time from the switch and update its internal clock. Any disabled lines or registers will be tested at this time; if they have been restored, they will be removed from the disabled lists.

Three files are created per day: a billing, statistical, and log file. The billing file contains all of the information necessary to print customer bills. The statistical file contains information which is useful to plan routing and track down telephone line problems: which route decision level was used for each call, which tone controller, invalid attempts, etc. The log file is a record of disabled and restored lines and registers, detected software errors, data transmissions, etc.

A menu can be reached by simultaneous depression of the SHIFT and "@" keys. Options permit: 1 set date/time, 2 full manual, 3 semi manual, 4 display conditions, 5 display log, 6 shut down, 7 change initialization, 8 resume. The first permits the clock to be set. Full manual initiates a mode of operation where the computer is used as a terminal directly to the switch. Semi manual does the same, except that the $, @, D, and P will be handled by the program when they arrive; commands can be sent to the switch between actions. Display conditions shows the occupancy of each incoming and outgoing line, which lines and registers are disabled, and supplies the running total of calls received, calls completed, and billable minutes since midnight. The current day's log can be displayed. Shut down gives the option of waiting until the last caller hangs up, or immediate shut down. In the latter case, each call in progress is sent four beeps several seconds prior to final cutoff. Change initialization chains to the INIT program, and resume cancels the request. Timeouts are incorporated at various levels to return to normal displays. With the exception of full manual, the switch operation does not cease during displays. The switch location, size, date, and time are always displayed at the top of the screen.

Special Features

If the authorization code "123123" is used, appended with a "*", TC2P will automatically route the call to the corporate headquarters. The customer need not use his account, at his expense, to call the office.

A special authorization code is used as a key to special test modes. If this key is used appended with a "*", the program will respond with one beep if AC power is present, or two beeps if battery power is being used. If the key is followed by a two digit billing code, an outport number, and a "*", the call will be directly connected to the specified line, without dialing. This permits remote checking of all lines. If the line requested is in use, a busy tone is provided.

Remote access via the modem line can be used to dump billing, statistical, and log files.

6.5 Understanding the Screen Display

The computer communicates with the switch with ASCII characters. The screen shows two things: what the computer sends to the switch, and what the switch sends to the computer. There are many possible sequences which can occur; however, most switch operations will fall into several categories.

Call With No Billing Code

When the customer has entered his authorization code and telephone number (and hears the two beeps), the switch sends "$" (there is money to be made). The computer responds by inquiring which telephone line the party is on. The computer sends "G"; the switch responds with "a", indicating group a (the top cage). The computer sends "P"; the switch responds with "L", indicating port L (the card on the far left). Next, the computer sends "W" to determine which tone controller is being used for this call (only for statistical and debugging records). The switch responds with "!", indicating the first tone controller. (The order to 1-11 is !, ", #, $, %, &, ', (, ), *, and +.)

The authorization code is read next. The computer sends "R" (stands for received), and the switch responds with "9", which is the first number of the authorization code. This process continues until the switch responds with "N"; at this point, the entire authorization code has been received, and the next information to be sent will be the telephone number. The computer reads the number in the same way; when the switch sends "X", the computer has the entire telephone number.

The computer next reads the time from the switch. The switch clock gives the number of seconds elapsed since January 1 of the current year. To read the time, the computer sends "T"; the switch responds with the first digit of the time. This continues until the switch sends "X", telling the computer that it now has the complete time number.

The computer now has all of the information necessary for it to determine how the call is to be placed. When it makes its decision, it sends a transfer call command to the switch. It sends "XCACC" in this case. The "XC" tells the switch to transfer the call; "ACC" means use outgoing group A, port C, and dial the telephone number in the fashion directed by dialing register C. The switch responds with "R" (roger), saying that it has received the instruction and will obey. At this point, the call has been processed and the computer is ready for any further action, which it indicates by sending "r" to the switch.

When conversation is ended, one party hangs up the telephone, the switch detects this, and hangs up both the incoming and the outgoing telephone lines. The switch sends "@" to the computer, indicating a hang-up. The computer responds with a request for the time. It next need only find out which conversation was terminated. It sends "G", and the switch responds with "a" (group a). The computer sends "P", and the switch responds with "L" (port L). This is the incoming line which initiated the hangup (it could have been the outgoing line which hung up first, in which case that group and port would be identified.) The computer knows which line the party was connected with, so it clears its internal status indicating that both lines are now free, and it logs the call out to the disk. The computer sends "r" to tell the switch it is ready for action, and the entire calling sequence has ended.

Call With Billing Code

The process is identical to the above call up through the reading of the authorization code and telephone number. This time, however, the authorization code is one marked as requiring a billing code, so the computer sends "XW" to the switch, telling it to wait for a billing code. The switch responds with "R", saying OK. The computer sends "r" indicating its readiness for further action. After the customer enters his billing code (followed by a *), the switch sends another "$". The computer reads the incoming port and identifies it as one for which it already has all of the information needed except for the billing code itself. The computer sends "B" to read that code, and the switch responds with "5". All digits are read in this fashion until the switch sends "X". The computer now has the billing code, and the rest of the process is identical to the no billing code situation. If the customer did not append "*" to his billing code, the billing code would have been read as "54TX", saying a time-out occurred. However, processing would be the same as if "54"X were received (it just adds five seconds to the point where the switch sends the second "$").

Invalid Authorization Code

This sequence is identical to the above processes up through the computer receiving the authorization code and the "N" which precedes the telephone number. At this point, the computer determines that the authorization code is invalid, and need not proceed any further. Instead, the computer reads the time and sends "XB", telling the switch to transfer this caller to the busy tone. The switch responds with "R", saying it has done so. The computer send "r" indicating its readiness for further processing. The hang-up is processed as above.

Invalid Telephone Number

In this case, the process is the same as for the invalid authorization code, except the requested telephone number is also obtained. In this example, an area code of 321 is requested, which does not exist.

No Billing Code When Required

Processing is the same as for the case where a billing code is used, except that when the computer receives "TX" as the billing code, it knows that a time-out occurred and the user did not enter a billing code. The rest of the process is the same as for an invalid authorization code or telephone number.

Other Sequences

If the computer transfers a call to a telephone line which does not work, the switch will send "D" to tell the computer that a dialing failure occurred. The computer will read the group and port and transfer the same call again to another line.

Periodically, at approximately 15 minute intervals, the computer will read the time from the switch when no calls are pending. At this time, it will also perform a line test for those telephone lines which are flagged as disabled. If such a line is determined to be working, it is removed from the disabled list automatically.

Other sequences may be displayed from time to time for operations such as power fail detection, remote access, test modes, etc. It is not in the scope of this description to detail these actions.

6.6 Initialization Program

The operating program performs least cost routing based upon a pair of files previously created by the INIT program. An understanding of how INIT creates these decision files will explain the method used to make routing decisions. The logical order in which the files are actually created by INIT from scratch is the reverse from which the program uses the information for every call completion.

There is a large exchange/area file, EXAR, which contains an entry for every area code and three digit exchange in the country. All other routing information is kept in a control file, CNTROL. Given a telephone number to be placed, the following sequence is used to obtain the specific route:

1. The area code and exchange for the requested telephone number are found in EXAR, and the value for that entry is read. This entry is an integer between 0 and 96, inclusive. If the entry is 0, then that area code/exchange is blocked; no route will be provided, and a busy signal will be supplied to the user. Note that this is not the same thing as requesting an invalid telephone number—this is a valid number for which the switch is not to be used (such as 301 555). Currently unassigned area codes and exchanges fall into this category also. If the entry is from 1–96, it is an index into a TIME table.

2. The TIME table contains three entries for each of the 96 possible choices. These are ROUTE numbers for weekday, evening, and night/weekend. This permits different decisions to be made dependent upon the time period, which alters both the rates which customers are charged and the rates which are charged by suppliers. Naturally, this can easily affect the least cost route decision.

3. The ROUTE numbers can also be from 1–96. Each ROUTE is a list of ways the call can be handled, in order of least cost to least economical. The first method which is available in this ROUTE list will be used to place the call. Each means of placing the call in one ROUTE is described by three characters. Up to 12 of these three character groups can be placed in each ROUTE list.

4. The first character of the three character description is a letter designating a type of line; i.e. New York City FX, band 3 WATS, SPRINT direct network access line, etc. Note that this is a line TYPE, not a specific line. The second character denotes a DIALING REGISTER, which stores the proper dialing sequence to be used for a line type. The last character in the ROUTE subset is an integer from 0–9 inclusive, which is the delay time in seconds to be used before progression to the next least economical route is to be made. If the delay is 0, then a decision will immediately be made. If the delay is from 1–9, then that call request will be placed on "hold" for up to that period of time. If, in that time period, any of the three character routes up to and including the level reached becomes available because another call terminates, the call will be recalled from "hold" and immediately placed. When the time period is reached without a filled line being relinquished, the next three character group in that ROUTE will be entertained. If the entire ROUTE is traversed without an available means to place the call found, the search is terminated and the customer will receive a busy signal. The special three character group "??0" can be used to extend the routing list for business customers, but not for residential customers.

5. The line TYPE is described by a letter from A–Z. The OUT PORT CONNECTION list is a record of all of the physical outgoing telephone lines; in this list, each port is defined as one line TYPE. When a three character group is encountered in the ROUTE list, all ports of the specified line TYPE will be checked to determine if one is available for use.

6. The DIALING REGISTER is described by a letter from A–Y. It is a sequence of letters and numbers used to specify how to dial the desired number. For WATS lines, as an example, a wait for dial tone, dial "1", the area code, and telephone number would be stored. For FX lines, a wait for dial tone and dial the telephone number would be used.

The INIT program is used to create each of these routing type entries. A separate program is used to create the authorization code files. Each switch is organized such that there are ten authorization code files for codes based in that city. The codes are broken down into ten groups by the first digit of the authorization code; this speeds up processing, since the search is then shortened. For switch number 12, the ten files are A12-0–A129. Codes authorized from other switches (travel codes) are stored in separate files.

The telecommunications field is currently vast and growing at an accelerating rate. There are many areas where it is evident that there is an equipment gap between what exists and what is required to solve a particular problem. Such deficiencies are often "solved" by utilizing equipment designed to best perform in other circumstances. The end result is then to solve the problem, but sacrifice efficiency and optimization in both the technical and economic senses.

The long distance telephone resale industry has appeared only in very recent years. Although switching equipment exists for large systems, it is generally used by the centralized OCC's (other common carriers) and is extremely expensive in minimal configurations. Other equipment modified for resale requirements tends to be inflexible and may not be suitable for programming complex routing patterns for efficient least cost decision making.

The invention described hereinabove is designed to be configured in square arrays (the same number of incoming and outgoing lines) from a size of $12 \times 12$ up through $108 \times 108$ lines (a square array is not required, however). The system uses a multitude of microprocessors to produce distributed intelligence and permit an inexpensive computer to be used for making routing decisions. The switching matrix itself is a complete, nonblocking analog array. The entire system is completely solid state; the only moving part is the disk drive. Modularity, flexibility, and reliability have been optimized to provide a system which performs the function for which it was specifically designed which can be produced for a reasonable cost.

Having described several embodiments of a new and improved telephone switching system constructed according to the invention, it is believed that other modifications, variations and changes will be suggested to those skilled in the art in the light of the above teachings. It is, therefore, to be understood that all such variations, modifications and changes are believed to come within the scope of the invention as defined by the appended claims.

What is claimed is:

1. A telephone switch system for receiving requests for calls on incoming telephone lines and placing the requested calls on outgoing telephone lines, said system comprising:
   a first plurality of coupler circuits adapted for connection to a respective first plurality of telephone lines;
   a second plurality of coupler circuits adapted for connection to a respective second plurality of telephone lines;
   matrix crosspoint switching means having a plurality of rows and columns wherein each column is connected to a respective coupler circuit in said first plurality of coupler circuits, wherein each row is connected to a respective coupler circuit in said second plurality of coupler circuits, said switching means including selectively actuable means for selectively interconnecting individual column and row matrix crosspoints;
   coupler controller means, including a first microprocessor for monitoring and controlling said first and second pluralities of coupler circuits;
   switch controller means, including a second microprocessor for selectively actuating and de-actuating said selectively actuable means at said matrix crosspoint switching means to establish, break and identify all connections between coupler circuits in said first plurality of coupler circuits and coupler circuits in said second plurality of coupler circuits via said switching means;

tone controller means, including a third microprocessor, selectively assignable to plural individual coupler circuits simultaneously for: decoding DTMF signals received at each of said first plurality of coupler circuits to which said tone controller means is assigned; supplying a ready tone on command to each of said first plurality of coupler circuits to which said tone controller means is assigned; detecting the presence of dial tone at each of said second plurality of coupler circuits to which said tone controller means is assigned; and providing outgoing DTMF coded signals to each of said second plurality of coupler circuits to which said tone controller means is assigned;

master controller means, including an interrupt driven fourth microprocessor, for coordinating operation of said coupler controller means, said switch controller means and said tone controller means to process individual telephone calls through said telephone switching system;

communications bus means commonly interconnecting said master controller means with said tone controller means, said coupler controller means and said switch controller means for transmitting commands, data and control signals; and least cost routing processor means exclusively connected to said master controller means for: receiving information signals concerning each requested call through said switching system from said master controller means; determining the least cost route for placing the requested call; and controlling the master controller means to in turn control the tone controller means, the switch controller means and the coupler controller means to place the requested call.

2. The telephone switching system according to claim 1 wherein said coupler controller means includes means responsive to predetermined command signals from said master controller means for placing selected telephone lines in on-hook and off-hook status via respective coupler circuits.

3. The telephone switching system according to claim 2 wherein said coupler controller means further includes means responsive to other predetermined command signals from said master controller means for inhibiting incoming calls.

4. The telephone switching system according to claim 1 wherein said switch controller means includes:
means for selectively addressing each column and row crosspoint matrix location to establish connections between the coupler circuit in said first plurality of coupler circuits and the coupler circuit in said second plurality of coupler circuits which are connected to the addressed location.

5. The telephone switch system according to claim 4 wherein said switch controller means includes memory means for storing the connection status of all crosspoint locations in the matrix crosspoint switching means.

6. The telephone switch system according to claim 5 wherein said master controller means includes means for selectively interrogating said memory means to determine the status of selected crosspoint locations at said matrix crosspoint switching means.

7. The telephone switching system according to claim 1 wherein said tone controller means includes means for handling no more than a predetermined number of requested calls simultaneously, said predetermined number being smaller than said first plurality.

8. The telephone switching system according to claim 1 wherein said tone controller means includes:
a DTMF receiver for accepting and decoding DTMF digits received by a coupler circuit as part of a requested call;
a tone generator for supplying said ready tone when the telephone switching system awaits entry of additional digit information concerning the requested call; and
a DTMF generator for providing said outgoing DTMF signals to place outgoing calls via an assigned coupler circuit in said second plurality of coupler circuits.

9. The telephone switching system according to claim 8 wherein said tone controller means includes dial tone detector means for recognizing availability of telephone lines connected to coupler circuits in said second plurality of coupler circuits.

10. The telephone switching system according to claim 1 wherein, at said master controller means, said fourth microprocessor is programmed to step through a main program, wherein said coupler controller means is responsive to detection of a call disconnect at one of said coupler circuits for applying a first interrupt signal to said master controller means, and wherein said master controller means is responsive to application of said first interrupt signal thereto for interrupting said main program and controlling said switch controller means to break the connection at said matrix crosspoint switching means through which the disconnected call had been connected.

11. The telephone switching system according to claim 10 wherein said coupler controller means additionally applies a second interrupt signal to said master controller means in response to detection of a ring signal at a call-request coupler circuit in said first plurality of coupler circuits, and wherein said master controller means is responsive to application of said second interrupt signal thereto for controlling said switch controller means to establish a connection between said tone controller means and said call-request coupler circuit in said first plurality of coupler circuits.

12. The telephone switching system according to claim 11 wherein said master controller means comprises means responsive to application of said first and second interrupt signals thereto for responding to said first interrupt signal in preference to said second interrupt signal.

13. The telephone switching system according to claim 12 wherein said tone controller means provides a third interrupt signal upon receiving all call data required for placing a requested call from said call-request coupler circuit, and wherein said master controller means is responsive to said third interrupt signal for breaking the connection between said tone controller means and said call-request coupler circuit and passing said call data to said least cost routing processor means.

14. The telephone switching system according to claim 13 wherein said least cost routing processor means is responsive to said call data received from said master controller means for determining whether or not the requested call is valid and for providing a valid indication to the master controller means if the requested call is valid, and wherein said master controller means is responsive to said valid indication for establishing a connection between said tone controller means and an available coupler circuit in said second plurality of coupler circuits.

15. The telephone switching system according to claim 14 wherein said tone controller means is responsive to its connection to said available coupler circuit for sending out a called telephone number, which was included as part of said call data, to an outgoing telephone line via said available coupler circuit and thereafter re-applying said third interrupt signal to said master controller means, and wherein said master controller means is responsive to re-application thereto of said third interrupt signal for breaking the connection between said tone controller means and said available coupler circuit, and for establishing a connection via said matrix crosspoint switching means between said call request coupler circuit and said available coupler circuit.

16. The telephone switching system according to claim 1 wherein the respective first and second telephone lines carry variable level audio signals and each of said coupler circuits connected thereto comprises:
a balanced audio transformer having a telephone line side winding and an audio circuit side winding;
means for sampling the audio signal appearing across the telephone line responsive to produce a control signal having an amplitude which varies as a function of the level of the sampled audio signal; and
variable impedance means connected in circuit with the telephone line side winding responsive to the control signal for varying the impedance thereof as the sampled audio signal level varies to thereby control the level of said audio signal into said transformer.

17. The telephone switching system according to claim 16 wherein each of said coupler circuits further comprises: means responsive to a predetermined minimum current flow through
said line side winding for providing an on-hook signal.

18. The telephone switching system according to claim 17 wherein each of said coupler circuits additionally includes:
electronic switch means connected across said telephone line side;
means responsive to an over-voltage condition at said telephone line side for triggering said electronic switch means and clamping the voltage across said telephone line side to a predetermined safe voltage level; and
means responsive to an over-current condition through said telephone line side for triggering said electronic switch means.

19. The telephone switching system according to claim 16 wherein each coupler circuit additionally includes:
means responsive to the voltage across said telephone line side winding exceeding a first predetermined level at a first polarity for providing a first indicator signal; and
means responsive to the voltage across said telephone line side winding exceeding a second predetermined level at a second polarity, opposite said first polarity, for providing a second indicator signal.

20. The telephone switching system according to claim 16 wherein each of said coupler circuit includes:
rectifier means connected between tip and ring lines on said telephone line side to provide a constant polarity telephone side line voltage;
a zener diode;
signal controlled switching means;
means connecting said telephone line side winding in series with said zener diode and said switching means across said constant polarity voltage; and
means for selectively applying a signal to said switching means to permit current flow through said telephone line side winding from said constant polarity voltage.

21. A telephone switching system for receiving requests for calls in incoming telephone lines and, after determining that the requested calls are valid, placing the requested calls on outgoing telephone lines by connecting incoming and outgoing telephone lines, wherein at least first, second and third pluralities of related procedures are performed in receiving call requests and placing the requested call, said system comprising:
first microprocessor means for controlling said first plurality of related procedures;
second microprocessor means, physically and operationally independent of said first microprocessor means, for controlling said second plurality of related procedures;
third microprocessor means, physically and operationally independent of said first and second microprocessor means, for controlling said third plurality of related procedures;
master controller means including interrupt driven fourth microprocessor means for controlling and coordinating operation of said first, second and third microprocessor means to process individual call request and call placements; and
a common bus interconnecting the first, second and third microprocessor means.

22. The telephone switching system according to claim 21 further comprising least cost routing processor means for determining the least cost route for placement of a requested call, said least cost routing processor being connected to functionally interface with said first, second and third microprocessors only through said master controller means.

23. The telephone switching system according to claim 22 wherein, at said master controller means, said fourth microprocessor means is programmed to step through a main program, wherein said first microprocessor means is responsive to detection of a call disconnect at one of said telephone lines for applying a first interrupt signal to said master controller means, and wherein said master controller means is responsive to application of said first interrupt signal thereto for placing said main program and controlling said second microprocessor means to break the connection between the incoming and outgoing telephone lines on which the disconnected call was placed.

24. The telephone switching system according to claim 23 wherein said first microprocessor means additionally applies a second interrupt signal to said master controller means in response to detection of a ring signal at a call-requesting incoming telephone line, said system further including tone controller means incorporating said third microprocessor means therein for receiving call-request coded signals and providing call placement coded signals, and wherein said master controller means is responsive to application of said second interrupt signal thereto for controlling said second microprocessor means to establish a connection between said tone controller means and said call-requesting incoming telephone line.

25. The telephone switching system according to claim 24 wherein said master controller means comprises means responsive to application of said first and second interrupt signals thereto for responding to said first interrupt signal in preference to said second interrupt signal.

26. The telephone switching system according to claim 24 wherein said tone controller means provides a third interrupt signal upon receiving all call data required for placing a requested call from said call-requesting incoming telephone line, and wherein said master controller means is responsive to said third interrupt signal for breaking the connection between said tone controller means and said call-requesting incoming telephone line and passing said call data to said least cost routing process means.

27. The telephone switching system according to claim 26 wherein said least cost routing processor means is responsive to said call data received from said master controller means for determining whether or not the requested call is valid and for providing a valid indication to the master controller means if the requested call is valid, and wherein said master controller means is responsive to said valid indication for establishing a connection between said tone controller means and an available outgoing telephone line.

28. The telephone switching system according to claim 27 wherein said tone controller means is responsive to its connection to said available outgoing telephone line for sending out a called telephone number, which was included as part of said call data, via said outgoing telephone line and thereafter re-applying said third interrupt signal to said master controller means, and wherein said master controller means is responsive to re-application thereto of said third interrupt signal for breaking the connection between said tone controller means and said available outgoing telephone line, and for establishing a connection between said call requesting incoming telephone line and said available outgoing telephone line.

29. A voice coupler circuit for use in a telephone switching system, said circuit for coupling first and second telephone lines carrying variable level audio signals comprising:
a balanced audio transformer having a telephone line side winding and an audio circuit side winding;
means for sampling the audio signal appearing across the telephone line responsive to produce a control signal having an amplitude which varies as a function of the level of the sampled audio signal; and
variable impedance means connected in circuit with the telephone line side winding responsive to control the signal for varying the impedance of said variable impedance means as the sampled signal level varies to thereby control the level of said audio signal into said transformer.

30. The circuit according to claim 29 further comprising:
means responsive to a predetermined minimum current flow through said line side winding for providing an on-hook signal.

31. The circuit according to claim 30 further comprising:
electronic switch means connected across said telephone line side;
means responsive to an over-voltage condition at said telephone line side for triggering said electronic switch means and clamping the voltage across said telephone line side to a predetermined safe voltage level; and
means responsive to an over-current condition through said telephone line side for triggering said electronic switch means.

32. The circuit according to claim 29 further comprising:
means responsive to the voltage across said telephone line side winding exceeding a first predetermined level at a first polarity for providing a first indicator signal; and
means responsive to the voltage across said telephone line side winding exceeding a second predetermined level at a second polarity opposite said first polarity for providing a second indicator signal.

33. The circuit according to claim 29 further comprising:
rectifier means connected between tip and ring lines on said telephone line side to provide a constant polarity telephone side line voltage;
a zener diode;
signal controlled switching means;
means connecting said telephone side line winding in series with said zener diode and said switching means across said constant polarity voltage; and
means for selectively applying a signal to said switching means to permit current flow through said telephone line side winding from said constant polarity voltage.

34. In a telephone switching system, the method of receiving requests for calls on incoming telephone lines and, after determining that the call requests are valid, placing the requested calls on available outgoing telephone lines, said method including the steps of:
performing a first plurality of related procedures, under the control of a first microprocessor, to control the operation of coupler circuits connected to said incoming and outgoing telephone lines;
performing a second plurality of related procedures, under the control of a second microprocessor which is independent of said first microprocessor, to control the operation of a matrix crosspoint switch which selectively interconnects incoming and outgoing telephone lines;
performing a third plurality of related procedures, under the control of a third microprocessor which is independent of said first and second microprocessors, to control the reception and detection of call request signals received on incoming telephone lines, and to control the generation of call placement signals and application of said call placement signals to said outgoing telephone lines;
controlling and coordinating operation of said first, second and third microprocessor with an interrupt driven master control microprocessor;
connecting the first, second and third microprocessors to the master control microprocessor over common bus means to process individual call requests and call placements.

35. The method according to claim 34 further comprising the steps of:
in a separate least cost routing processor, determining the validity of call request signals and lowest cost route for placing requested calls; and connecting the least cost routing processor to the master control microprocessor over separate bus means, wherein said least cost routing processor communicates with said first, second and third microprocessor only via said master control microprocessor.

36. The method according to claim 35 wherein said master control microprocessor is programmed to step through a main program, said method further including:
at said first microprocessor, in response to detection of a call disconnect at one of said telephone lines, applying a first interrupt signal to said master control microprocessor; and
at said master control microprocessor, in response to application of said first interrupt signal thereto, interrupting said main program and controlling said second microprocessor to break the connection between the incoming and outgoing telephone lines on which the disconnected call was placed.

37. The method according to claim 36 further comprising the steps of:
additionally applying a second interrupt signal to said master control microprocessor in response to detection of a ring signal on a call-requesting incoming telephone line at said first microprocessor;
receiving call-request coded signals and providing call placement coded signals at a tone controller which incorporates said third microprocessor; and
at said master control microprocessor, responding to application of said second interrupt signal thereto by controlling said second microprocessor to establish a connection between said tone controller and said call-requesting incoming telephone line.

38. The method according to claim 37 further comprising the steps of:
at said tone controller, providing a third interrupt signal upon receiving all call data required for placing a requested call from said call-requesting incoming telephone line;
at said master control microprocessor, responding to said third interrupt signal for breaking the connection between said tone controller and said call-requesting incoming telephone line and passing said call data to said least cost routing processor.

39. The method according to claim 38 further comprising the steps of:
at said least cost routing processor, responding to said call data received from said master control microprocessor by determining whether or not the requested call is valid and providing a valid indication to the master control microprocessor if the requested call is valid; and
at said master control microprocessor, responding to said valid indication by establishing a connection between said tone controller and an available outgoing telephone line.

40. The method according to claim 39 further including the steps of:
at said tone controller, responding to connection to said available outgoing telephone line by sending out a called telephone number, which was included as part of said call data, via said outgoing telephone line and thereafter re-applying said third interrupt signal to said master control microprocessor; and
at said master control microprocessor, in response to reapplication thereto of said third interrupt signal, breaking the connection between said tone controller and said available outgoing telephone line, and for establishing a connection between said call requesting incoming telephone line and said available outgoing telephone line.

41. In a telephone switching system, the method of receiving requests for calls on incoming telephone lines and, after determining that the call requests are valid, placing the request calls on available outgoing telephone lines, said method including the steps of:
detecting an incoming call-indicative ring signal at one of plural coupler controllers and responding by providing a first interrupt signal from said one coupler controller to a master controller;
in response to receiving said first interrupt signal at said master controller, interrupting a main program performed at a master controller microprocessor and polling said plural control couplers to determine the identity of said one coupler controller;
selecting an available tone controller from plural tone controllers and assigning the selected tone controller to the incoming call;
placing the call-receiving incoming telephone line on which said call-indicative ring signal was received in an off-hook condition and removing said first interrupt signal from said master controller;
connecting the call-receiving incoming line to the selected tone controller;
resuming the main program at the master controller microprocessor while effecting signalling between a user of the call-receiving incoming line and the selected tone controller to obtain call data concerning the requested call;
in response to completion of call data entry into the selected tone controller by the user via said call-receiving incoming telephone line, providing a second interrupt signal to said master controller from said selected tone controller;
in response to receiving said second interrupt signal at said master controller, interrupting said main program and supplying the entered call data to a request validation and lowest cost call routing further processor from the selected tone controller only via the master controller;
upon validation of the call request and selection of the lowest cost call route at said further processor, breaking the connection between the selected tone controller and the call-receiving telephone line, and establishing a connection between the selected tone controller and an available outgoing telephone line through a second of said coupler circuits which is associated with that available outgoing line; and
transmitting call-dialing signals from said selected tone controller to said available outgoing telephone line via said second coupler circuit.

42. The method according to claim 41 further comprising the steps of:
after transmission of said call-dialing signals, re-providing said second interrupt signal to said master controller from said selected tone controller; and
in response to receiving the re-provided second interrupt signal at said master controller, breaking the connection between the selected tone controller and the available outgoing line, establishing a connection between said call-receiving incoming line and the available outgoing line via said one and said second coupler circuits, removing said second interrupt signal, and resuming said main program.

43. The method according to claim 42 further comprising the steps of:

in response to detection of a disconnect signal on an outgoing telephone line, a coupler circuit associated with that line, providing a third interrupt signal from that coupler circuit to said master controller;

responding to said third interrupt signal at said master controller by interrupting said main program and polling said coupler circuits to determine the identity of the coupler circuit from which the received third interrupt signal originated; and upon determination of the identity of the originating coupler circuit, removing the third interrupt signal and breaking the connection between the originating coupler circuit and the coupler circuit associated with the incoming line which was part of the disconnected call.

* * * * *